(12) United States Patent
Matias et al.

(10) Patent No.: US 7,574,430 B2
(45) Date of Patent: Aug. 11, 2009

(54) CALIBRATION AND PROFILE BASED SYNOPSES ERROR ESTIMATION AND SYNOPSES RECONCILIATION

(75) Inventors: Yossi Matias, Tel Aviv (IL); Yariv Matia, Marburg (DE)

(73) Assignee: Ramot At Tel Aviv University Ltd., Tel Aviv (IL)

( * ) Notice: Subject to any disclaimer, the term of this patent is extended or adjusted under 35 U.S.C. 154(b) by 167 days.

(21) Appl. No.: 11/683,444

(22) Filed: Mar. 8, 2007

(65) Prior Publication Data

US 2008/0222066 A1 Sep. 11, 2008

(51) Int. Cl.
*G06F 17/30* (2006.01)

(52) U.S. Cl. .......................................................... 707/3
(58) Field of Classification Search ..................... 707/2, 707/3; 709/224
See application file for complete search history.

(56) References Cited

U.S. PATENT DOCUMENTS

2002/0178151 A1* 11/2002 Chaudhuri et al. ............. 707/3
2004/0010488 A1* 1/2004 Chaudhuri et al. ............. 707/3

OTHER PUBLICATIONS

A Framework for the Physical Design Problem for Data Synopses By: Arnd Christian Konig and Gerhard Weikum Department of Computer Science University of Saarland SaarBrucken Germany. pp. 1-27. 2002.

Auto-Tuned Spline Synopses for Database Statistics Management Written by: Arnd Christian Konig and Gerhard Weikum University of the Saarland Saar Brucken Germany co. 2000.

Synopsis Data Structures for massive Data Sets Phillip B. Gibbons and Yossi Matias pp. 1-2. 1999.

Icicles: Self—Tuning Samples for Approximate Query Answering Written by: Venkatesh Ganti, Mong Li Lee Raghu Ramakrishnan Department of Computer Sciences University Of Wisconsin—Madison Proceedings of the 26$^{th}$ VLDB Conference, Cairo Egypt 2000.

Self-Tuning Histograms: Histograms Without Looking at Data Written by: Ashraf Aboulnaga Computer of Science Department University of Wisconsin Madison , Surajit Chaudhuri MicroSoft Research. 1999.

Query Estimation Techniques in Database Systems *Dissertation Zur Erlang de Grades Doktor der Ingenieurwissenschaften (Dr.-Ing.) der Naturwissenschaftlich- Technischen Fakultat 1 Der Universitat des Saarlandes von Diplom-Informatiker* By: Arnd Christian Konig Saarbrucken im Dezember 2001 p. 1-94.

(Continued)

*Primary Examiner*—Etienne P LeRoux
(74) *Attorney, Agent, or Firm*—Mark M. Friedman

(57) ABSTRACT

Apparatus, methods and computer code for estimating a synopsis error are disclosed herein. In some embodiments, one or more queries of a query workload are analyzed without running the analyzed queries. In some embodiments, the synopsis error is first estimated for a first memory allocation vector, and then, using intermediate or final results of the first estimated, estimated for a second memory allocation vector. In some embodiments, teachings related to estimating synopsis error are applied to the memory reconciliation problem.

28 Claims, 37 Drawing Sheets

OTHER PUBLICATIONS

Global Optimization of Histograms H.V. Jagadish , Hui Jin, Beng Chin Ooi , Kian Lee Tan . 2001.

Automatic Tuning of Data Synopses by: Arnd Christian Konig , Gerard Weikum Microsoft Researcg , One Microsoft way Redmond. WA 98052 and Dept of Computer Science University of Saarland Saarbrucker Germany pp. 1-23. Aug. 2002.

Synopses Reconciliation via Calibration in the T-Synopses System by: Yariv Matia , Yossi Matias ,Leon Portman , School of Computer Science Tel Aviv Unversity. Mar. 2006.

Wavelet—Based Histograms for Selectivity Estimation By Yossi Matias , Dept of computer science Tel Aviv University Israel, Jeffrey Scott Vitter Dept of Computer Science Duke University, Min Wang Dept. of Computer Science Duke University pp. 1-12. Jun. 1998.

The Aqua Approximate Query Answering System by: Swarup Acharya,Phillip B. Gibbons, Viswanath Poosala Sridhar Ramaswamy Information Sciences Research center Bell Laboratories 600 Mountain Ave. Murray Hill NJ pp. 574-576. Jun. 1999.

Synopsis Data Structures for Massive Data Sets By: Phillip B Gibbons and Yossi Matias pp. 1-32 DIMACS Series in Discrete Mathmatics and Theoretical Computer Science. 1999.

Applying the Golden Rule of Sampling for Query Estimation Yi-Leh Wu Divyakant Agrawal Amr El Abbadi Department of Computer Science University of California Santa Barbara pp. 449-460. Jun. 2001.

Fast Incremental Maintenance of Approximate Histograms By: Phillip B. Gibbons, Yossi Matias and Viswanath Poosala Jun. 30, 1997 pp. 1-29.

'ILOG CPLEX 9.0 User's manual Oct. 2003 pp. 1-563.

Online Aggregation By: Joseph Hellerstein Computer Science Division University Of California , Berkley , Peter J. Haas , Almaden Research Center IBM Research Division Helen J Wang Computer Science Division University of California Berkeley. 1997.

Least Squares Fitting from Wolfman Math World www.mathworld.wolfram.com/leastsquaresfitting.html Dec. 31, 2007.

Workload-Based Wavelet Synopses By: Yossi Matias , Leon Portman School of Computer Science Tel Aviv University pp. 1-36 Dec. 2003 rev. Sep. 2005.

* cited by examiner

Compute S211 Synopsis Error $E^1$ for:
a) Set of Relations
b) Set of Synopsis associated with
A first memory allocation vector $$\overline{M^1} = \{m_1^1, m_2^1, \ldots m_N^1\}$$

↓

Derive S215 from Synopsis Error $E^2$
from Synopsis Error $E^1$ (or from
intermediate calculations of step
S211
where Synopsis Error $E^2$ is
associated with a
$$\overline{M^2} = \{m_1^2, m_2^2, \ldots m_N^2\}$$

FIG. 5A

Compute S231 Synopsis Error $E^1$ for a First Set of Relations

Derive S235 from Synopsis Error $E^2$ from Synopsis Error $E^1$ (or from intermediate calculations of step S231) where Synopsis Error $E^2$ is associated with a second Set of relations different From the first set of relations

FIG. 5C

Phase 1:
Get the synopsis type, and a value for e, γ and λ
For each parameter X in (L,Z,Q,R,S) do
  set all the instance-parameters except X to a fixed value
  For X=low..high (Each of the instance-parameters has a range, defined in Section [ ].)
    mE[X] = calcInstanceE(L,Z,Q,R,S) (one of the instance-parameters is X)
  i = index of the parameter X (ranging from 1..5)
  $B_i$ = powerLawFit(mE); (use linear square fitting)
Phase 2:
j=0
do
  (L,Z,Q,R,S) = selectRandomInstance();
  mE = calcInstanceE(L,Z,Q,R,S)
  Add equation: $a_1 L^b{}_1 + a_2 Z^b{}_2 + a_3 Q^b{}_3 + a_4 R^b{}_4 + a_5 S^b{}_5 + a_6 - mE - EEE_j = 0$
  (where $a_1, \frac{1}{4}, a_6$ and $EEE_j$ are the variables.)
  Run solver for linear equations, to calculate $a_i$ by minimizing $åEEE_j{}^2$
  V=[1/n]$åEEE_j{}^2$
  j = j + 1
loop until (V < e) or (j > γ)

FIG. 16

CALIBRATION AND PROFILE BASED SYNOPSES ERROR ESTIMATION AND SYNOPSES RECONCILIATION

FIELD OF THE INVENTION

The present invention relates to systems, apparatus and computer-code for data synopsis error estimation.

BACKGROUND OF THE INVENTION

Measurement of Synopsis Error

As databases continue to grow in size, there is an ongoing need to generate and utilize "data synopses" for efficient approximate query processing. A data synopsis is a concise representation of the data set whose purpose is to effectively enable an approximate result, which is as close as possible to the actual result given some space limitation (physical memory size) in which the data synopsis must reside.

When analyzing the usability of synopses, it is advantageous to derive an effective estimation of the synopsis approximation error, so as to have an informed decision about when it is cost effective to build a synopsis, and how much memory should be allocated to that synopsis.

Some aspects of the present disclosure relate to the following synopsis error estimation problem: Given a data set, a query workload consisting of queries to this data set, an error metric, a synopsis implementation and a space limit, find an efficient method for effectively estimating the approximation error of the synopsis for the given workload and data set.

Some aspects of the present disclosure relate to the synopses reconciliation problem: Given a set of N relations $R=\{R_1 \ldots R_N\}$, a query workload Q comprising queries directed to these relations, a set of synopses types, an error metric, and a space limit, find a combination of data synopses (synopses sizes and synopses types) that will achieve a low approximation error for the given query workload.

There are many situations where a database consists of multiple relations, but only one physical memory resource that has to be shared and partitioned among all the data synopses. The selection of which data synopses to build, their sizes and their types will determine the performance and accuracy of the queries submitted to the data synopses. A basic operation in synopses reconciliation algorithms is estimating the approximation-error of candidate synopses in various combinations that are considered. Existing algorithms use a straightforward error measurement, involving building synopses and running queries against large relations. Measuring the approximation-error is a costly operation, and its execution dominates the running time of these algorithms. Replacing these costly error measurements with an efficient method for estimating the approximation-error, could significantly reduce the running-times of these algorithms.

FIG. 1 describes a prior art technique for measuring the synopsis error—i.e. the difference between the result of queries Q run on the original relations $R=\{R_1 \ldots R_N\}$ and the result of queries Q run on the synopses of the original relations $S=\{S_1 \ldots S_N\}$.

In step S111, the set of synopses and the set of relations $R=\{R_1 \ldots R_N\}$ are provided. In step S115, the query workload Q is run on the relations $R=\{R_1 \ldots R_N\}$ to obtain Q(R). In step S115, the query workload Q is run on the synopses $S=\{S_1 \ldots S_N\}$ to obtain Q(S).

In step S123, the synopses error is computed from Q(R) and Q(S) using some sort of error function. This error function may, for example, include differences between query results for a given query—i.e. the difference between the result when running the query on the relations and the synopses.

One shortcoming of the technique described in FIG. 1 is that typically, step S115 is very resource intense or slow (i.e. due to the need to read many rows of a given table), especially for cases where the tables include million(s) or even billion(s) of rows. In particular, it may be time consuming to run the actual queries on the actual relations.

FIG. 2A provides a flow chart of a related prior art technique for computing synopses error. In the example of FIG. 2, the synopses error is computed for a particular memory allocation candidate C associated with a 'memory allocation vector' $M \{m_1 \ldots m_N\}$ determining the size (i.e. in memory) of each synopses—i.e. synopsis $S_1$ of relation $R_1$ is not allowed exceed a memory size that is $m_1$, synopsis $S_2$ of relation $R_2$ is not allowed to exceed a memory size that is $m_2$, and so on.

Referring to FIG. 2A, after defining S131 the memory allocation candidate C associated with memory allocation vector $M=\{m_1 \ldots m_N\}$, it is possible to compute S133 the synopsis error for the set of relations R for the memory allocation vector M.

It is noted that in S131, each 'component' of the vector M refers to a size of memory and/or a number of memory segments. The variable M (for example, on the right hand side of the inequality of S131) may refer, for example, to a total number of memory segments (for example, memory segments of equal size).

FIG. 2B provides a low chart of a prior art technique for computing S133 synopsis error for the set of relations R for the memory allocation vector M. As shown in FIG. 2B, in the prior art of H. V. Jagadish, H. Jin, B. C. Ooi, and K. L. Tan. Global optimization of histograms. In *SIGMOD* '01, pages 223-234, 2001, a particular set of synopses S whose memory requirements satisfy the specifications of the memory allocation vector M must be generated S135 in order to compute S123 the synopsis error associated with the set of synopses S, the set of relations R, and the query workload Q. Unfortunately, step S135 is also often resource intensive and/or time consuming.

Thus, there is an ongoing need for systems, apparatus and computer code for estimating the synopses error in a manner that is less resource-intensive and/or is more efficient (for example, in a manner that requires fewer row-reads) than known techniques.

Memory Reconciliation

It is noted that synopsis error estimation may be used when determining how to best partition memory space of a given size between different synopses so as to achieve a lower global error for all synopsis. This process, whereby a recommendation for memory partition is generated, is referred to in the present disclosure as 'memory reconciliation.'

FIG. 3 provides a flow chart of a prior art technique for memory reconciliation. Thus, for the jth iteration (i.e. S151 and S163), a jth memory allocation candidate $C^j$ associated a jth memory allocation vector $M^j$, is analyzed. In particular, a synopsis error is computed S133j for the jth memory allocation vector.

It is theoretically possible to use a brute force technique to analyze every possible memory allocation vector $M^j$ whose overall memory 'size' does not exceed M (see the equality in S131j of FIG. 3). Nevertheless, there are known heuristic techniques (for example, defined in H. V. Jagadish, H. Jin, B. C. Ooi, and K. L. Tan. Global optimization of histograms. In SIGMOD '01, pages 223-234, 2001) for judiciously defining the specific memory allocation candidates $C^j$.

Unfortunately, every time step $S133j$ is carried out, several resource intensive and/or time-consuming steps must be carried out—i.e. $S135j$ (i.e. generating the synopses to be tested), and $S115j$ (i.e. running the query workload on the synopses).

It would be highly desirable to have a system, method and computer code for memory reconciliation that requires fewer resources and/or is faster than known techniques.

SUMMARY

Embodiments of the present invention are based, in part, on the surprising discovery that it is possible to estimate a synopsis error (i.e. for a given query workload, a given set of one or more relations and a given set of synopses) for a given set of relations and for a given set of synopses: (i) without actually generating the synopses or an approximation thereof; and (ii) without running queries (i.e. of the query workload) on the relation(s) and/or the synopses.

Instead, in some embodiments, it is possible to calculate a synopses-dependent error estimation function by carrying out two computational processes. According to the first process, a genetic function is constructed (for example, using a random number generator or pseudo-random number generator) using a so-called 'synthetic data set'—i.e. a data set whose content is not required to depend on the relations or on the particular queries. In the present disclosure, the process whereby fits generic function (or set of functions) is created is referred to as 'calibration.' It is possible to implement the calibration process, which does not need to involve the actual data of the relations and does not need to involve the actual queries, as a pre-processing stage.

According to the second process, referred to in the present disclosure as a 'profiling process,' one or more functions indicative of the characteristics of hie relations (i.e. profiling the 'relations') and/or the query workloads (i.e. profiling the queries) is computed. The synopsis error depends on the results of first 'calibration' process carried out with the synthetic data set and the second 'profiling process carried out using the actual query workload and the actual relations.

One particular type of function of the query workload is a function of range parameters of the query workload. In particular, for each individual query of at least some queries of the workload, at least one parameter related to the range of the query is determined—for example, a lower bound of the range, an upper bound of the range, or a difference between an upper and lower bound. When the range specified by a given query does not extend over all possible values of a given field for a given relationship, the range parameter is referred to as a partial range parameter. Exemplary functions of partial range parameters include but are not limited to functions of central tendency of range parameters, dispersion functions of range parameters, and functions indicative of higher-order statistical moments of range parameters.

Surprisingly, the functions of the query workload are useful, even for situations where certain 'analyzed' queries are run on the relations and/or on the synopses. This obviates the need to run expensive queries on the relations in order to determine a synopsis-relation error.

The technique of analyzing queries without running queries in order to computer an estimated synopsis error is also useful in situations where the queries serve as 'filters' to select a 'sub-plurality' of rows from a plurality of rows in a given relation. Thus, it may be useful to analyze filter criteria defined by the queries—for example, range values associated with filters, fields associated with filters, etc. It is possible to compute the estimated synopsis in accordance with the results of the query analysis without running the actual queries (or using the query results on the relations).

Furthermore, it is now disclosed that it may be useful to compute a dispersion function or a query dispersion skew function or a data dispersion skew function (or higher-order statistical moment function) of one or more relations or queries during the 'profiling process,' and to estimate synopsis error in accordance with the computed dispersion function or distribution skew function (or higher-order statistical moment function). Surprisingly, the aforementioned dispersion or skew function (or higher-order statistical moment) function is useful for estimating synopsis-relation error even in situations where the actual synopses (or approximations thereof) are not generated and are not used. This obviates the need to generate the synopses and/or run queries on the relations.

It is noted that the aforementioned technique for synopsis error estimation is useful when determining how to partition memory space between different synopses so as to achieve a lower global error for all synopsis. This process, whereby a recommendation for memory partition is generated, is referred to in the present disclosure as 'memory reconciliation.'

A Brief Discussion of Techniques for Computing Synopsis Error by Analyzing the Content of Queries Without the Need to Run Certain Queries In accordance with one aspect, it is now disclosed for the first time a method for computing an estimated synopsis error associated with a plurality of data relations, a query workload, and a plurality of data synopses of the data relations, the method comprising: a) storing in memory descriptions of: i) the plurality of data relations; and ii) the query workload; and b) computing the estimated synopsis error from the stored description of the plurality of data relations and from the stored description of the query workload, wherein the computing includes: i) determining, for each query of at least some queries of the query workload, a respective indication of respective filtering criteria for each query; and ii) estimating, in accordance with the respective determined filtering criteria, and without using query results on the data relations for all queries of the at least some queries, the synopsis error associated with the plurality of data relations, the query workload, and the plurality of data synopses.

According to some embodiments, the estimating is carried out in accordance with the determined query filtering criteria is carried out in accordance with at least one computed function selected from the group consisting of: i) a query range function; ii) a query dispersion function; iii) a query central tendency function and iv) a query distribution skew function.

According to some embodiments, for each query, the determining of the respective query filtering criteria includes determining a respective indication of a respective query filter field set associated with each query.

According to some embodiments, for each query, the determining of the respective query filtering criteria includes determining a respective indication of a respective query filter value set associated with each query.

According to some embodiments, the estimating is carried out in accordance with the determined query filtering criteria is carried out in accordance with at least one of: i) a query range function of content of the determined query filter value sets; ii) a query dispersion function of content of the determined query filter value sets; iii) a query central tendency function of content of the determined query filter value sets;

and iv) a query distribution skew function of content of the determined query filter value sets.

In accordance with another aspect, it is now disclosed for the first time an apparatus for computing an estimated synopsis error associated with a plurality of data relations, a query workload, and a plurality of data synopses of the data relations, the apparatus comprising a) a data storage operative to store representations of: i) the plurality of data relations; and ii) the query workload; and b) a synopsis error estimation engine operative to: i) determine, for each query of at least some queries of the query workload, a respective indication of respective filtering criteria for each query; and ii) estimate the synopsis error in accordance with the: A) respective determined filtering criteria; and B) the stored representation of the plurality of data relations, without using query results on the data relations for all queries of the at least some queries.

For the present disclosure, the term 'data storage' may include any combination of volatile and/or non-volatile memory (for example, persistent storage including but not limited to magnetic media and flash memory). The 'data storage' may reside on a single machine, or may be 'distributed' over a plurality of machines, and may be deployed in any architecture.

According to some embodiments, the synopsis error estimation engine is operative such that the estimating is carried out in accordance with the determined query filtering criteria is carried out in accordance with at least one of: i) a query range function; ii) a query dispersion function; iii) a query central tendency function; and iv) a query distribution skew function.

According to some embodiments, the synopsis error estimation engine is operative such that, for each query, the determining of the respective query filtering criteria includes determining a respective indication of a respective query filter field set associated with each query.

According to some embodiments, the synopsis error estimation engine is operative such that, for each query, the determining of the respective query filtering criteria includes determining a respective indication of a respective query filter value set associated with each query.

According to some embodiments, the synopsis error estimation engine is operative such that the estimating is carried out in accordance with the determined query filtering criteria is carried out in accordance with at least one of: i) a query range function of content of the determined query filter value sets; ii) a query dispersion function of content of the determined query filter value sets; iii) a query central tendency function of content of the determined query filter value sets; and iv) a query distribution skew function of content of the determined query filter value sets.

A Brief Discussion of Techniques where Synopsis Errors are Computed for Multiple Sets of Input Parameters where Results of Earlier Synopsis Error Estimations are Re-Used for Latter Synopsis Error Computations According to some aspects of the present invention, it is possible to compute estimated synopsis errors for multiple circumstances, where the results of a 'first' synopsis estimation (i.e. associated with a 'first' set of input parameters—i.e. a 'first' memory allocation vector and/or a 'first' query workload and/or a 'first' set of relations) are re-used when computing the synopsis error for a 'second' set of input parameters (i.e. when at least one of the memory allocation vector, the query workload and the relations are different).

According, to some embodiments, it is now disclosed for the first time a method of computing a first estimated synopsis error $E^1$ and a second estimated synopsis error $E^2$ for a plurality of N relations $R=\{R_1, R_2 \ldots R_N\}$, the first estimated synopsis error $E^1$ associated with a first set of synopses $S^1=\{S_1^1, S_2^1, \ldots, S_N^1\}$, the second estimated synopsis error $E^2$ associated with a second set of synopses $S^2=\{S_1^2, S_2^2, \ldots S_N^2\}$ (i.e. different from the first set of synopses), each synopsis $S_i^1$ of the first synopsis set and each synopsis $S_i^2$ of the second synopsis set associated with a respective ith relation $R_i$, the method comprising:

a) computing $E^1$, for a first allocation memory vector $$\overline{M^1} = \{m_1^1, m_2^1, \ldots m_N^1\} \qquad \text{i)}$$

where:

$$\sum_{i=1}^{N} m_i^1 = M^1 \qquad \text{ii)}$$

for an ith relation $R_i$, each $m_i^1$ represents a respective amount of memory allocated for a respective synopsis $S_i^1$ of the first synopsis set; b) using at least one of: i) the computed first estimated synopsis error $E^1$; and ii) stored intermediate results (for example, computed profiles of relations and/or query workloads) of associated with the computing of $E^1$, c) computing $E^2$ for a second memory allocation vector $$\overline{M^2} = \{m_1^2, m_2^2, \ldots m_N^2\}, \qquad \text{i)}$$

$$\sum_{i=1}^{N} m_i^2 = M^2 \qquad \text{ii)}$$

for an ith relation $R_i$, each $m_i^2$ represents a respective amount of memory allocated for a respective synopsis $S_i^2$, of the second synopsis set, wherein $M^1 \neq M^2$.

In accordance with another aspect, it is now disclosed for the first time an apparatus for computing a first estimated synopsis error $E^1$ and a second estimated synopsis error $E^2$ for a plurality of N relations $R=\{R_1 R_2 \ldots R_N\}$, the first estimated synopsis error $E^1$ associated with a first set of synopses $S^1=\{S_1^1, S_2^1, \ldots S_N^1\}$, the second estimated synopsis error $E^2$ associated with a second set of synopses $S^2=\{S_1^2, S_2^2, \ldots S_N^2\}$, each synopsis $S_i^1$ of the first synopsis set and each synopsis $S_i^2$ of the second synopsis set associated with a respective ith relation $R_i$, the apparatus comprising: a) a data storage operative to store representations of a first memory allocation vector $\overline{M^1}=\{m_1^1, m_2^1, \ldots m_N^1\}$ and a second memory allocation vector $\overline{M^2}=\{m_1^2, m_2^2, \ldots m_N^2\}$ wherein:

i) each $m_i^1$ represents a respective amount of memory allocated for a respective synopsis $S_i^1$ of the first synopsis set;

ii) each $m_i^2$ represents an amount of memory allocated for a respective second synopsis $S_i^1$ associated with the ith relation $R_i$;

$$\sum_{i=1}^{N} m_i^1 = M^1 \qquad \text{iii)}$$

$$\sum_{i=1}^{N} m_i^2 = M^2 \qquad \text{iv)}$$

and v) $M^1 \neq M^2$; and b) a synopsis error estimation engine operative to: i) compute the first synopsis error $E^1$ for the first allocation memory vector $\overline{M^1}$; ii) compute the second synopsis error $E^2$ for the first allocation memory vector $\overline{M^2}$; using one of:

A) the computed first estimated synopsis error $E^1$; and B) stored intermediate results (for example, computed profiles of relations and/or query workloads) associated with the computing of $E^1$.

In accordance with another aspect, it is now disclosed for the first time a method of computing, for a plurality of N relations $\{R_1, R_2 \ldots R_N\}$, a first estimated synopsis error $E^1$ associated with a first query workload $Q^1$ and a second estimated synopsis error $E^2$ associated with a second query workload $Q^2$ different from $Q^1$, the method comprising:

a) computing $E^1$ for the first query workload $Q^1$; and b) using at least one of: i) the estimated synopsis error $E^1$ ii) stored intermediate results (for example, computed profiles of relations) associated with the computing of $E^1$, computing $E^2$ for the second query workload $Q^2$ which is different from the first query workload $Q^1$.

In accordance with another aspect, it is now disclosed for the first time an apparatus for computing, for a plurality of N relations $\{R_1, R_2 \ldots R_N\}$, a first estimated synopsis error $E^1$ associated with a first query workload $Q^1$ and a second estimated synopsis error $E^2$ associated with a second query workload $Q^2$ different from $Q^1$, the apparatus comprising:

a) a data storage operative to store representations of the first query workload $Q^1$ and the second query workload $Q^2$ which is different from the first query workload $Q^1$;

b) a synopsis error estimation engine operative to: i) compute the first synopsis error $E^1$ for the first query workload $Q^1$; and ii) compute the second synopsis error $E^2$ for the second query workload $Q^2$ using at least one of: A) the computed estimated synopsis error $E^1$; and B) stored intermediate results (for example, computed profiles of relations) associated with de computing of $E^1$.

In accordance with another aspect, it is now disclosed for the first time a method of computing, a first estimated synopsis error $E^1$ associated with a first plurality of relations, and a second estimated synopsis error $R^2$ associated with a second plurality of relations different from the first plurality of N relations, the method comprising:

a) computing $E^1$ for the first plurality of relations; b) using at least one of: i) the computed estimated synopsis error $E^1$ ii) stored intermediate results (for example, computed profiles of a query workload) associated with the computing of $E^1$, computing $E^2$ for the second plurality of relations which is different from the first plurality of relations.

In accordance with another aspect, it is now disclosed for the first time an apparatus for computing a first estimated synopsis error $E^1$ associated with a first plurality of relations, and a second estimated synopsis error $R^2$ associated with a second plurality of relations different from the first plurality of N relations, the apparatus comprising: a) a data storage operative to store representations of the first plurality of relations and the second plurality of relations which is different from the first plurality of relations; b) a synopsis error estimation engine operative to:

a) compute $E^1$ for the first plurality of relations; b) compute $E^2$ for the second plurality of relations which is different from the first plurality of relations using at least one of: i) the computed estimated synopsis error $E^1$ ii) stored intermediate results (for example, computed profiles of relations) associated with the computing of $E^1$.

A Discussion of Techniques Associated with Computing the Synopsis Error in 'Multiple Stages'—i.e. in a Calibration Stage and a Profiling Stage In accordance with another aspect, it is now disclosed for the first time a method of estimating a synopsis error for target relation data, the method comprising: a) providing an at least partially random data set; b) providing a synopsis of the at least partially random data set; c) after the providing of the at least partially random data set and the synopsis, receiving the target relation data; and d) in accordance with: (i) the provided at least partially random data set; (ii) the provided synopsis of the at least partially random data set; and (iii) the target relation set, computing a synopsis error estimation function for the target relation data.

In accordance with another aspect, it is now disclosed for the first time a method of estimating a synopsis error for target relation data, the method comprising: a) selecting a functional form for an error function, the functional form associated with a plurality of function coefficients; b) effecting an off-line calibration procedure, the calibration procedure including: i) generating synthetic relations (i.e. as opposed to the 'real' relations for which we are computing the synopsis error) using a random number generation procedure; ii) computing a synopsis of the generated synthetic relations; and iii) deriving the plurality of function coefficients from the computed synopsis of the generated synthetic relations; c) after the off-line calibration procedure, receiving the target relation data; d) computing a profile of the target relation data (for example, a function indicative of a range or dispersion or any other parameter of the target relation data), and e) estimating the synopsis error by using: i) the derived plurality of function coefficients; and ii) results of the profiling.

Additional Techniques Associated with Estimated Synopsis Error

In accordance with another aspect, it is now disclosed for the first time a method of computing a estimated synopsis error E associated with a plurality of N relations $\overline{R} = \{R_1, R_2, \ldots R_N\}$ and a plurality of N synopses $\overline{S} = \{S_1, S_2, \ldots S_N\}$, the ith synopsis associated with the ith relation, the method comprising: a) computing at least one profiling function selected from the group consisting of: i) a dispersion function; and ii) a data distribution skew function; for at least one relation of the plurality of N relations; b) deriving the estimated synopsis error E from the at least one computed profiling function, wherein the method is carried out without computing the plurality of N synopses $\overline{S} = \{S_1, S_2, \ldots S_N\}$ or an approximation thereof.

In accordance with another aspect, it is now disclosed for the first time an apparatus for computing a estimated synopsis error E associated with a plurality of N relations $\overline{R} = \{R_1, R_2, \ldots R_N\}$ and a plurality of N synopses $\overline{S} = \{S_1, S_2, \ldots S_N\}$, the ith synopsis associated with the ith relation, the method comprising: a) a data storage operative to store a representation of the plurality of N relations $\overline{R} = \{R_1, R_2, \ldots R_N\}$; and b) a synopsis error estimation engine operative to: i) compute at least one profiling function selected from the group consisting of: A) a dispersion function; and B) a data distribution skew function; for at least one relation of the plurality of N relations; and ii) derive the estimated synopsis error E from the at least one computed profiling function, wherein the synopsis error estimation engine is operative to carry out the computing of the at least one profiling function and the deriving of the estimated synopsis error E without computing the plurality of N synopses $\overline{S}=\{S_1, S_2, \ldots S_N\}$ or an approximation thereof.

In accordance with another aspect, it is now disclosed for the first time a method of computing a estimated synopsis error E associated with a plurality of N relations $\overline{R}=\{R_1, R_2, \ldots R_N\}$ and a plurality of N synopses $\overline{S}=\{S_1, S_2, \ldots S_N\}$, the ith synopsis associated with the ith relation, where $row_i$ is the number of rows in the ith relation, the method comprising:

a) computing a profiling function of the plurality of N relations including at least one of: i) a data dispersion function; and ii) a data distribution skew function, and b) deriving the estimated synopsis error E from the computed profiling function, wherein the method is carried out without effecting out more than $$0.00001 * \sum_{i=1}^{N} row_i$$

row read operations and without effecting more than 100*N row read operations.

In accordance with another aspect, it is now disclosed for the first time an apparatus for computing a estimated synopsis error E associated with a plurality of N relations $\overline{R}=\{R_1, R_2 \ldots R_N\}$ and a plurality of N synopses $\overline{S}=\{S_1, S_2, \ldots S_N\}$, the ith synopsis associated with the ith relation, where $row_i$ is the number of rows in the ith relation, the apparatus comprising: a) a data storage operative to store a representation of the plurality of N relations $\overline{R}=\{R_1, R_2, \ldots R_N\}$; and b) a synopsis error estimation engine operative to: i) compute at least one profiling function selected from the group consisting of:

A) a data dispersion function; and B) a data distribution skew function; for at least one relation of the plurality of N relations; and ii) derive the estimated synopsis error E from the at least one computed profiling function, wherein The synopsis error estimation engine is operative to carry out the computing of the at least one profiling function and the deriving of the estimated synopsis error E without effecting out more than $$0.00001 * \sum_{i=1}^{N} row_i$$

row read operations and without effecting more than 100*N row read operations.

Embodiments of the present invention provide apparatus for carrying out any disclosed method.

Embodiments of the present invention provide computer readable medium comprising program instructions, wherein when executed the program instructions are operable to carry out any disclosed method.

These and further embodiments will be apparent from the detailed description and examples that follow.

BRIEF DESCRIPTION OF THE DRAWINGS

FIG. 5A describes a technique for estimating: a first synopsis error associated with a first memory allocation vector and a second synopsis error associated with a second memory allocation vector in accordance with some embodiments of the present invention.

FIG. 5C describes a technique for estimating: a first synopsis error associated with a first set of relations and a second synopsis error associated with a second set of relations in accordance with some embodiments of the present invention.

FIG. 16 describes pseudo-code of the calibration process. The output of the first phase consists of the power-law coefficients b1, ¼, b5 and the output of the second phase consists of the weight coefficients a1, ¼, a6.

Figure 1:
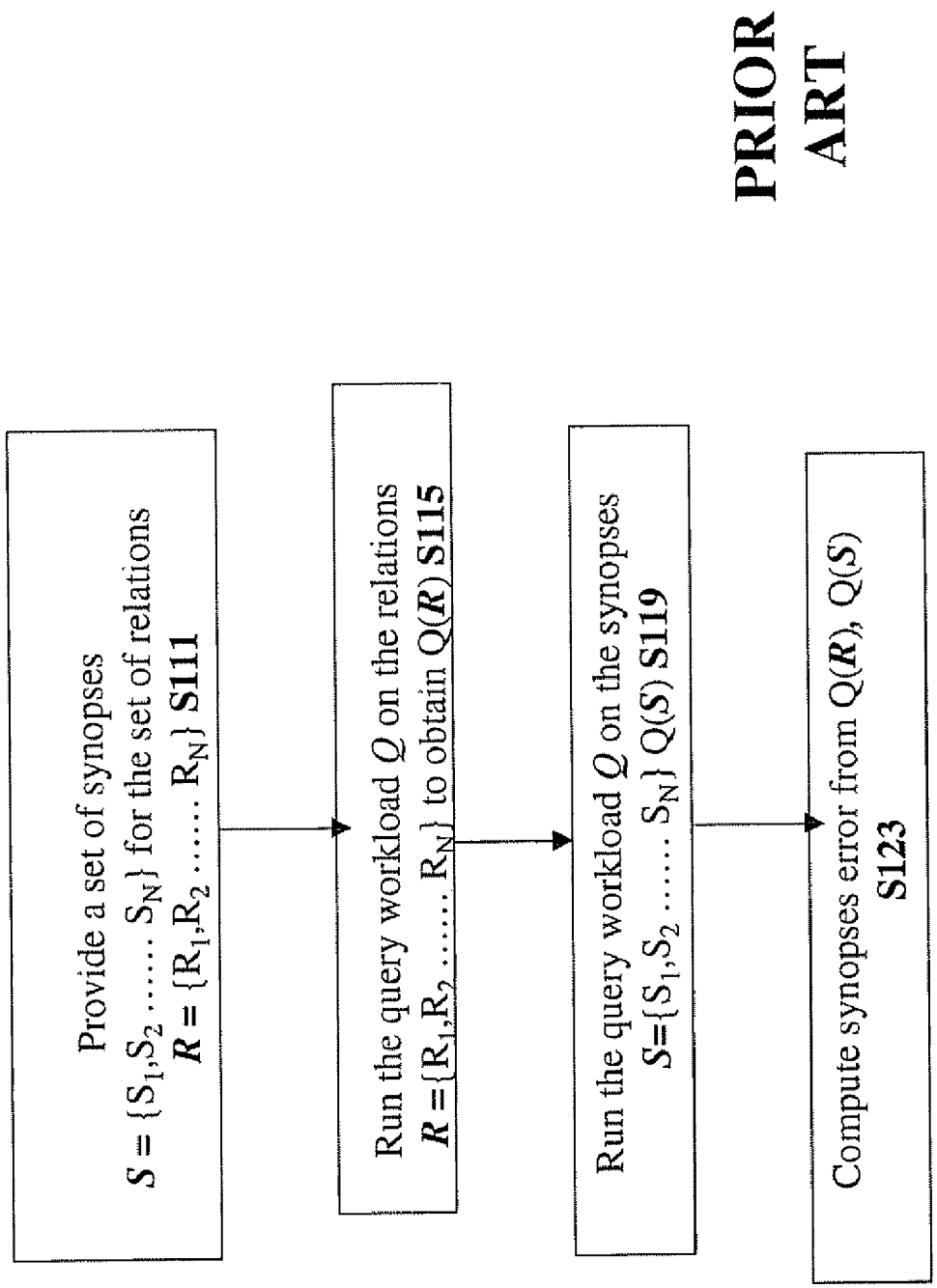
FIGS. 1, 2A-2B describes prior art routines for computing synopsis error.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the invention is to cover all modifications, equivalents and alternatives falling within the spirit and scope of the present invention. As used throughout this application, the word "may" is used in a permissive sense (i.e., meaning "having the potential to'), rather than the mandatory sense (i.e. meaning "must").

DETAILED DESCRIPTION OF EMBODIMENTS

The present invention will now be described in terms of specific, example embodiments. It is to be understood that the invention is not limited to the example embodiments disclosed. It should also be understood that not every feature of the presently disclosed apparatus, device and computer-readable code for synopsis error estimation and/or for reconciliation is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another being performed first. It is noted that any disclosed component may be implemented in hardware, software or any combination thereof.

The present inventors are now disclosing a technique for estimating a search synopsis error associated with: (A) a set of relations $R=\{R_1 \ldots R_N\}$; (B) a set of synopses $S=\{S_1 \ldots S_N\}$ (i.e. where each synopsis is a synopsis of a respective relation); and (C) optionally, a query workload Q specifying a plurality of queries directed to the set of relations.

Surprisingly, there is no need to: (i) generate the synopsis or an approximation thereof; (ii) run queries on the relations;

and (iii) run queries on the synopses. Thus, in some embodiments, the presently-disclosed techniques are 'low-read' techniques requiting only a small number of row reads from the relations. This allows for a technique that is 'fast' and/or uses fewer computational resources.

Instead of running expensive queries and/or generating relations, it is sufficient to: (i) carry out a so-called 'calibration' technique using 'synthetic data' or 'synthetic relations'—i.e. data that need not depend on the relations and need not depend on the query workload; (ii) carry out a 'light-footprint' or relatively low-read profiling technique of the query workload and the relations.

Because the calibration process does not require the relations and the query workload as input, it is possible to effect the calibration as a 'pre-processing' step—or example, as a device configuration step that is carried out 'in the factory' and is valid once for the lifetime of the device.

During the profiling process, on the other hand, an indication of the relations $R=\{R_1 \ldots R_N\}$ and/or an indication of the query workload is processed.

Figure 4:
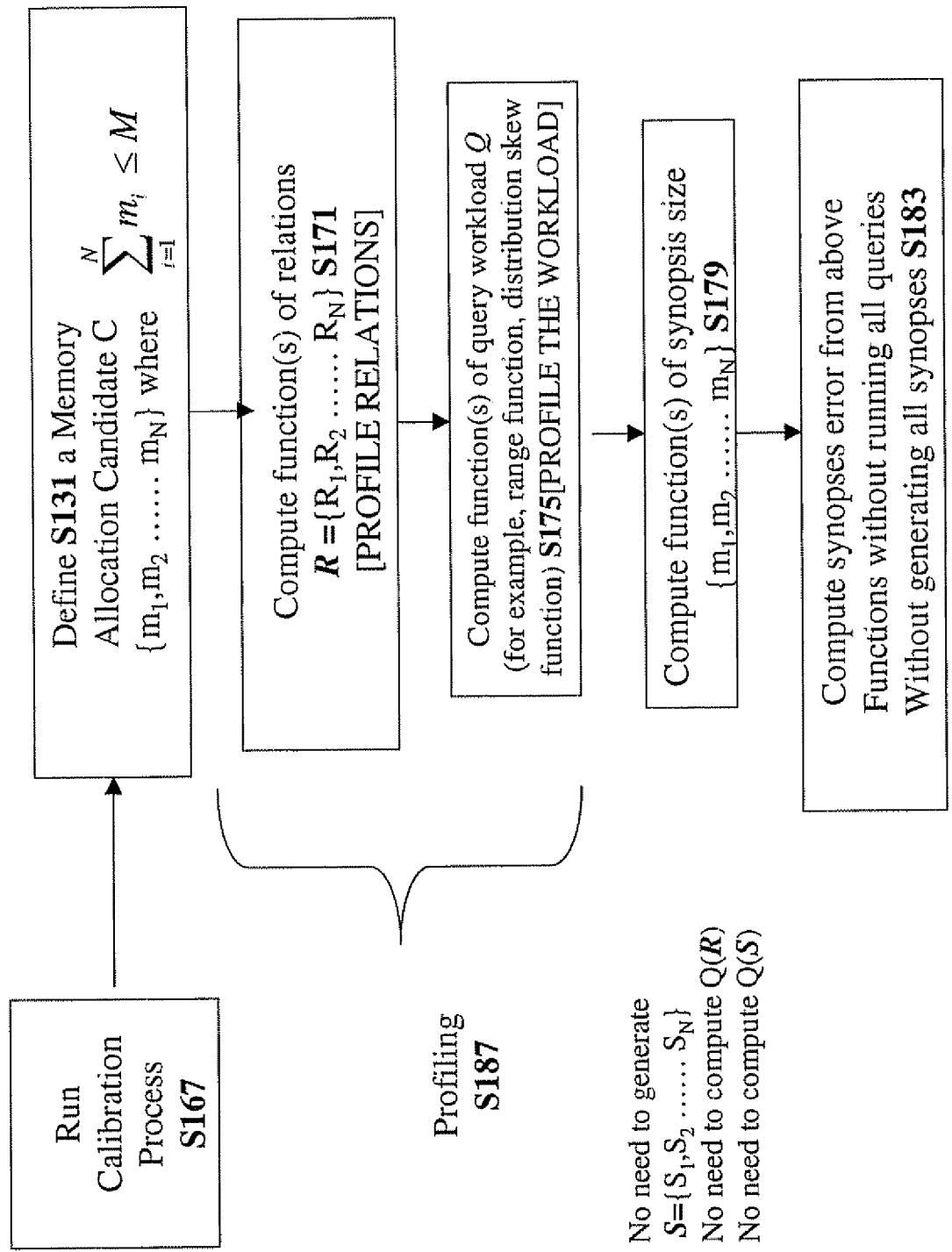
FIG. 4 describes a technique for estimating synopsis error in accordance with some embodiments of the present invention.

FIG. 4 provides a flowchart of an exemplary technique for computing synopsis error for A) a set of relations $R=\{R_1 \ldots R_N\}$; (B) a set of synopses $S=\{S_1 \ldots S_N\}$ (i.e. where each synopsis is a synopsis of a respective relation); and (C) a query workload Q specifying a plurality of queries directed to the set of relations In FIG. 4, the calibration process S167 is run using so-called 'synthetic' data. Because the calibration process does not require the relations and does not require the query workload, it is possible to carry this out in a pre-processing stage or 'offline.'

In step S133 a memory allocation candidate associated with a memory allocation vector (i.e. where the total memory does not exceed M) is defined.

Skipping ahead to step S183, it is noted that the synopsis may be computer without running all of the queries and without generating all of the synopses.

In one non-limiting example, for example related to the function defined in equation (1) of Theoretical Section 2.1. The Error-Estimation Function (i.e. as provided in the latter section), a generic functional form is provided, and the coefficients (the 'a' coefficients for the specific example of equation (1) of Theoretical Section 2.1) are computed during the calibration process S167.

In the non-limiting example of equation (1), parameters 'L' and 'Z' are computed when profiling the relations S171. It is noted that 'Z' is just one particular example of a 'relations skew' function (i.e. a third statistical moment). Other examples relate to indications of second order statistical moments or 'data dispersion functions' or functions indicative of higher or statistical movements.

In the non-limiting example of equation (1), Q and R are computed when profiling the workload S175. It is noted that there is no specific requirement to profile the workload, and in some embodiments, a pre-determined 'generic' workload is used. Nevertheless, it is noted that there are situations where the accuracy of the estimation of the synopsis error may be improved when utilizing the workload and profiling the workload.

In step S179, a function of the size of the synopsis (or a function of memory allocation vector) is computed. In the example of equation (1), this function relates to the 'S' parameter.

Figure 2A:
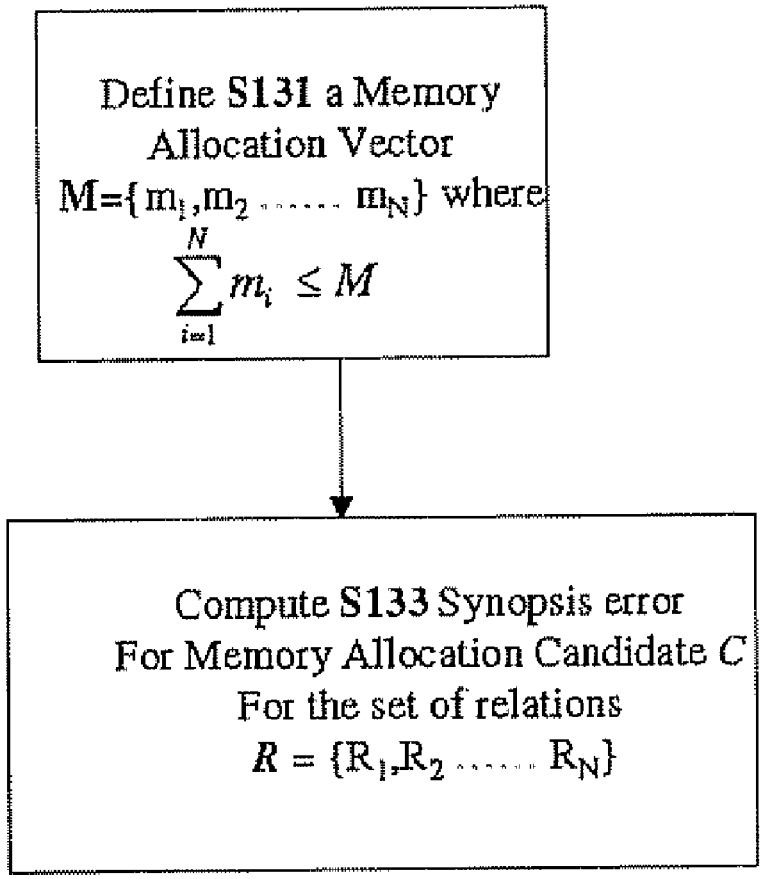
Figure 2B:
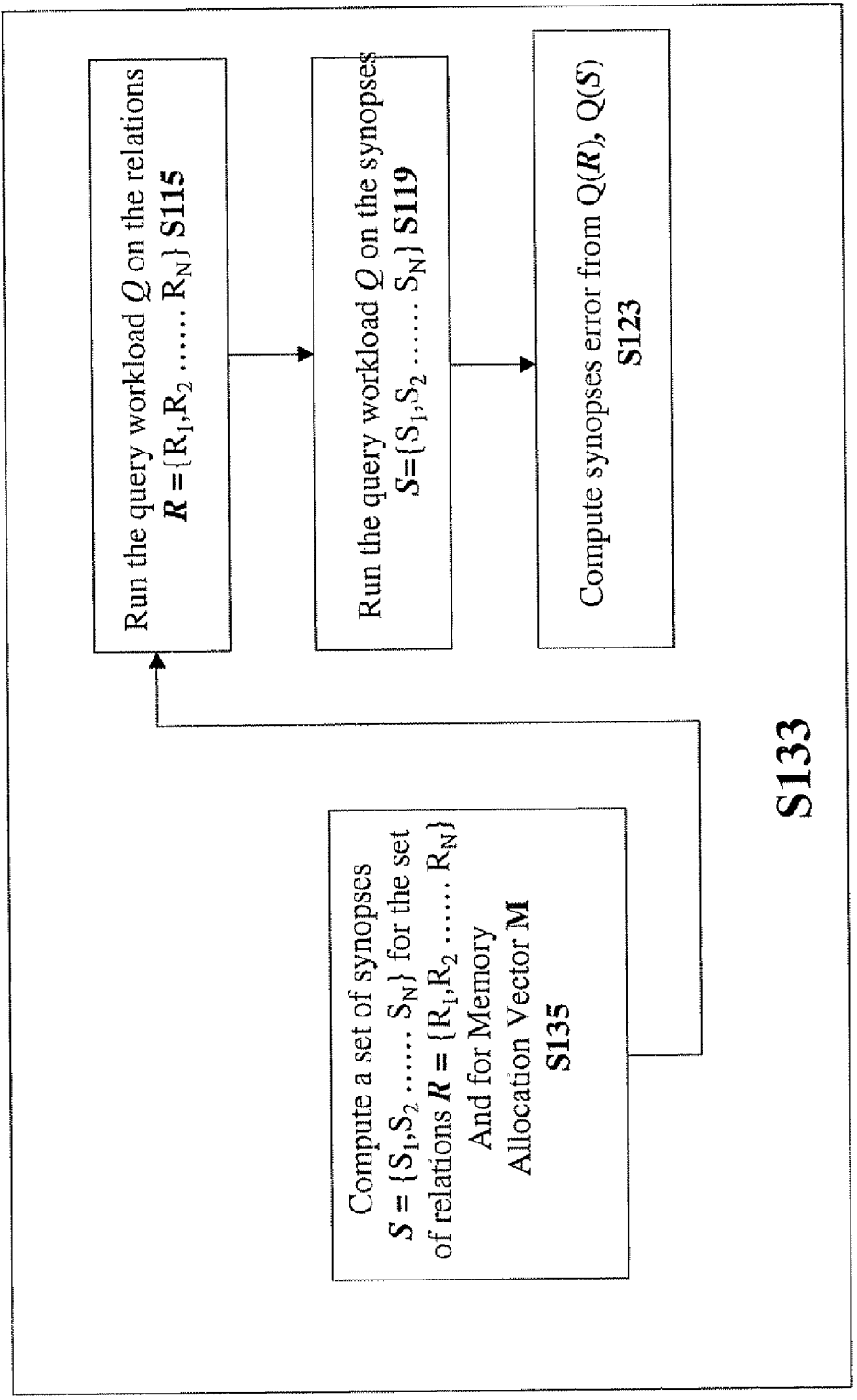
Figure 3:
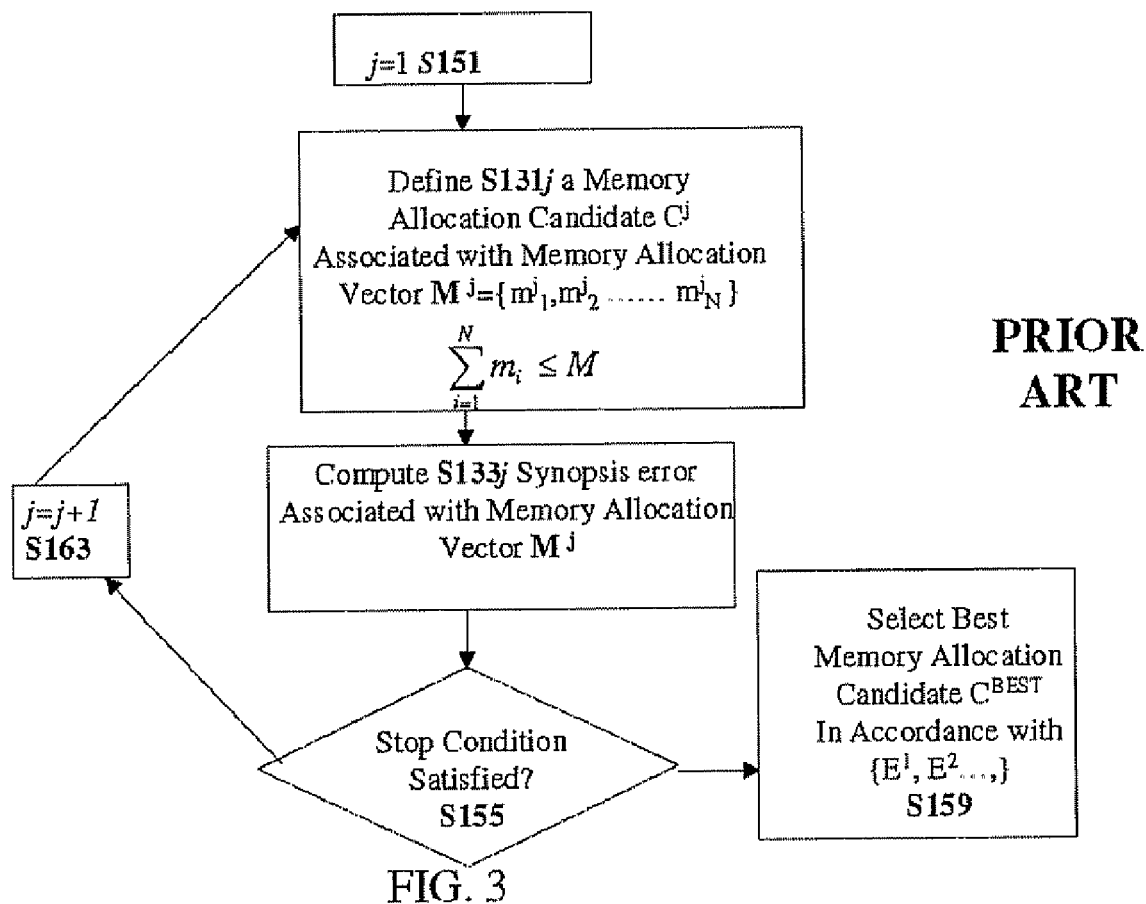
FIG. 3 describes a prior art memory reconciliation technique.

Unlike the techniques described in FIGS. 1-3, for the technique described in FIG. 4, there is no need to provide or generate a representation of the actual synopses $S=\{S_1 \ldots S_N\}$. Rather, it is sufficient to specify S131 a synopses size vector $m_1 \ldots m_N$ where each $m_i$ specifies a respective synopses size or allocated memory. In the example of FIG. 4, the total memory size is less than or equal to some overall size M.

In accordance with these specific functions, it is possible to compute S183 an estimated synopsis error without: (i) running the query workload and/or any portion thereof on the relations and/or synopses; (ii) generating the synopses and/or providing a representation of the actual synopses.

Functions Used in Profiling S187

It is stressed that equation (1) of Theoretical Section 2.1 is just one example of a technique for computing synopsis error in accordance with FIG. 4. Different examples of the specific 'profiling' functions computed in steps S171 and S175 are now provided.

In one example, one or more 'central tendency' functions (for example, including but not limited to mean, median and the like) of data of one or more relations are computed in step S171. These 'central tendency' functions relate to the first statistical moment of data of one or more of the relations $R=\{R_1 \ldots R_N\}$.

In yet another example, one or more 'data dispersion' functions providing an indication of a magnitude of data distribution around a central value (for example, including hut not limited to a Zipf function and a standard deviation function) of data of one or more relations are computed in step S171. These 'data dispersion' functions relate to the second statistical moment of data of one or more of the relations $R=\{R_1 \ldots R_N\}$.

In yet another example, one or more 'data skew' functions providing an indication of a magnitude of data skew of data of one or more relations are computed in step S171. These 'data skew' functions relate to the third statistical moment of data of one or more of the relations $R=\{R_1 \ldots R_N\}$ It is appreciated, that in some embodiments, higher order (i.e. $4^{th}$ moment or greater) functions may be computed. Furthermore, it is appreciated that in some embodiments, some combination of the aforementioned functions) is computed.

A Discussion of Profiling the Query Workload S175; A Discussion of Filtering Criteria In some embodiments, the 'profiling of the query workload' S175 is one example of computing a function of the 'filtering criteria' of a set of queries.

It is noted that a 'query' for a given target (i.e. one or more relations, one or more summaries, etc) provides a specification of a sub-plurality of stored rows selected from a given plurality of stored rows—i.e. the query provides 'filtering criteria.' As used herein, 'filter criteria' refers to one or more of (i) a list of one or more fields of the filter criteria—i.e. a 'filter field set' of one or more fields and (ii) a list of one or more values specified for the fields—i.e. one or more 'filter values' of a 'filter value set' (iii) a relationship between one or more filter fields and one or more filter values. It is noted that the filter criteria may refer to a single relationship or may refer to more than one relationship.

EXAMPLE "select count(*) from employees where salary>13000 and birth_day='December 13' and last_name like 'Smi %'".

For this example, the 'query filter field set' is {salary, birth_day,last_name} and the 'query value set' is {1300,"Smi"}. For the case of a sting, the value set may, in some examples, refer to a hash value of the sting.

Although the aforementioned example refers to a query on a single table or relationship, it is appreciated that filtering criteria (and in particular, filter field sets and/or filter value sets) of queries directed to a plurality of tables or relationships may be analyzed—in particular, without running one or more of the analyzed queries.

As used herein, an indication of a 'query filter field set' is an indication of one or more elements of the field set and/or a cardinality of the field set. As used herein, an indication of a 'query filter value set' is an indication of one or more elements of the value and/or a cardinality of the value set.

Typically, the query workload includes different queries where each query that has different respective filter criteria (for example, different respective filter value sets and/or filter field sets) specified by the query.

It is now disclosed that when computing synopsis error, it is useful to: (i) determine, for each given query of at least a sub-set of the query workload, a respective filter value set for the given query; (ii) to compute a function of the determined filter value sets (for example, a range function or a distribution skew function); and (iii) to estimate the synopsis error in accordance with the computed function of the determined filter value sets.

In one example, one or more 'central tendency' functions (for example, including but not limited to mean, median and the like) of data of the determined search value sets (i.e., for each query) are computed in step S175. These 'central tendency' functions relate to the first statistical moment of data.

In yet another example, one or more 'data dispersion' functions providing an indication of a magnitude of data distribution around a central value (for example, including but not limited to a Zipf function and a standard deviation function) of data of the determined search value sets (i.e. for each query) are computed in step S175. These 'data dispersion' functions relate to the second statistical moment of data of the determined search value sets (i.e. for each query).

In yet another example, one or more 'data distribution skew' functions providing an indication of a magnitude of data distribution skew of data of one or more relations are computed in step S171. These 'data distribution skew' functions relate to the third statistical moment of data of the determined search value sets (i.e. for each query).

It is appreciated, that in some embodiments, higher order (i.e. $4^{th}$ moment or greater) functions may be computed. Furthermore, it is appreciated that in some embodiments, some combination of the aforementioned function(s) is computed.

A Brief Discussion of Techniques where Synopsis Errors are Computed for Multiple Circumstances of Input Parameters where Results of Earlier Synopsis Error Estimations are Re-Used for Latter Synopsis Error Computations Once again, referring to the non-limiting example of equation (1) of Theoretical Section 2.1, it is noted that the synopsis error function includes different components: (COMPONENT A) a component that depends exclusively on the results of profiling the relations and that is independent of the query workload and the size of the synopses (and the synopsis themselves) (i.e. the first two terms of the polynomial on the right hand side of equation (1) associated with the 'L' and the 'Z' terms); (COMPONENT B) a component that depends exclusively on the results of profiling the query workload (i.e. the third and fourth terms of the polynomial on the right hand side of equation (1) associated with the 'Q' and 'R' terms) and that is independent the relations and the size of the synopses; and (COMPONENT C) a component that depends only on the size of the synopses and that is independent of the relations and the query workload (i.e. the fifth term of the polynomial on the right hand side of equation (1) associated with the 'S' term).

The present inventors have thus noted that when computing synopsis error for a plurality of circumstances, it is possible, surprisingly, to reuse results associated with 'earlier' estimated synopsis computations (i.e. for a 'first' estimated synopsis computation for a first set of circumstances or first set of input parameters) when effecting an additional estimated synopsis computation (i.e. for a 'second' estimated synopsis computation for a second set of circumstances of a second set of input parameters).

This concept is explained with reference to: (i) synopsis size with reference to FIG. 5A; (ii) query workload with reference to FIG. 5B; (iii) the relations themselves with reference to FIG. 5C.

Thus, referring to FIG. 5A, it is noted that in step S211 the synopsis error is computed to a first memory allocation vector associated with a first 'synopses size.' In the course of such a computation, it is possible that the relations (see step S171 of FIG. 4) and/or workload (see step S175 of FIG. 4) are profiled.

In step S215, the synopses error is estimated for a second memory allocation vector or synopsis of a different size. It is noted that there is no need to re-compute the profiling of the query workload and there is no need to re-compute the profiling of the data relations when computing, in step S215, the synopsis error for the second memory allocation vector. Instead, it is possible to re-use the results of the computing the first synopsis error $E^1$ or 'stored intermediate results' for example, results of profiling the relations and/or the queries.

It is noted that the example of FIG. 5A is useful, for example, for the case of memory reconciliation where the errors are estimated for different memory allocation vectors as in FIG. 4. Thus, it is possible when computing the estimated synopsis error for a given memory allocation vector to re-used earlier results from an earlier computed different memory allocation vector.

Figure 5B:
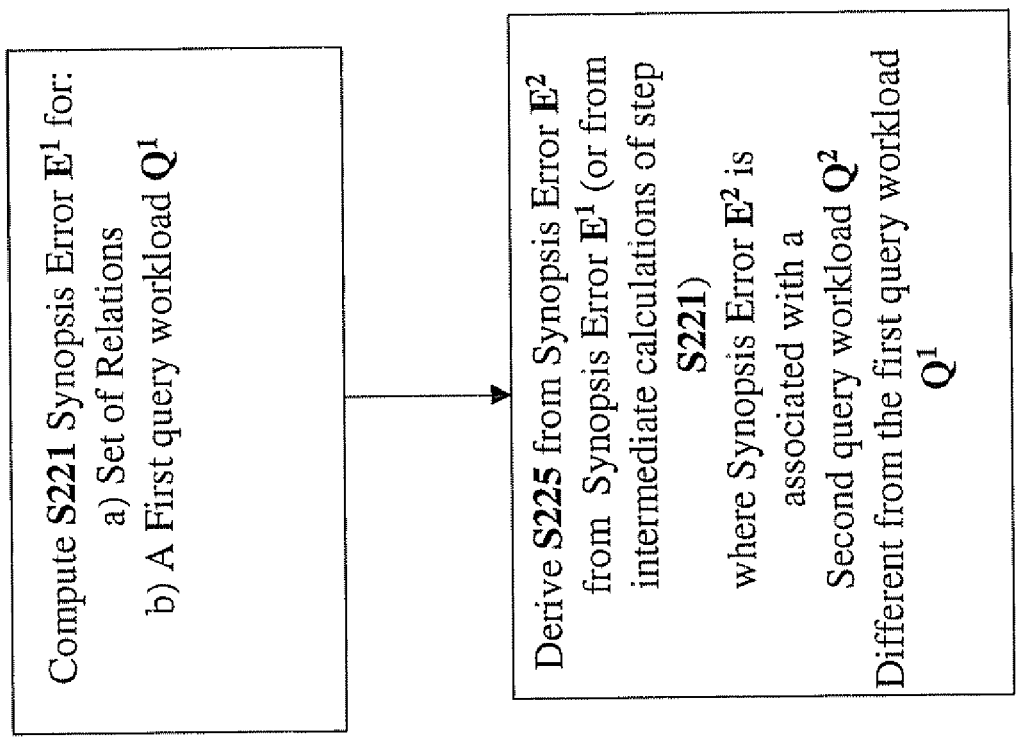
FIG. 5B describes a technique for estimating: a first synopsis error associated with a first query workload and a second synopsis error associated with a second query workload in accordance with some embodiments of the present invention.

In FIG. 5B it is noted that the first synopsis error is computed for a certain query workload in step S221. In step S225, it is noted that it is unnecessary to re-compute profiles of the relations and/or size parameter functions when the query workload changes. Instead, it is possible to re-use earlier results from step S221.

In FIG. 5C, it is noted that the first synopsis error is computed for a certain set of relations in step S231. In step S225, it is noted that it is unnecessary to re-compute profiles of the workload and/or size parameter functions when the relations themselves workload changes. Instead, it is possible to re-use earlier results from step S231.

It is noted that, in some embodiments, FIGS. 5A-5C may be said to relate to the dynamic synopses reconciliation problem, which is to update the recommended set of synopses in the face of changes to the underlying relations and/or query workload and/or memory allocation vector.

Figure 6:
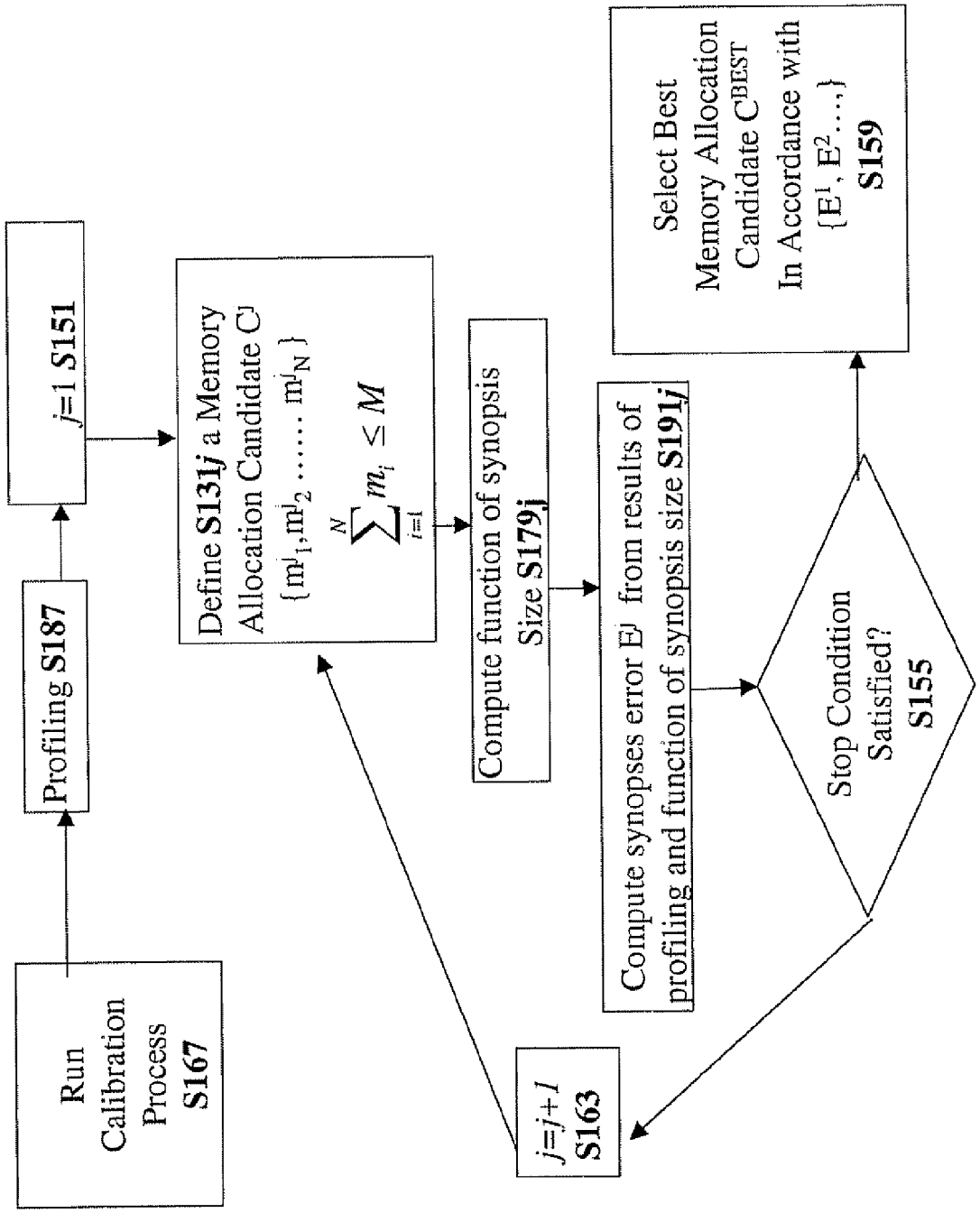
FIG. 6 describes a memory reconciliation technique in accordance with some embodiments of the present invention.

FIG. 6 provides an exemplary flow chart of an exemplary technique for memory reconciliation in accordance with some examples of the present invention. Thus, after calibrating S167 and profiling S187, the synopsis error is computed S171*j* for each defined S131*j* memory allocation candidate in accordance with the results of the calibration S167 and profiling S187, and in accordance with a computed S179 function of a synopsis size parameter (i.e. a function of the memory allocation vector).

It is noted that the order of FIG. 6 is not intended to be limiting. For example, it is possible to profile S187 after defining a memory allocation candidate or vector.

It is noted that FIG. 6 is just one example of a technique for memory reconciliation, and presently disclosed teachings related to synopsis error estimation may be applied to memory reconciliation in a number of ways, including in manners that are different from or that contradict the example of FIG. 6.

Figure 7A:
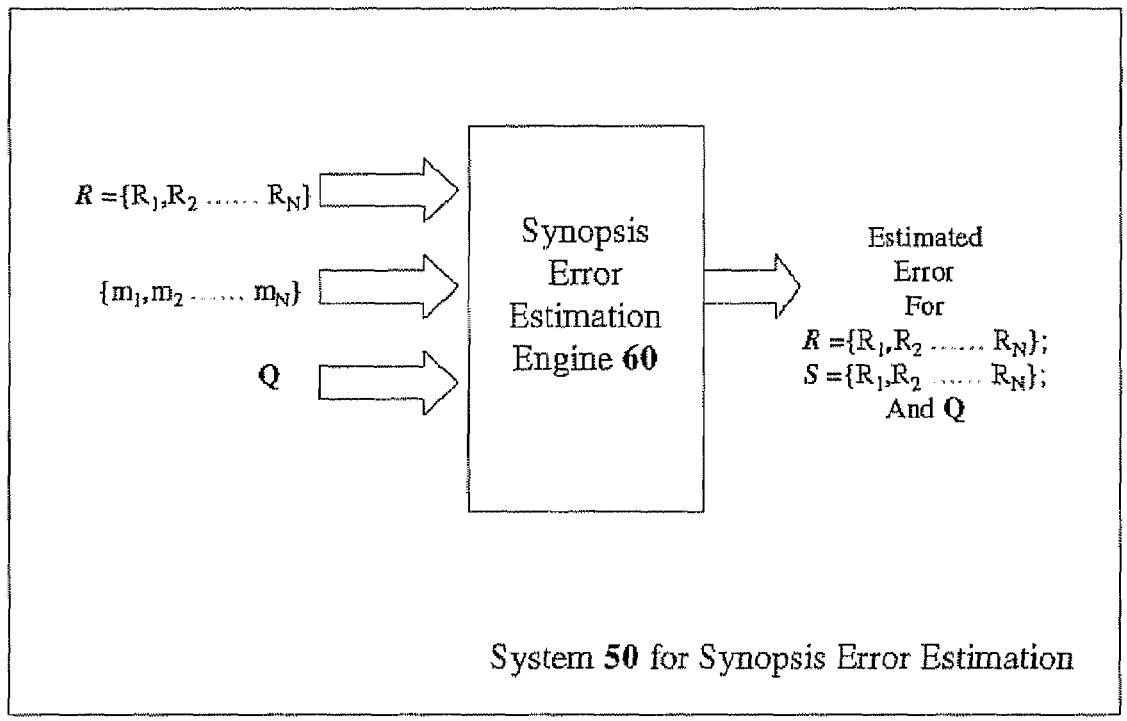
FIG. 7A describes a system for synopsis error estimation in accordance with some embodiments of the present invention.
Figure 7B:
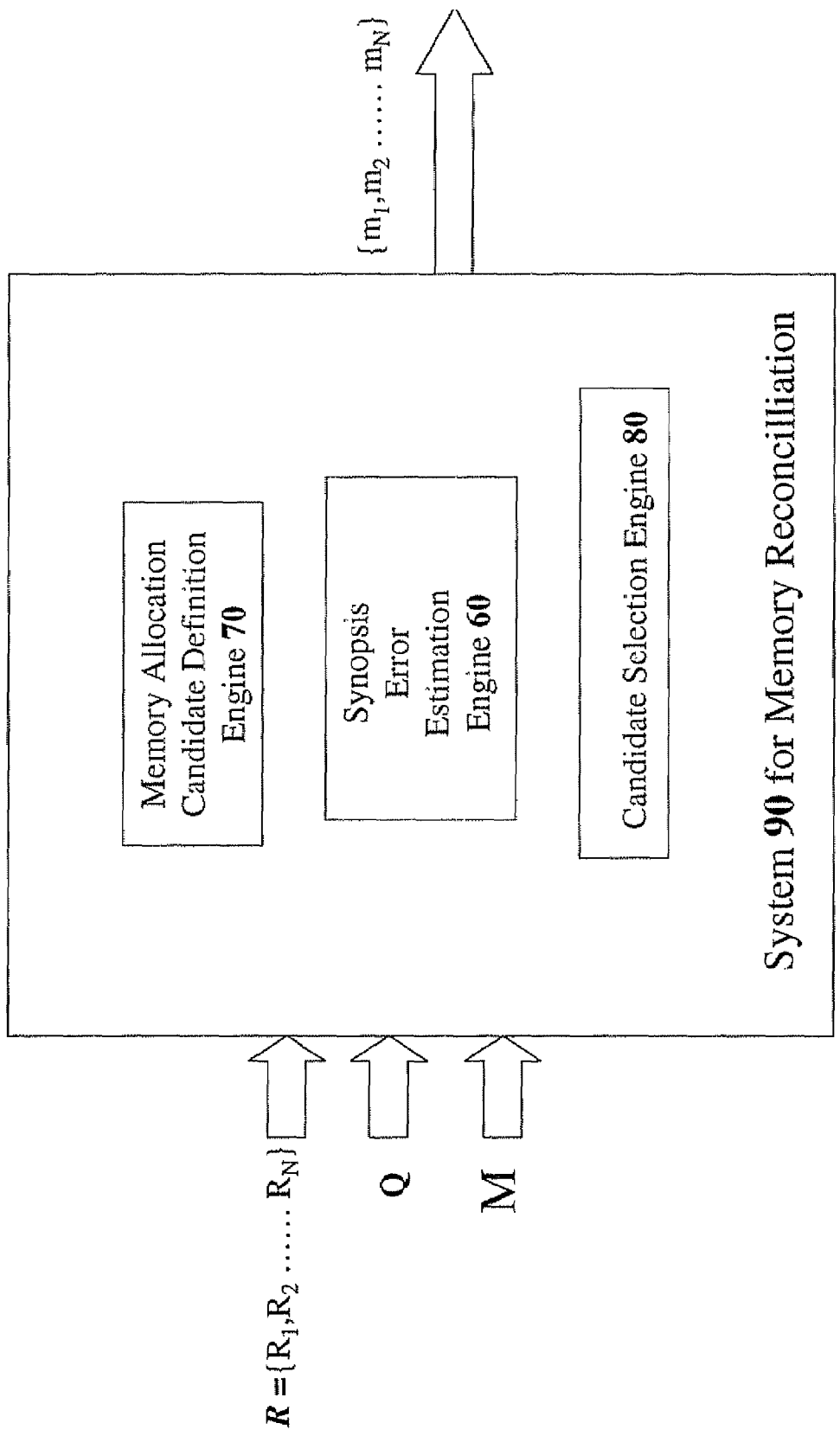
FIG. 7B describes a system for memory reconciliation in accordance with some embodiments of the present invention.

FIGS. 7A and 7B provide diagrams of exemplary systems for error estimation 50 and memory reconciliation 90.

Each system may include a 'data storage' (not shown). For the present disclosure, the term 'data storage' may include any combination of volatile and/or non-volatile memory (for example, persistent storage including but not limited to magnetic media and flash memory). The data storages may reside on a single machine, or may be 'distributed' over a plurality of machines, and may be deployed in any architecture.

In FIG. 7A, the system 50 includes a synopsis error estimation engine (or computation engine) 60 for computing an estimated synopsis error.

In FIG. 7B, the system 90 may further include a memory allocation candidate definition engine 70 (for defining candidate memory allocation vectors as in step 131j) and a candidate selection engine 80 (for selecting the best candidate as in step S159).

Usage Examples

Two usage examples are discussed in this section. As with other sections, this section is provided for the purpose of exemplification, and is not intended as limiting.

Large databases: Large databases with many large tables may require a large number of synopses to improve performance, giving approximate queries when an exact result is not necessary. Since the available memory is an expensive resource, it would be very useful to have an automatic low-cost procedure that will automatically manage these synopses, achieving a low global error over all synopses.

Large databases include but are not limited to data warehouses and text databases. In one non-limiting example, the text database is generated by a search engine or a component thereof (including but not limited to, for example, an Internet search engine or a so-called intranet search engine) which creates an index of text content or of features of text content. This index may include one or more stored relations' In a specific example, certain search engine services may invoke queries on the indexed and stored textual data, and it is desired to provide these search engine services in an efficient manner.

In another non-limiting example, the search engine or a component thereof includes media content (or features thereof)—i.e. audio and/or video media. In a specific example, certain search engine services invoke queries of data derived from the indexed media content, and it is desired to efficiently provide search engine services.

Reconciliation of Internet Router Synopses: Internet routers handle packets of data passing through them. This information can be looked at as streaming data, synopses can be built over it, and the same reconciliation process can be used to reconcile the space used by these synopses, to achieve better overall estimation results.

Discussion of FIGS. 8-12

Figure 8:
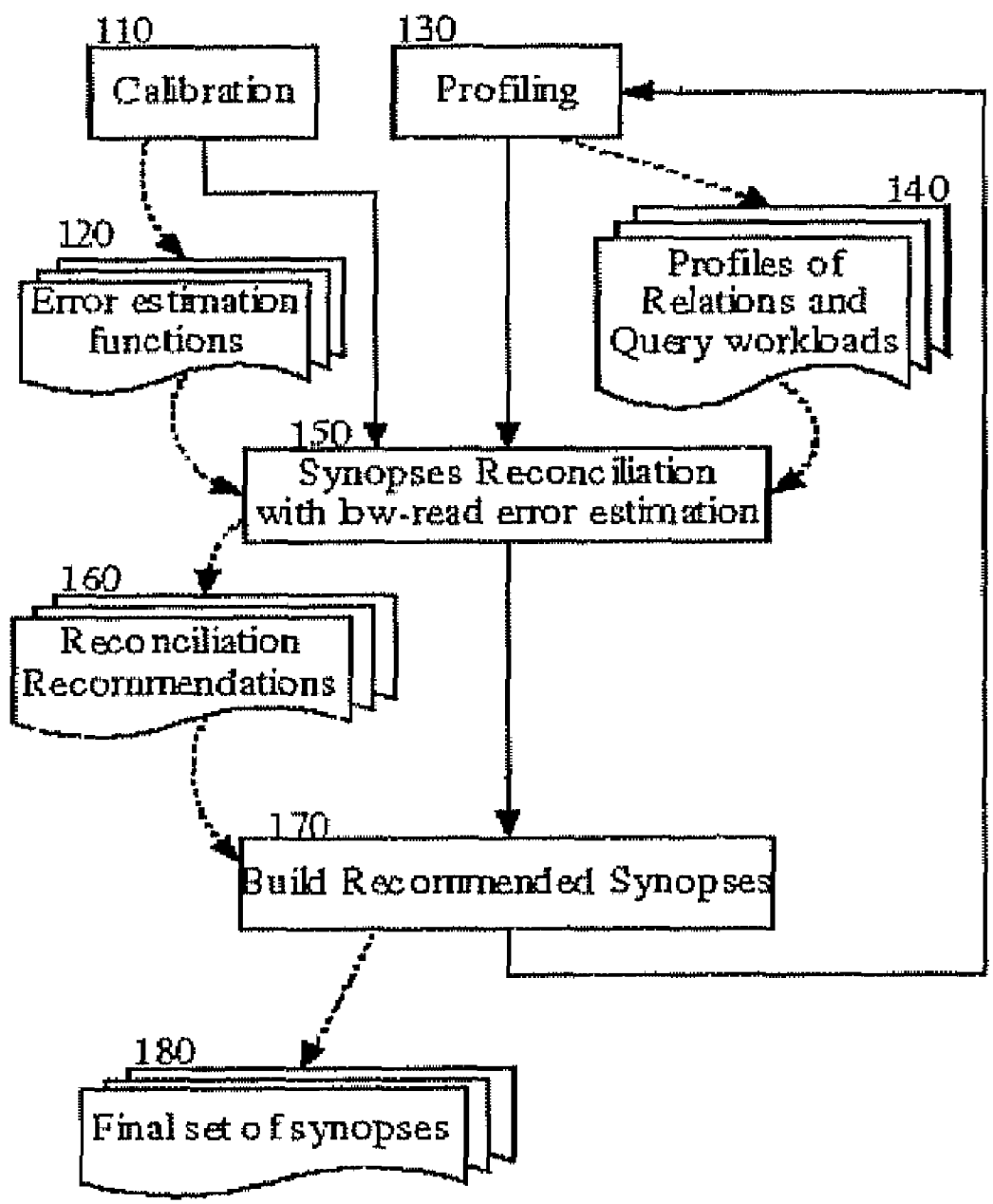
FIG. 8 describes a routine for building a set of synopses using a low-read error estimation in accordance with some embodiments of the present invention.

FIG. 8 describes a routine for building a set of synopses using a low-read error estimation in accordance with some embodiments of the present invention.

We start with the calibration of the synopses implementations in Step 110, resulting with the error estimation functions (120). Before we perform the reconciliation (for example, periodically) we also need to run a Profiling process (130) on the relations and query workloads, resulting with a data structure holding the statistical information about the relations and query workloads involved (140).

In the example of FIG. 8, it is possible to use the previously calculated error estimation functions (120) and the profiles of the relations and query workloads (140), and run the reconciliation process (150) performing only low-read error estimation.

The processes of FIG. 8 produces the recommendations of which synopses to build (160 & 260). Finally, it is possible to choose to act upon the recommendations and build the recommended synopses (170 & 270), resulting wilt the final set of synopses (180 & 280). The process is iterative, and may, in some embodiments, be repeated as the relations and query workloads change.

Figure 9:
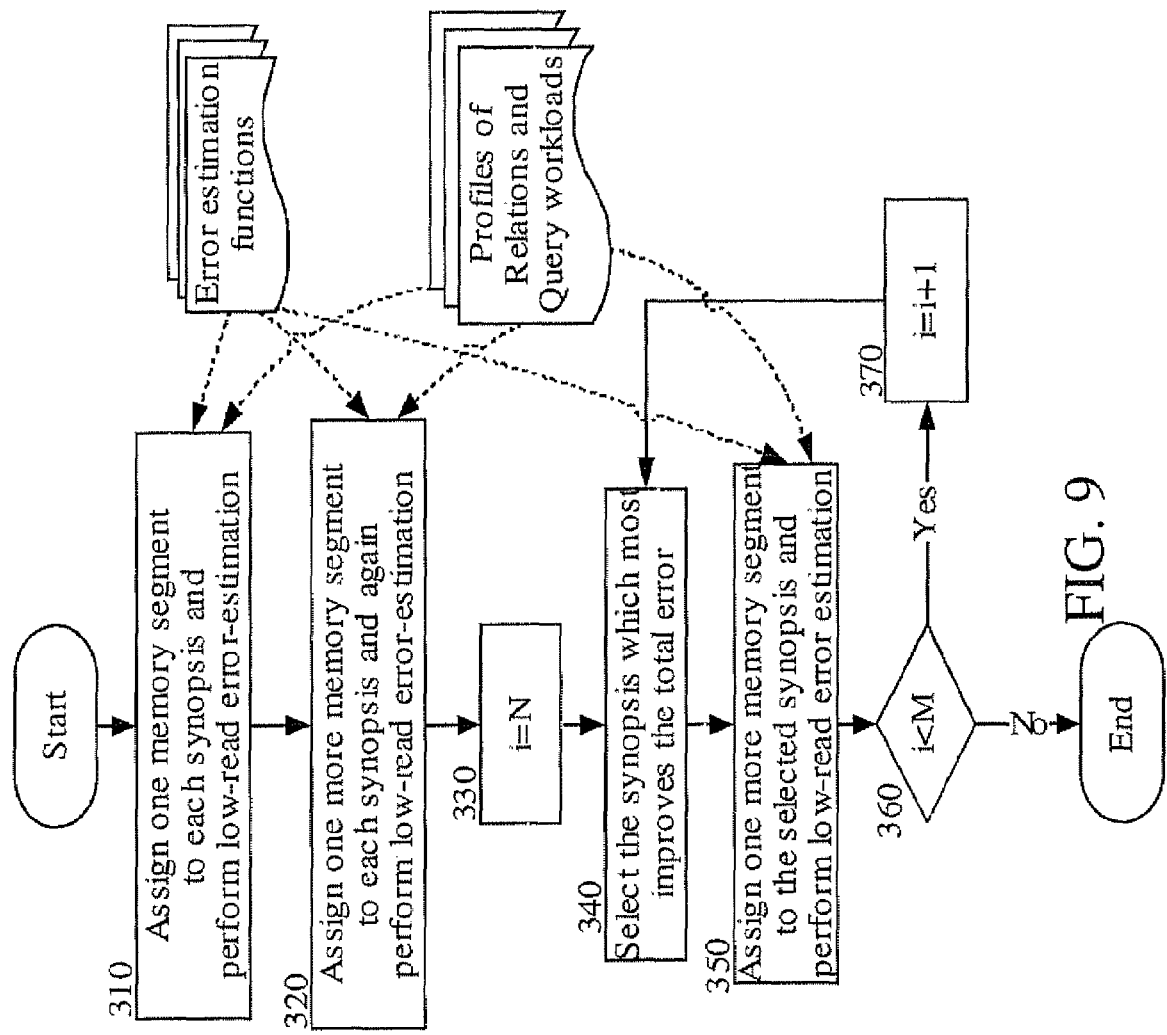
FIG. 9 describes an exemplary synopses reconciliation process.

FIG. 9 describes an exemplary synopses reconciliation process in accordance with some embodiments of the present invention. In step 310, we allocate one segment of memory to each synopsis but perform only low-read error estimation using the error-estimation functions and profiling information gathered in previous processes. In step 320, we allocate one more memory segment to each synopsis and perform again full-read (or low-read in the invention) error estimation. We then loop, in step 330, checking where the gain was greatest (step 340), and allocate one more memory segment to that synopsis (step 350), until there is no more free memory (step 360).

Figure 10A:
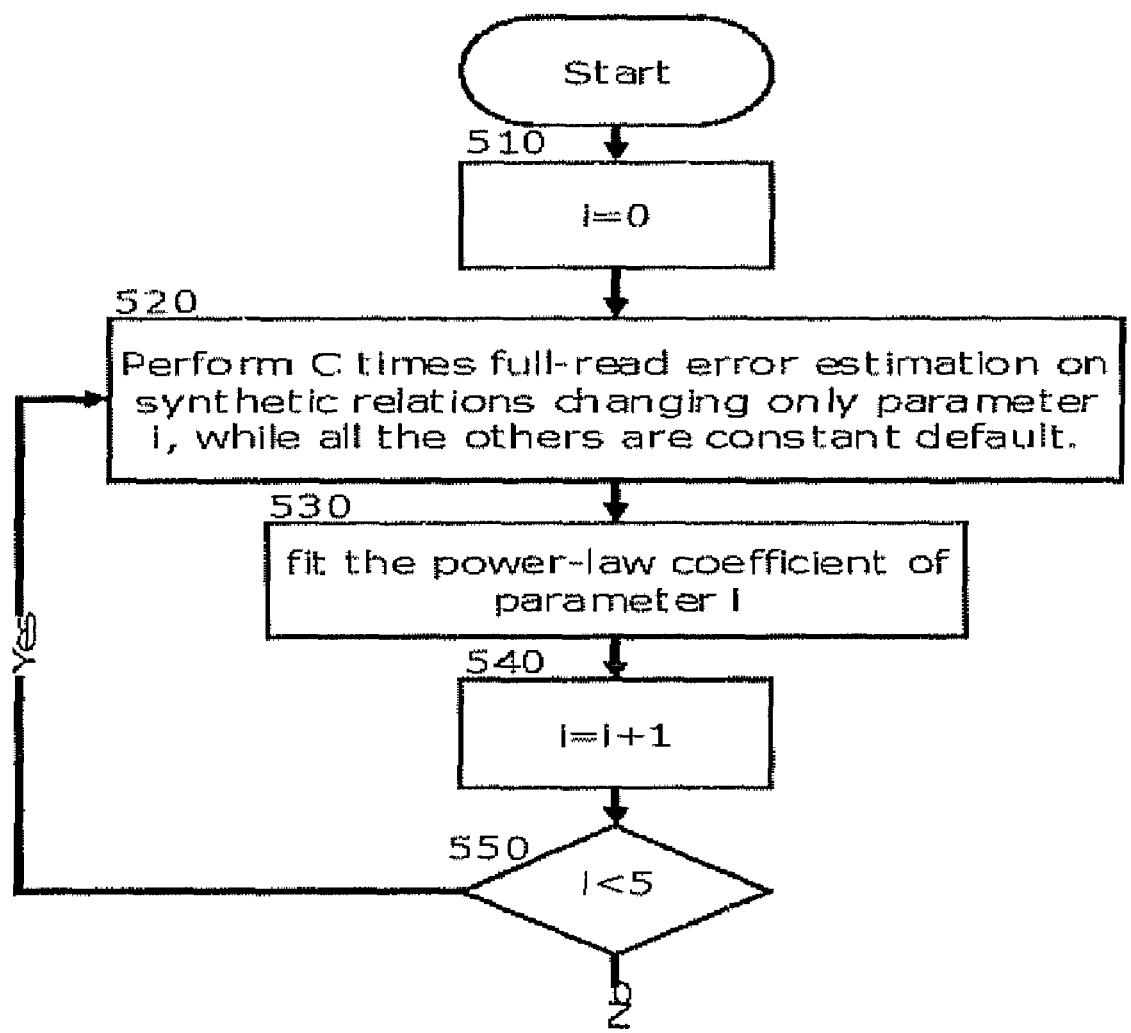
FIGS. 10A-10B describe an exemplary calibration process.
Figure 10B:
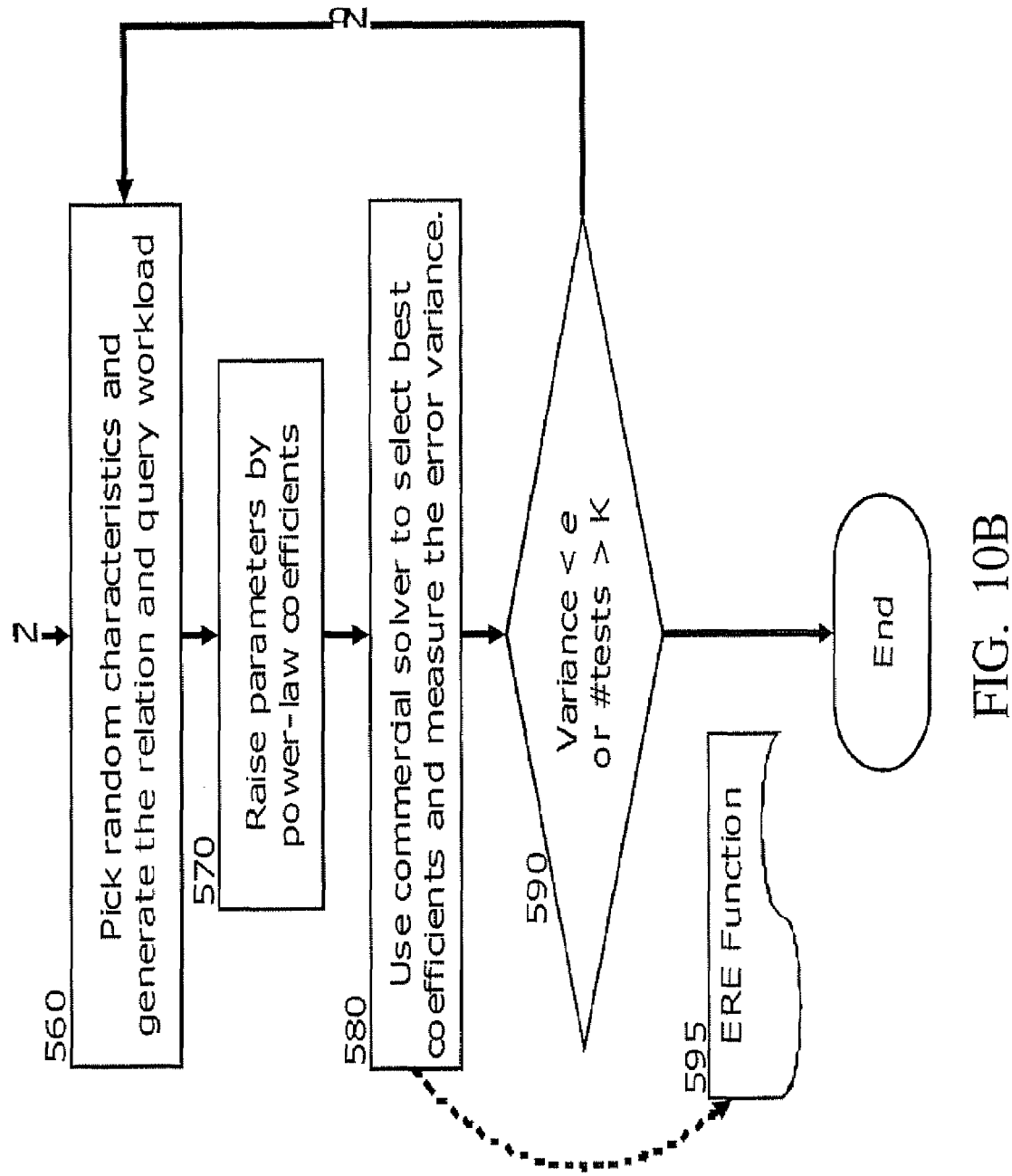

FIGS. 10A-10B describe an exemplary calibration process. In the example of FIGS. 10A-10B, the equation has the same form as equation (1) of theoretical section 2.1.

For the example of FIGS. 10A-10B, The Calibration process is combined of two phases: 1) Calculating the power-law coefficients (b1 . . . , b5 in steps 510-550) and 2) calculating the weight coefficients (a1, . . . , a6 in steps 560-590).

In the first phase we loop through the instance parameters (510,540,550).

In step 520 we isolate each one of the instance parameters, measure the synopsis error as we change it, and then in step 530 we fit it with a Zipf parameter.

The second phase is an iterative process, running until a good enough accuracy is achieved (590). In step 560 we randomly pick the instance parameters of an instance and generate a synthetic relation, query workload and synopsis accordingly. In step 570 we raise each of the picked instance parameters to the power of its coefficient calculated in phase 1. We then put it all in the form of an equation with the weight coefficients as the variables, and use a commercial solver to solve the set of equations accumulated so far. We continue to add more and more equations until the Variance goes below a predefined constant e. When it does, the commercial solver outputs the set of weight coefficients.

Combining the coefficients of phase 1 and phase 2, results with the complete error estimation function (595).

In non-limiting embodiments, between 10 and 20 synthetic tables (i.e., C of step 520) are used in the calibration process, though any number is appropriate. In non-limiting embodiments, the number of tests during the second phase of the calibration process is between 15 and 100, though any number is appropriate.

In non-limiting, embodiments, the attribute e which appears in step 590, i.e. maximal allowed variance of the error estimation function, has values between 0.001 and 0.001, though any value between 0 and 1 is appropriate.

Figure 11:
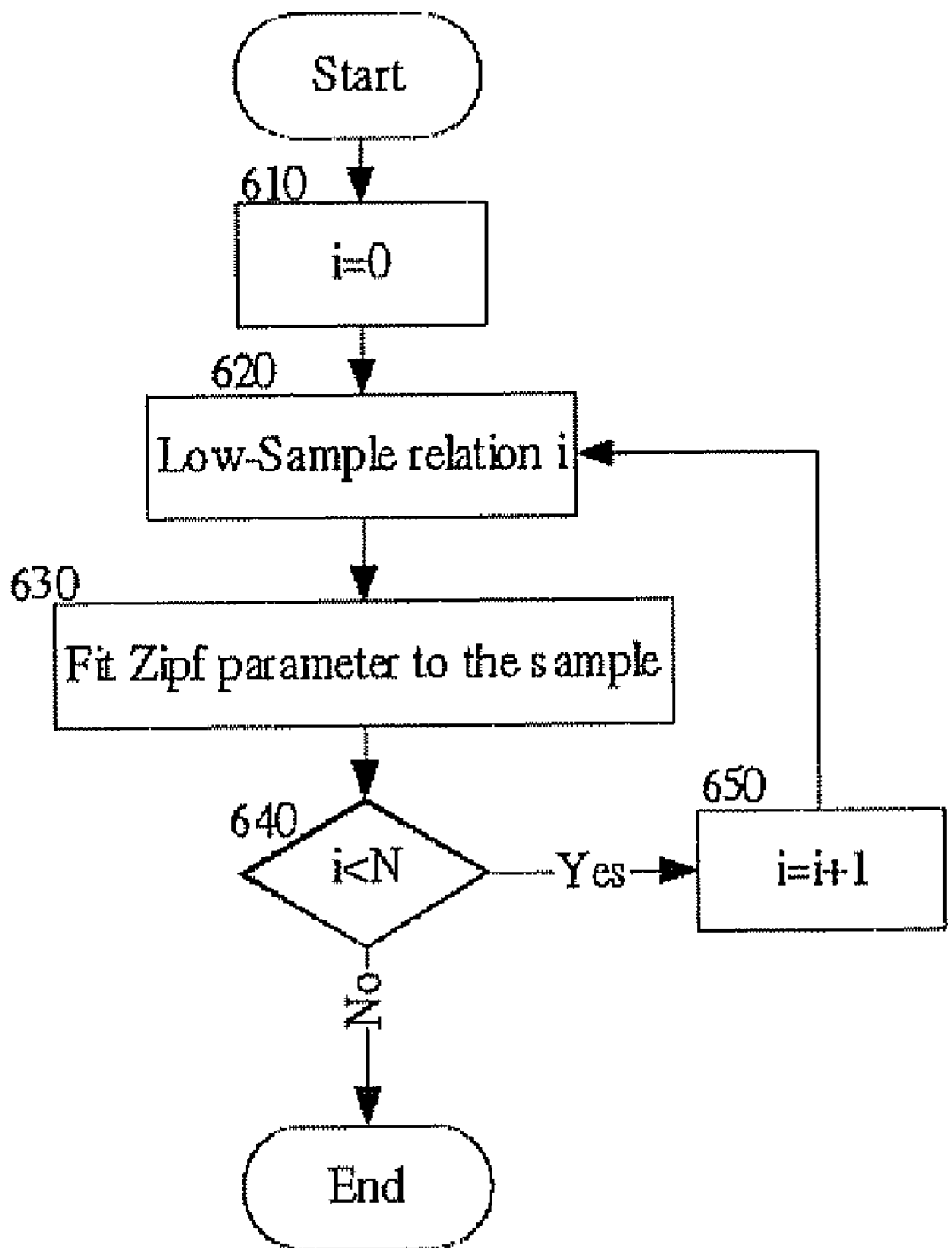
FIG. 11 describes an exemplary profiling process.

FIG. 11 describes an exemplary profiling process according to some embodiments. In Step 620, we perform low-Sampling on the relation (less than 0.1%) In Step 630, we fit a Zipf parameter to the sample taken (requires sorting the sample, and using linear square fitting to fit it with a Zipf parameter).

Figure 12:
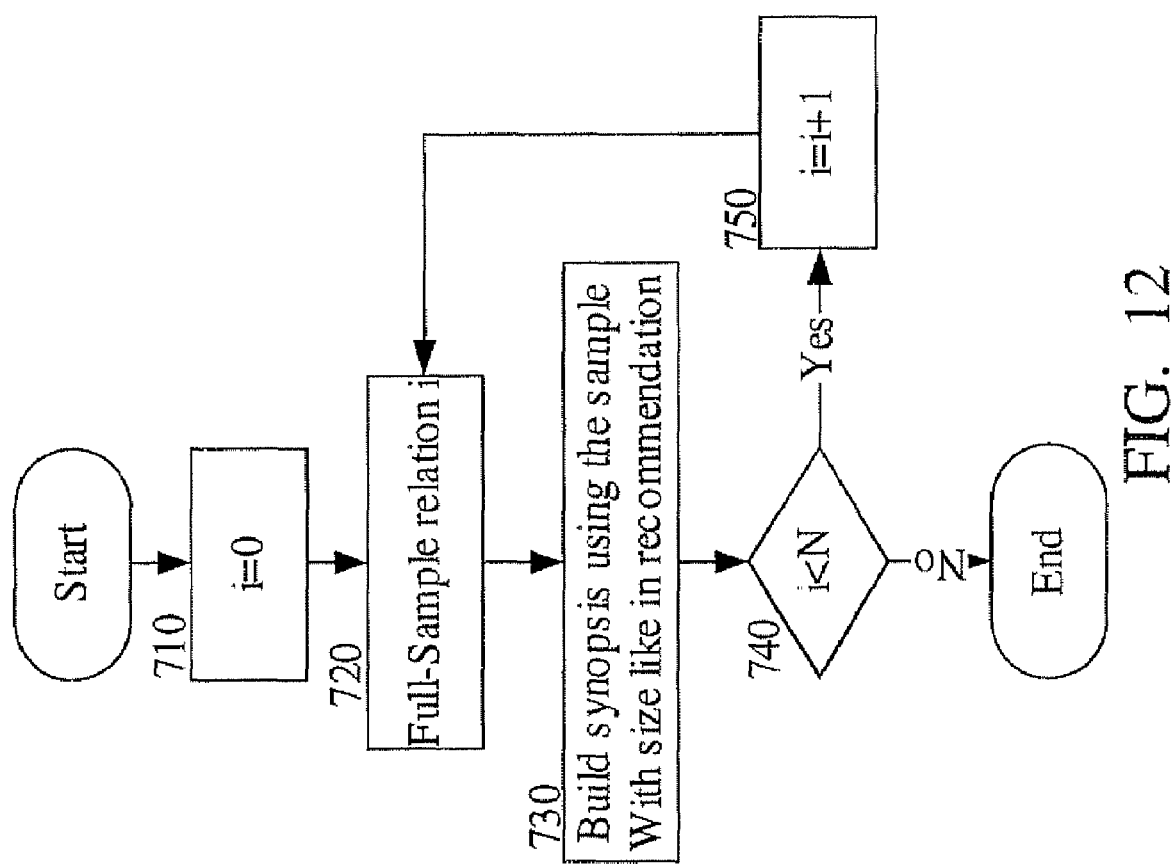
FIG. 12 describes an exemplary process for building a synopsis.

FIG. 12 describes an exemplary process for building a synopsis The following examples are to be considered merely as illustrative and non-limiting in nature. It will be apparent to one skilled in the art to which the present invention pertains that many modifications, permutations, and variations may be made without departing from the scope of the invention.

It is noted that although the theoretical discussion relates to two-column relations, this is not intended as a limitation and that multi-column relations are within the scope of the present invention. It is noted that in no way is this feature or any other features of the disclosed examples intended as limiting, but rather is provided for the purposes of exemplification.

Theoretical Discussion of Exemplary Embodiments

A relevant factor in the effective utilization of data synopses is the ability to have good a priori estimates on their expected query approximation errors. Such estimates are useful for the appropriate decisions regarding which synopses to build and how much space to allocate to them, which are also at the heart of the synopses reconciliation problem. In this section, a theoretical discussion of a novel synopses error estimation method based on the construction of synopses-dependant error estimation functions is presented. These functions are computed per synopsis implementation in a pre-processing phase using a calibration method, which does not need to involve actual data or actual queries. Subsequently, (hey are used to provide ad hoc error estimation w.r.t given data sets and query workloads based only on their statistical profiles, which can also be obtained effectively in a pre-processing phase.

In this theoretical section, we demonstrate the realization of our approach for the particular non-limiting setup of relations with a single attribute and range-sum queries. We define a specific error-estimation function that works well under this setup for several synopses implementations and the mean-relative-error metric, and describe an efficient calibration process for computing this function. The proposed function is in the form of a linear combination of power-law functions over several basic parameters, capturing the size and distribution of the relation and query workloads. We substantiate the validity of our approach under this setup by experimentation using several synopses implementations over a wide variety of relations and query workloads.

We also present a novel approach to the synopses reconciliation problem, which is to recommend which synopses to build under a given memory space limit. Using the statistical profile information and the error estimation functions within synopses reconciliation algorithms results with significant efficiency improvements by lowering to a minimum and even avoiding interference to the operational databases. We show the utilization of the error estimation functions by bounding the resulting error when utilized for synopses reconciliation.

Furthermore, the described methods enable for the first time a practical solution to the dynamic synopses reconciliation problem, which is to update the recommended set of synopses in the face of changes to the underlying relations and query workload.

The dynamic synopses reconciliation problem is to efficiently update the recommended combination of synopses whenever the relation or query workload change, with minimal impact to the database. Dynamic changes to the relations or to the query workload should be reflected with updated synopses (e.g., [1, 4, 8, 20, 23]). But even when the synopses are kept up-to-date, these changes may change the effectiveness of the various synopses and the overall effectiveness of the synopses-combination. Hence, to effectively address a dynamic setup one needs to have an effective solution to the dynamic synopses reconciliation problem. That is, to continuously provide input regarding the best synopses-combinations and trigger a change of the synopses-combination when appropriate. Tables 3 and 4 detail examples for the improvement that can be gained from running a synopses reconciliation process after the relations or query workloads have changed.

The estimation of the approximation-error can also be used for other applications. For example, it can be used for reporting the quality of an ad-hoc approximate query submitted by a user (e.g., [2, 5, 9]). When submitting an approximate query the user will receive both the approximate result and an estimation of the approximation error.

The experiments in this theoretical section were performed using the τ-Synopses system [18]. We have extended the system with the calibration and reconciliation modules, enabling the easy research of error-estimation functions and reconciliation algorithms.

Theoretical Section 1

In this theoretical discussion, we present a novel approach to synopses error estimation based on the construction of synopses-dependant error estimation functions. These functions are computed in a pre-processing stage using a calibration method, which does not need to involve actual data or actual queries. They accept as arguments statistical information on the relations and query workloads, which can be efficiently collected in a pre-processing phase by profiling or by using existing statistical information in the DBMS. It is sufficient to perform the calibration for the implemented synopses only once during load and integration time, and the results can be used at any time thereafter to provide ad hoc error estimation w.r.t. given data sets and query workloads based only on their statistical profiles.

The calibration approach is quite general, where its particular implementation may depend on the particular data sets and types of queries under consideration. In this theoretical discussion, we have used Zipfian-like distributed relations with a single numerical attribute, and on query workloads consisting of range-sum queries with a single numerical result. We describe an error-estimation function with several basic parameters that works well for the several synopses types that we have tested, including Spline Synopsis [14], V-Optimal histograms [11], Standard Wavelet [19], Workload-based Greedy Wavelet [21], and Golden Estimator [25]. The function is in the form of a linear combination of power-law functions over several basic parameters that efficiently capture the size and distribution of the relations and query workloads. We describe an efficient synopses calibration method for deriving this error-estimation function.

In this theoretical discussion, we also present a novel approach to synopses reconciliation, by having synopses reconciliation algorithms use our error-estimation functions instead of actual error testing. In particular, we modify the same algorithms and heuristics recommended in [12, 13, 14, 15, 16] to use the calibration-based error estimation functions and profile information. By concentrating most of the effort on the pre-processing phases, we are able to lower to a minimum and even completely avoid interference to the operational databases during the run-time of these algorithms. Thus, gaining significant improvement in running time while maintaining good accuracy. We have also extended our study to include support for the reconciliation of multiple synopses types together, in order to take advantage of the strengths of each synopsis type. In addition to recommending the synopsis size, we also recommend which synopsis type is most suitable, meaning that it would give a lower error under the given space limitations.

As we utilize the profiling information and the error-estimation functions, we are interested, in this theoretical discussion, in the accuracy of the estimation obtained by these functions. This accuracy is expressed in terms of the error introduced by the error-estimation functions, denoted as the error-estimation error. In our experimental tests, using a wide variety of synopses, relations and query workloads, the derived error-estimation functions estimate the mean-relative-error of the used synopses with an average error-estimation error of 1.8%-2.3%. For single queries the error-estimation error is less than 10% for 81%-83.7% of the queries. When used within a synopses reconciliation process the mean-relative-error of the result is on average 0.2%-0.38% worse than the error of the original method, while showing a reduction of two orders of magnitude in the run-time.

The effectiveness of performing calibration and profiling-based synopses reconciliation is also shown in the reconciliation error lemma, by proving a bound on the additional error of the synopses combination recommended by a synopses reconciliation algorithm using error estimation instead of the more expensive measured error. In particular, we show in the reconciliation error lemma that this additional error is bounded by the combined error estimation errors of the recommended combination, and of the combination that would be recommended with measured error.

The efficient run-time of the synopses reconciliation process and its minimal impact on the operational database enable for the first time a practical solution to the dynamic synopses reconciliation problem. The profiles of the relations and query workloads can be approximated using a backing sample [6], which is kept up-to-date as the relations and query workloads change. The synopses reconciliation process itself uses only these profiles and the error-estimation functions and does not access the database at all. In this way, we can execute a synopses reconciliation process on a separate server and generate a new recommended combination without any impact on the database server or accessing any of the original relations. The only cost required from the database, is the cost of rebuilding or updating the synopses according to the new recommendations. The process of rebuilding the synopses can also be optimized as in [8], by building the synopses based on the same backing-sample used before. Running a second or a periodic synopses reconciliation process, can significantly lower the total approximation error of the system—In our experiments, a synopses reconciliation process executed after the underlying relations and query workload have changed, lowered the total approximation error of the system by as much as 5%, even when only small changes in the query workload were made.

The benefits of run-time error estimation are significant—our experiments show a reduction of two orders of magnitudes in the run-time of the synopses reconciliation process. For instance, an 8 minute algorithm run is reduced to less than 1 second. A summary of experimental results for synopses reconciliation algorithms, their accuracy and run-times can be found in Table 2.

Another application for the error-estimation functions would be to provide the estimated error of the result of an approximate query together with the result, reporting its quality. There are several works on alerting the user submitting a query to the possible approximation error of the query result. One such example is the AQUA system [2,5], a framework for running queries on synopses, that displays the upper limit of the approximation error of a query. Similar approach is presented in [9]. Having a good error-estimation would enable those frameworks and related frameworks to display a better error-estimation for the approximation, or provide a better prediction regarding the accuracy of the approximate query answer.

The error-estimation function can be extended to support relations with multiple attributes and other types of queries with the addition of parameters to capture them (e.g., adding a parameter with the number of attributes, and another parameter measuring the correlation between the attributes). The methods for both error-estimation and synopses reconciliation are applicable also for non-relational data sets, as well as for streaming data.

As the development and testing platform we used the τ-Synopses system [18]. We have extended the system with the new modules of calibration and reconciliation, while taking advantage of the existing benchmarking tools, and the already integrated synopses types, query workloads and relations. A demonstration of the calibration and reconciliation implemented modules was given in [17].

The rest of this theoretical discussion is organized as follows: in Section 2 we will describe the technique for error estimation of a given setup and in Section 3 we will show how it is used within synopses reconciliation algorithms. Section 4 describes the setup and experiments we made to support our approach, and Section 5 contains the conclusions.

Theoretical Section 2 Synopsis Error Estimation

In this theoretical discussion we will use mean-relative-error (MRE) as the error metric for measuring the accuracy of a data synopsis a built over a relation ρ w.r.t. a query workload ω. The triplet <ρ,ω,σ> is denoted as an instance. Let $r_1, \ldots, r_n$ be the actual results of query workload ω={$q_1, \ldots, q_n$} submitted to the relation p, and let $r_1', \ldots, r_n'$ be the approximate results of submitting query workload ω to the data synopsis σ built over the relation ρ. The error with respect to the instance <ρ,ω,σ> is defined as:

$$E(\rho, \omega, \sigma) = \frac{1}{|\omega|} \sum_{i=1}^{|\omega|} \frac{|r_i - r_i'|}{|r_i|}$$

The objective of this section is to provide efficient methods for estimating E(ρ,ω,σ) for any given instance <ρ,ω,σ>; that is, computing an estimated error eE(ρ,ω,σ). We denote mE(ρ,ω,σ) as the actual error of the same instance, which can be measured by building the synopsis σ and running the query workload ω on both the relation ρ and the synopsis σ. The error estimation error, EEE, is defined as:

$$EEE(\rho,\omega,\sigma)=|eE(\rho,\omega,\sigma)-mE(\rho,\omega,\sigma)|$$

Given an instance <ρ,ω,σ>, the error estimation problem is to provide effective error estimation, that can efficiently compute an estimated error eE with small EEE.

Our general approach is to define error estimation functions, $EE_\tau$, for different synopses types τ. These functions receive as arguments some appropriately selected parameters characterizing the instances. Thus for an instance <ρ,ω,σ> the function in use is $EE_\tau$, for τ=τ(σ). The function and instance-parameters are defined so as to meet the following goals of efficiency and effectiveness (1) these instance-parameters are efficiently computable, (2) the function is efficiently computable based on the instance-parameters, and (3) the function is effective, meaning that the EEE of the method defined by this function is low.

We will start with describing the nature of the error-estimation function, and the instance-parameters that it utilizes as arguments (Section 2.1). We then describe the method in which the function is computed for each synopsis type, which we call synopsis calibration (Section 2.2). The process runs a set of tests on the synopses using synthetic relations and does not require any particular data sets to be available. The output of this process is a concrete error estimation function $EE_\tau$ per synopsis type $\tau$. Finally we detail the data and query workload profiling process of efficiently obtaining the parameters for a particular instance (Section 2.3). The output of this process consists of the specifications of the relations and query workloads. These are used as input for the error estimation functions of various synopses types, and as a result we can now get an error estimation without actually building the particular synopses for the given instance.

Theoretical Section 2.1 The Error-Estimation Function

Our objective is to diminish or eliminate the need to access the underlying relations and our approach is to have an error-estimation function that accepts as parameters the statistical characteristics of an instance. Accordingly, we have identified a set of instance-parameters, and a general function that could provide an effective error-estimation for the relative error of several synopses types (detailed below, and in Section 4.2), for range-sum queries and for relations with a single attribute whose distribution can be well approximated by Zipf distribution. The identified set of instance-parameters is characterized as an instance-profile:

Instance-profile. We will define instance-profile to be a 5-tuple, $\Delta=<L,Z,Q,R,S>$ consisting of Relation distinct count (L), Relation data distribution skew (Z), Workload query distribution skew (Q), Workload query range (R) and Synopsis size (S). Table 1 shows several examples of instance-profiles. We have tested other parameters as well, and these were the significant ones for all tested synopses. A description of some of the other tested parameters is given in Section 2.1.4.

Theoretical Section 2.1.1 Power-Law Approximation

Figure 13:
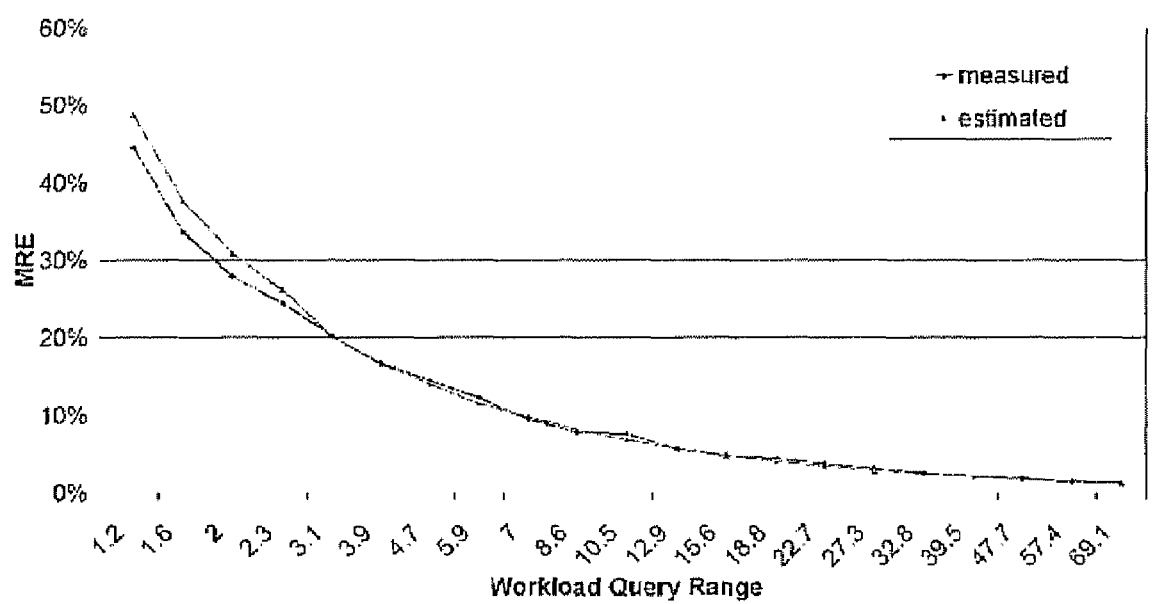
FIG. 13 describes the error as a function of the workload query range for the Golden Estimator synopsis. The "measured" plot is the error measured by testing the synopsis by querying the database, and the "estimated" plot is the plot of the fitted power-law function.

We show that the error as a function of each parameter X can be approximated using a power-law function ($aX^b$). That is, if we fix all the instance-parameters except one, the error as a function of each parameter X can be effectively approximated using a function of the form $aX^b+c$ for some constants a, b and c. FIG. 13 shows an example of the approximation of the workload query range R to a power-law function. It shows the estimated power-law function and the measured error vs. R which varies from 1% to 70% of the relation distinct count. All the other instance-parameters are fixed. It can be seen that a power-law function quite accurately approximates the error as a function of this parameter. Tests on several synopses using various instances have shown this to be an effective approximation that is good for synopsis error estimation.

Theoretical Section 2.1.2 Independence of the Instance-Parameters

Figure 14:
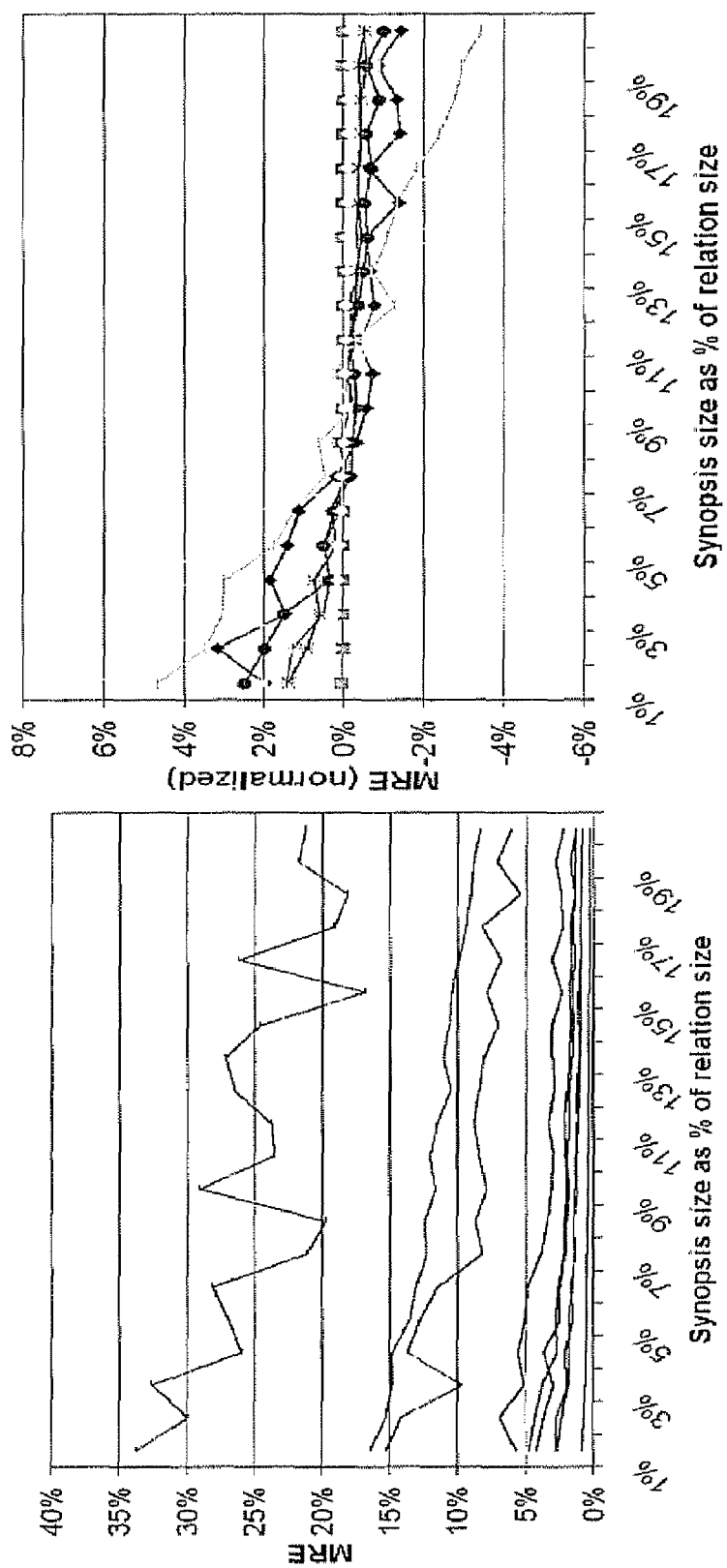
FIG. 14 describes The synopsis error as a function of the synopsis size as percent of the relation size using the Spline synopsis (left), and the normalized error of the some instances (right). Although the lines are not parallel, which suggests correlation between the parameters, the error is less than 6%, and on average only 0.8%.

For simplicity and efficiency, it is convenient to assume that the instance-parameters are independent of each other, enabling us to use a linear combination of power-law functions in the function definition. The penalty of this convenience is inaccuracy that would result from correlation between the different parameters. Experimental studies show that this penalty is reasonably small. FIG. 14 details an experiment performed using the Spline synopsis over 10 instances with random instance-parameters. The plots on the left show the measured error of each instance as a function of the synopsis size as percent of the relation size. The fact that the plots are not parallel suggests that the instance-parameters have some correlation between them. The plots on the right represent the same instances, only we normalized the plots by

| What | Unit | Profile 1 | Profile 2 | Profile 3 |
|---|---|---|---|---|
| Relation Distinct Count (L) | #tuples | 2,000,000 | 500,000 | 1,000,000 |
| Relation Data Skew (Z) | Zipf parameter | 0.3 | 0.5 | 0.1 |
| Workload Query distribution skew (Q) | Zipf parameter | 0.1 | 0.4 | 0.1 |
| Workload Query Range (R) | % of relation size | 10 | 15 | 10 |
| Synopsis Size (S) | % of relation size | 0.5 | 1 | 0.7 |

One Exemplary error-estimation function. The error estimation functions of this theoretical discussion are linear combinations of power law functions of the instance-parameters:

$$EE_\tau(\Delta)=a_1 L^b{}_1+a_2 Z^b{}_2+a_3 Q^b{}_3+a_4 R^b{}_4+a_5 S^b{}_5+a6 \quad (1)$$

where the coefficients $a_i=a_i(\tau)$ and $b_i=b_i(\tau)$ depend on the synopsis type $\tau$ and will be calculated in the calibration process described in Section 2.2. The $a_i$ coefficients are also used to normalize the instance-parameters which have different units of measure. The proposed error-estimation function was tested successfully on the following synopses types: Spline Synopsis [14], V-Optimal [11], Standard Wavelet [19], Workload-based Greedy Wavelet [21] and Golden Estimator [25]. It was tested using various instances, and proved to be quite effective for the types of synopses, query types and distributions we are focusing on. In our experiments, using a wide variety of instances and the synopses types listed above, the error estimation function achieves an average EEE of 2.3%, and a maximum LEE of 7% when the range of the error was between 0% and 20%. The relative error [EEE/mE] is at most 2.6.

subtracting the average of each plot. In this experiment, the maximum error contributed by the correlation is 6% and on average 0.8%. Similar experiments were performed using the other synopses types, and the other instance-parameters generating similar results.

Because we assume the instance-parameters are independent, the function can be described as a linear combination of their effects on the error for different parameters, and because their effect on the error can be approximated using a power-law function, the function is in the form of a sum of power-law functions.

Theoretical Section 2.1.3 Error Function Analysis

The strengths and weaknesses of each synopsis type, can be derived from their error-estimation function. Recall that the error-estimation function is of the form:

$$EE_\tau(\Delta)=a_1 L^b{}_1+a_2 Z^b{}_2+a_3 Q^b{}_3+a_4 R^b{}_4+a_5 S^b{}_5+a_6$$

(2) The bigger the coefficients as, the bigger the error will be. Since the value of L is bigger than 1, then the bigger the coefficient $b_1$ is, the bigger the error will be. Since the values of Z, Q, R and S are between 0 and 1, then the smaller the coefficients $b_i$ (i>1) are, the bigger the error will be. Furthermore, since we assume the instance-parameters are independent, one can look at each of the power-law sub-functions separately. The coefficients of the sub-functions indicate the behavior of the synopsis for that parameter. If, for example, a synopsis has a high value in $b_4$, then this synopsis performs poorly for large query ranges, and vice versa.

Theoretical Section 2.1.4 Parameters with Smaller Effect on the Error

The following parameters were suggested in some articles, and testing them, as we did with for the instance parameters, shows that they have little effect on the error. We took a specific instance, and modified only the parameter that we want to test. Most of the results showed an arbitrary error, caused mostly by the randomness of the workload, and of the sampling used.

Figure 15:
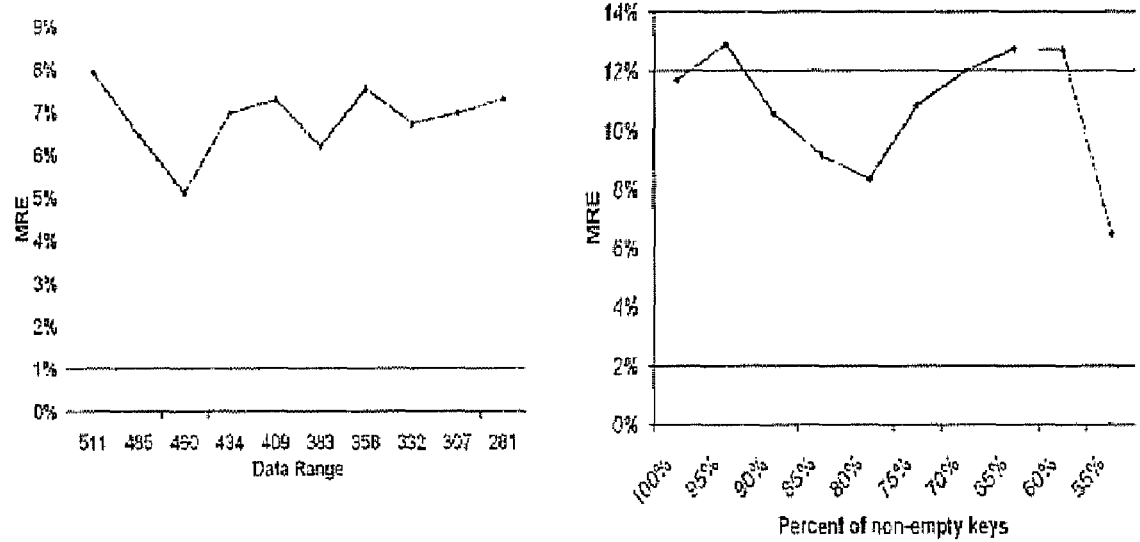
FIG. 15 describes the error as relation data range (left) and the error vs. Number of zero or missing values in the relation (right).

1. FIG. 15 (left) shows the error as a function of the relation data range. Since the error is normalized by the value of the real data, we do not expect any effect at all of the data range on the error. We used 10 relations, each with 500 k tuples, with different data ranges α-axis). The query workload had 300 random queries with an average range of 40, and over each relation we built a Golden Estimator synopsis with size 100 buckets. The results of this experiment and similar experiments using other synopses types, show very small fluctuations of less than 1%.

2. FIG. 15 (right) shows the error as a function of the number of non-zero data values in the relation. For example, a value of 100% means that all the keys exist in the relation, and a value of 60% means that only 60% of the keys exist in the relation. We again used 10 relations with 500 k tuples, with different number of non-zero keys α-axis). The query workload had 300 random queries with an average range of 40, and over each relation we built a Golden Estimator synopsis with size 100 buckets. The results of this experiment, and similar experiments using other synopses types, show an arbitrary effect on the error.

Theoretical Section 2.2 Synopses Calibration

The calibration process computes the as and $b_1$ coefficients of the error-estimation function $EE_\tau$ for a given synopsis type τ. This process only needs to be performed once per synopsis type, as a pre-processing phase, and the resulting function can later be used to estimate the error of a synopsis in a given instance, without accessing the database. This enables many applications to avoid expensive database accesses during their run-time phase.

The calibration process for building function (1) consists of the following steps:

1. Parameter Tests. We, run a set of tests on each parameter separately. Because we assume the instance-parameters are independent, it is possible to measure the effect of a single parameter by fixing all the others. So for each parameter, we fix all the other instance-parameters, and run multiple tests varying it through the entire range. Note that three tests are enough to fit a power-law function, and additional tests are run for better accuracy. For each variable we record the results of the tests in an array with two columns: the value of the variable and the error of the test.
2. Power-Law Fitting. We use least-square-fitting (as described in [24]) on the results of the previous step to calculate the power-law coefficients $b_1, \ldots, b_5$.
3. Weight Coefficients Tests. We generate instance j with randomly selected instance-parameters, measure the error of the synopsis for the query workload of the instance, and record the instance-profile and the measured error in an equation of the form:

$$a_1 L_j^{b_1} + a_2 Z_j^{b_2} + a_3 Q_j^{b_3} + a_4 R_j^{b_4} + a_5 S_j^{b_5} + a_6 - M_j - EEE_j = 0$$

4. where $L_j$, $Z_j$, $Q_j$, $R_j$ and $S_j$ are the parameters of instance j, $a_i$ are the variables that will hold the weight coefficients of the instance-parameters, $b_i$ are the power-law coefficients of the instance-parameters calculated in the previous step, $M_j$ is the measured error of the query workload of instance j, and $EEE_j$ is a variable the will hold the error-estimation error of the error of instance j. Once this equation is built the only unknowns are the $a_i$ coefficients and $EEE_j$.
5. Calculate Weight Coefficients. We add the equation from Step 3 to an accumulating set of equations and use the i log cplex 8.0 commercial solver [10] to minimize the sum of squares of the error-estimation errors $EEE_j$. The commercial solver returns the coefficients $a_1, \ldots, a_6$, building a function that minimizes the sum of error-estimation errors for the tests that were run. It also returns the variance of the error-estimation errors, indicating the accuracy of the error-estimation function.
6. Verify Accuracy. Note that since we assume the instance-parameters are independent, and there are only five instance-parameters, then under perfect conditions five equations should have been enough. But given the errors, we need a convergence mechanism and we do that by testing the variance returned from the solver. If the variance of $EEE_j$ is greater than e and the number of equations is smaller than γ (e and γ are pre-specified constants) to to Step 3.

Figure 17:
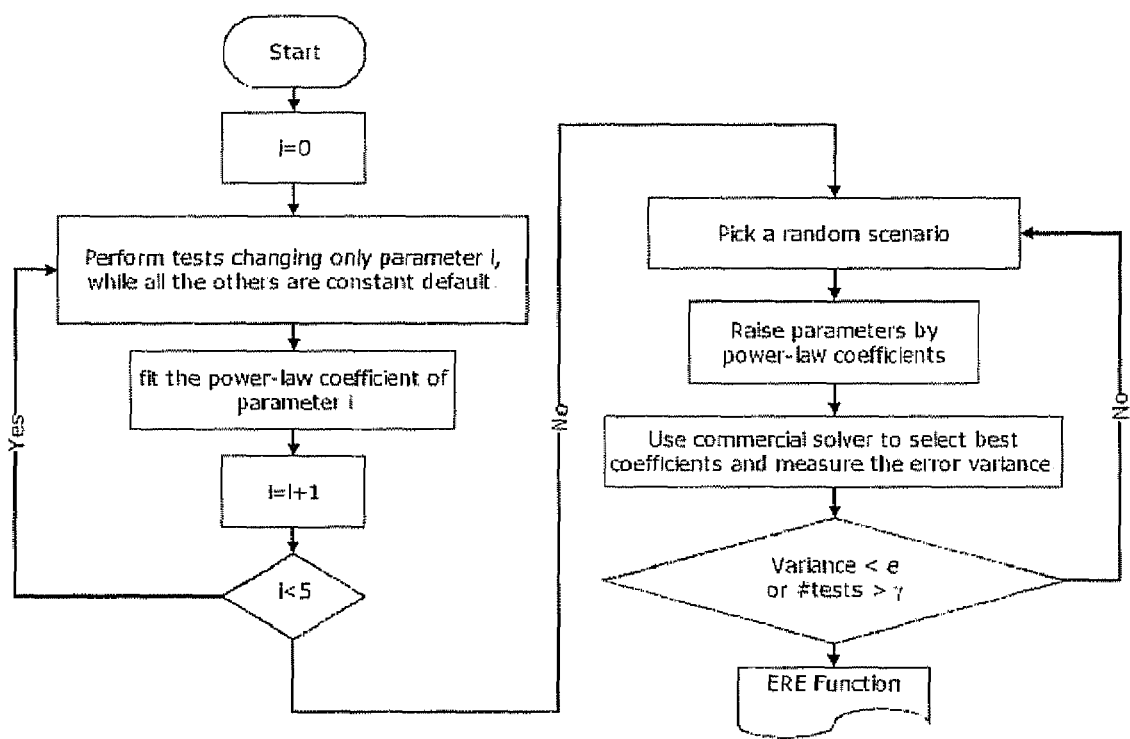
FIG. 17 describes the calibration process. The calibration of a synopsis consists of least-square-fittings for the various instance-parameters, and an iterative refinement process describes selecting random instance-parameters, measuring the error, raising the instance-parameters to the value of the power-law coefficients and solving the linear equations. The process continues until the variance of the total error of the solution is smaller than a pre-specified error parameter e or until the number of iterations is bigger than g. The result is the synopsis function EEt.
Figure 18:
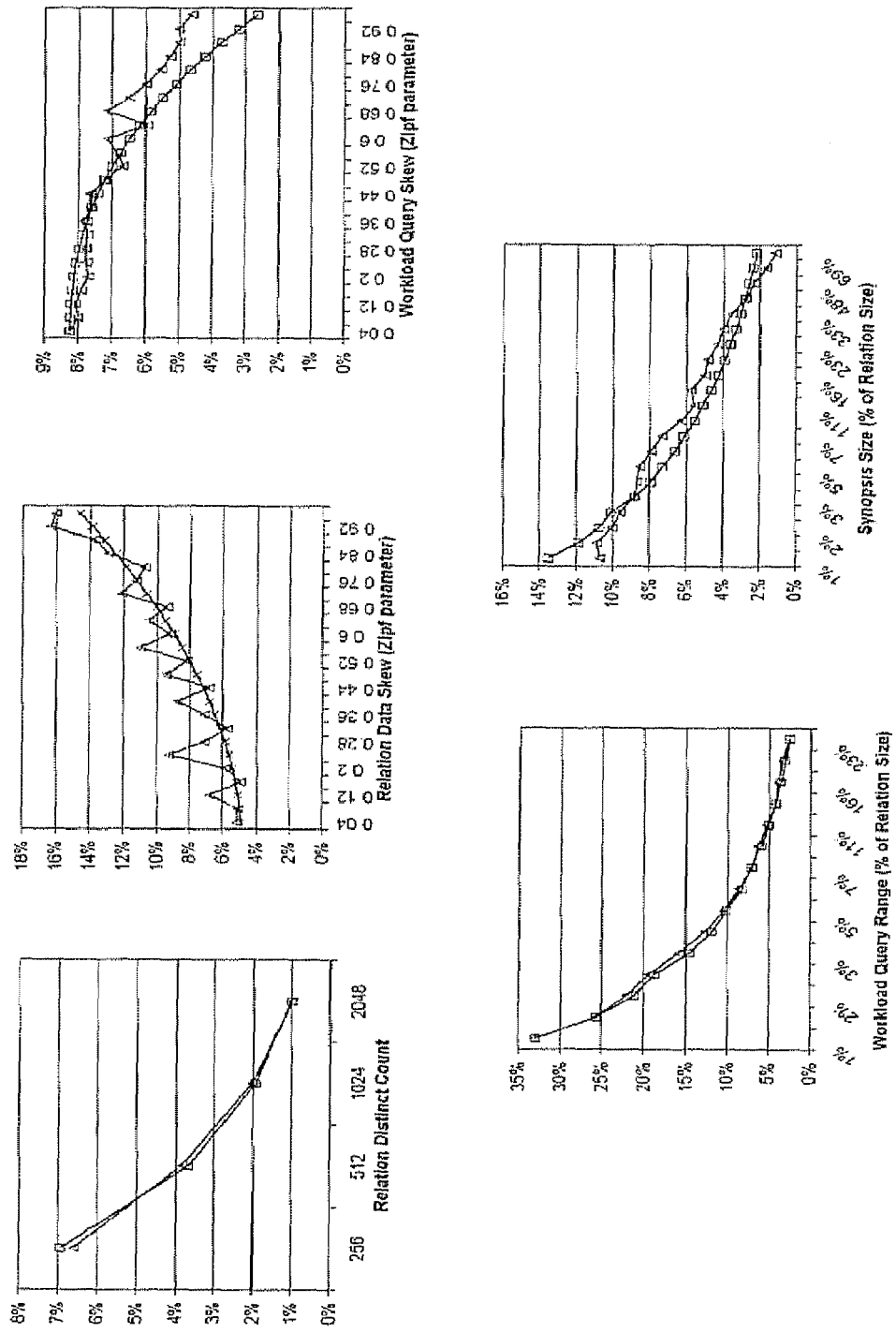
FIG. 18 describes the error (y axis) vs. instance-parameters describes Relation distinct count (from 256 to 2048), Relation data distribution skew (from 0.02 to 0.6 Zipf), Workload query distribution skew (from 0.02 to 0.6 Zipf), Workload Query Range (from 1% to 25% of the relation size) and Synopsis Size (from 1% to 70% of the relation size). The plot with triangles is the measured error, and plot wilt squares is the fitted Power-Law function.

FIG. 17 shows a flowchart of the calibration process, giving an overview of the process. A pseudo-code of the calibration process can be found in FIG. 16. First calculating the power-law coefficients, and then solving linear equations, makes the calculation much simpler and faster than solving equations of sum of power-law functions, since linear equations are much easier to solve. The accuracy of the resulting error-estimation function depends on three constants λ, γ and e, that control the number of the tests and operations. The computation cost of the error-estimation function is as follows: In step 1 we run λ tests per parameter, a total of 5-λ tests. At most γ more tests are performed in step 3 (possibly less than γ, depending on the value of e) and for each of those tests, we run the solver (step 4). So the total cost of the calibration process is 5-λ+γ tests and at most γ executions of the solver. Note that the number of tests and operations is a constant, depending on the given parameters Theoretical Section 2.2.1 Example Calibration Below is an example of running the calibration process on the Golden Estimator data synopsis [25]. First step was to measure the effect of each parameter separately on the error. For each parameter; we ran several tests, varying that parameter through the entire range, while all the other instance-parameters are constant. FIG. 17 shows separate plots of the error as a function of each parameter. Next we use least square fitting, to fit each of the instance-parameters in FIG. 1 to the function $aX^b + c$. The result of the fitting was:

$$b_1 = -0.874, b_2 = 0.112, b_3 = -0.015, b_4 = -0.815, b_5 = -0.509$$

Next we generate an instance with randomly selected instance-parameters, measure its error, and for each parameter in the instance-profile, we raise the parameter to the power of its power-law coefficient, and record the equation. For example, we generated the relation, workload and synopsis of the following instance-profile: <1024,0.2,0.6,0.04, 0.16> and measured its error. The result of the measured error was 0.025, and so the equation was:

$$a_1 \cdot 1024^{-0.874} + a_2 \cdot 2^{0.112} + a_3 \cdot 0.6^{-0.015} + a_4 \cdot 0.04^{-0.815} + a_5 \cdot 0.16^{-0.509} + a_6 = 0.025 + EEE_j$$

After recording each equation, we use a commercial solver to minimize. The sum of squares of $EEE_j$ of all recorded equations. We defined the constant e to be 0.001, and continued to add more and more equations, until the variance of $EEE_j$ was smaller than e, after 12 tests. The commercial solver outputted the values for $a_i$:

$$a_1 = 10.545, a_2 = 0.218, a_3 = 0.819, a_4 = 0.002, a_5 = 0.002, a_6 = -1.042$$

Finally the derived error-estimation function is:

$$EE_\tau(\Delta) = 10.545 \cdot L^{-0.874} + 0.218 \cdot Z^{0.112} + 0.819 \cdot Q^{-0.015} + 0.002 \cdot R^{-0.815} + 0.002 \cdot S^{-0.509} - 1.042$$

Figure 23:
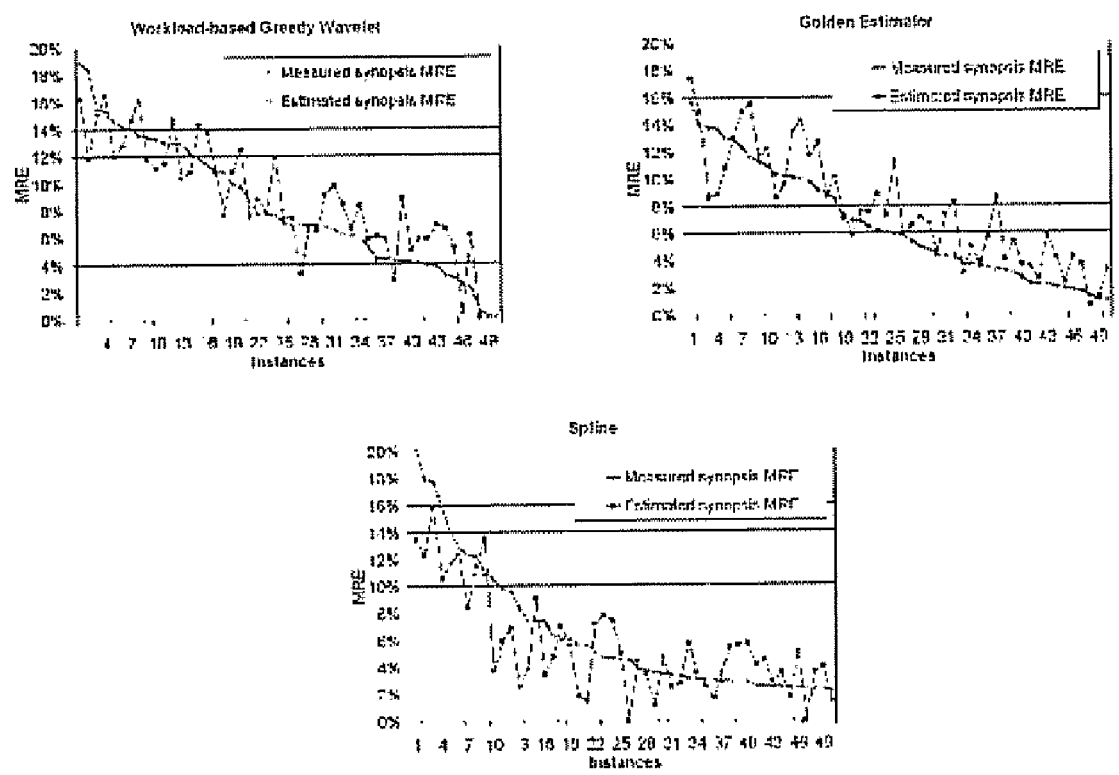
FIG. 23 describes measured error vs. estimated error using several synopses types on 50 instances with randomly selected instance-parameters with synthetic data sets. The instance results are sorted by the measured error in decreasing order. Note how the estimated error is quite close to the measured error for all the synopses types used.

FIG. 23 depicts the results of 50 tests, comparing the measured synopsis error with the estimated synopsis error returned from the above function.

Theoretical Section 2.3 Data and Query Workload Profiling

The error-estimation function above, requires as parameters the specifications of the relation and query workload of the instance. The function requires the relation distinct count (L), the relation data distribution Zipf parameter (Z), the workload query distribution Zipf parameter (Q) and the workload query average range (R). These can also be obtained in a pre-processing phase that needs to be performed only once, or whenever the relations or query workload change significantly. For relations, we estimate the cardinality of the relation (distinct count) using techniques from [3], and fit a Zipf parameter to the relation data distribution as described in Section 2.3.1. For query workloads, the number and average range of the queries are calculated, and the Zipf parameter of the query distribution is again fitted using the same technique as described in Section 2.3.1. The computed statistical data can be stored in a simple relational data structure.

Any errors in the approximation of the relation or query workload specifications, will directly affect the synopsis error-estimation. The level of the effect depends on the coefficients calculated in the calibration process. If, for example, a synopsis is very highly influenced by relation data distribution skew, then it will have high weight and power coefficients for this parameter, and any error in the approximation of the relation data distribution skew, will be immediately felt in the result of the function. A significant change to the specifications of the relation or query workload will have a similar effect on the accuracy.

Theoretical Section 2.3.1 Estimating the Relation Data Distribution Skew Zipf Parameter It is well known that real-life relations can be well approximated by a Zipf distribution. According to Zipf's law, Zipfian distributed data, when aggregated and sorted, can be approximated by a power-law function, and the Zipf parameter is the power-law coefficient of that function. We can use the same least-square-fitting algorithm described in [24] in order to fit a power-law function to the sorted data, and thus find the Zipf parameter of the relation. The same applies for query workloads—we look at the "low" attribute of each query as the data, and profile it the same way we profile a relation.

Sorting a very large relation consumes a lot of resources, so in order to improve performance we identify the appropriate Zipf parameter by using a smaller sample of the relation, using sampling methods as in [8]. The sample is then sorted according to value, and then linear-squared-fitting is performed on the sorted sample to derive the distribution skew Zipf parameter. Note that the bigger the sample we choose, the more accurate the result will be, but since this value is only intended for the error-estimation function, a relatively small sample will suffice.

Theoretical Section 2.3.2 Effectiveness of Profiling Using a Sample

Figure 19:
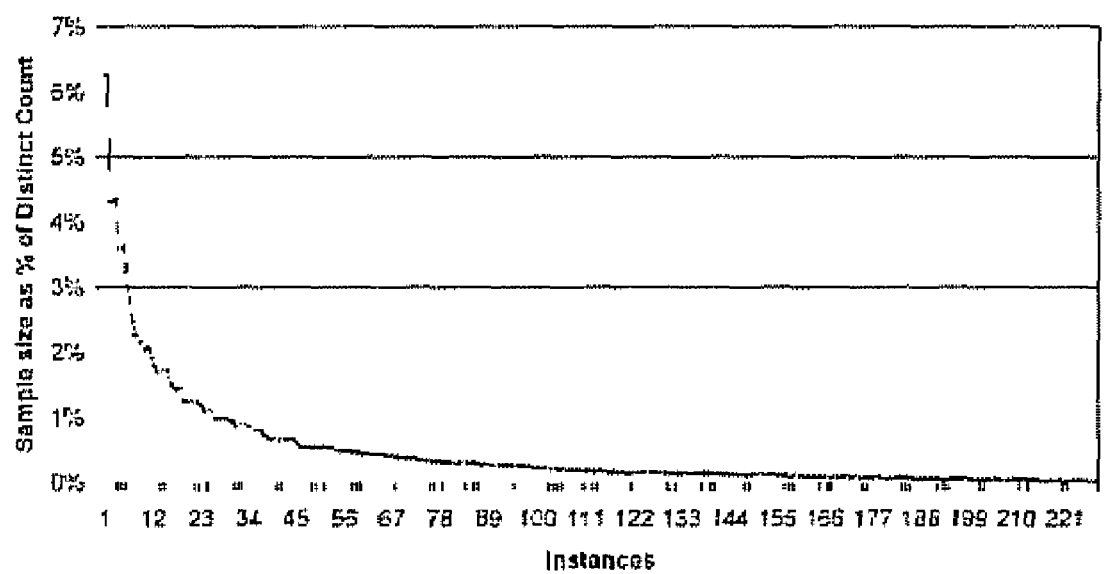
FIG. 19 describes required sample size as percent of the relation distinct count to achieve a maximum approximation error of 0.025 Zipf when calculating the relation data distribution skew. The results are sorted according to the sample size in descending order.

In order to improve performance during the profiling of the relations, we utilize a backing-sample. We now consider how large a sample is required in order to accurately estimate the data distribution skew. We generated 230 synthetic relations, with random sizes ranging from 4 m to 64 m tuples (with 4 k to 64 k distinct count respectively), and a random data distribution skew ranging from 0.1 to 0.8 Zipf. We then profiled the full relation, and made several profiling attempts on a sample of the relation, increasing the sample size every time, until the error in identifying the Zipf parameter was less than 0.025. FIG. 19 shows for each one of the relations, the minimal sample size (as percent of the original relation) necessary for an accurate profiling of the relation. The results show that on average a sample size of 0.0005% of the relation size (or 0.5% of the distinct count), and a maximum of 0.006% of the relation size (or 6% of the distinct count) is enough for an accurate profiling of the original relation.

Theoretical Section 2.4 Single Query Error Estimation

One of the applications for the error estimation functions, is the error estimation for a single query. When using a synopsis to approximate a query answer, having an estimate on the accuracy of the response is highly desirable. Some, but not all of the synopses, give a bound on the error. This bound is not always very tight, and the actual result might be much better.

Figure 20:
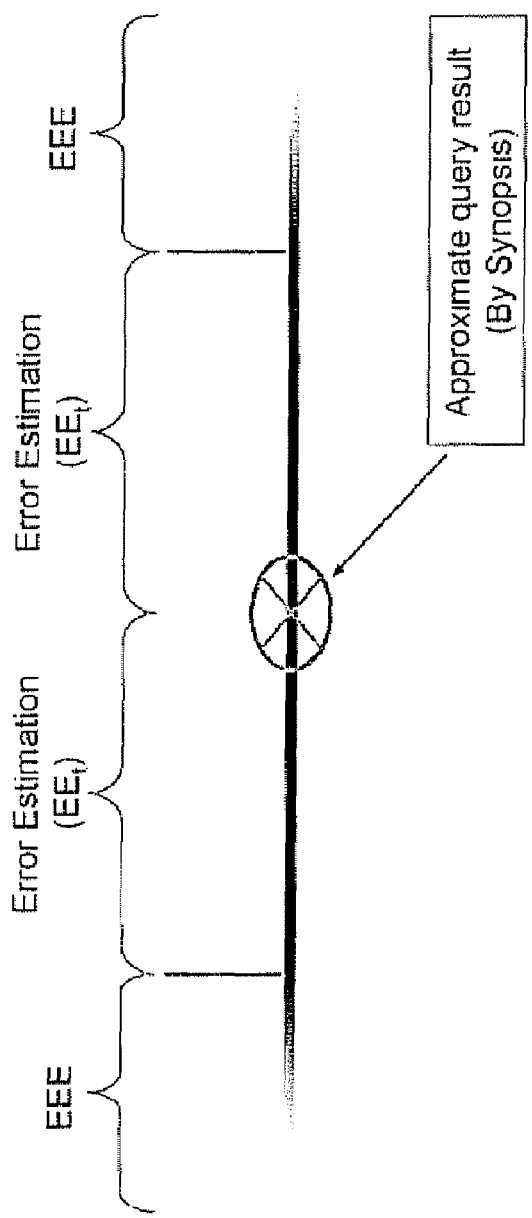
FIG. 20 describes synopses error estimation ranges. The diagram describes the ranges of the possible estimation errors around the approximate query result. The first range is the estimation of the synopsis error by the error-estimation function, and after that the error of the error-estimation function (EE). The intensity of the color represents the probability of the error estimation error, as in FIG. 15.
Figure 21:
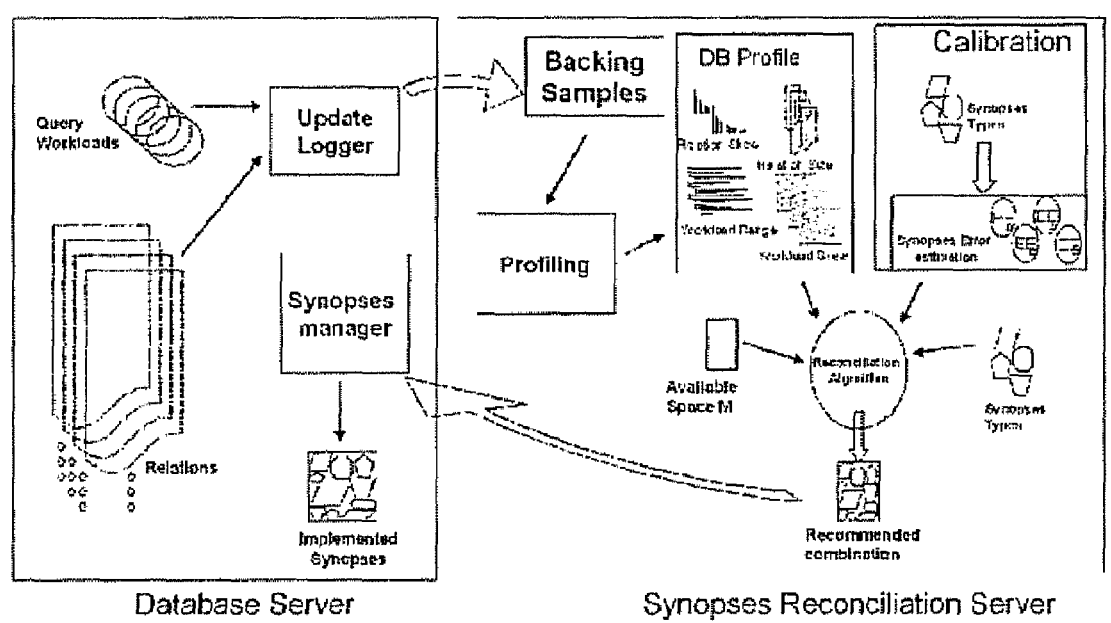
FIG. 21 describes an exemplary solution to the dynamic synopses reconciliation problem. The query workloads and the updates to the relations are intercepted and collected by the Updates Logger, and then transferred to the reconciliation server, where they are profiled. The synopses reconciliation process receives as input the profiles of the relations and query workloads, the error-estimation functions, the available synopses types and the memory space limit, and outputs the recommended combination. The recommended combination is then transferred back to the operational database for implementation.
Figure 22:
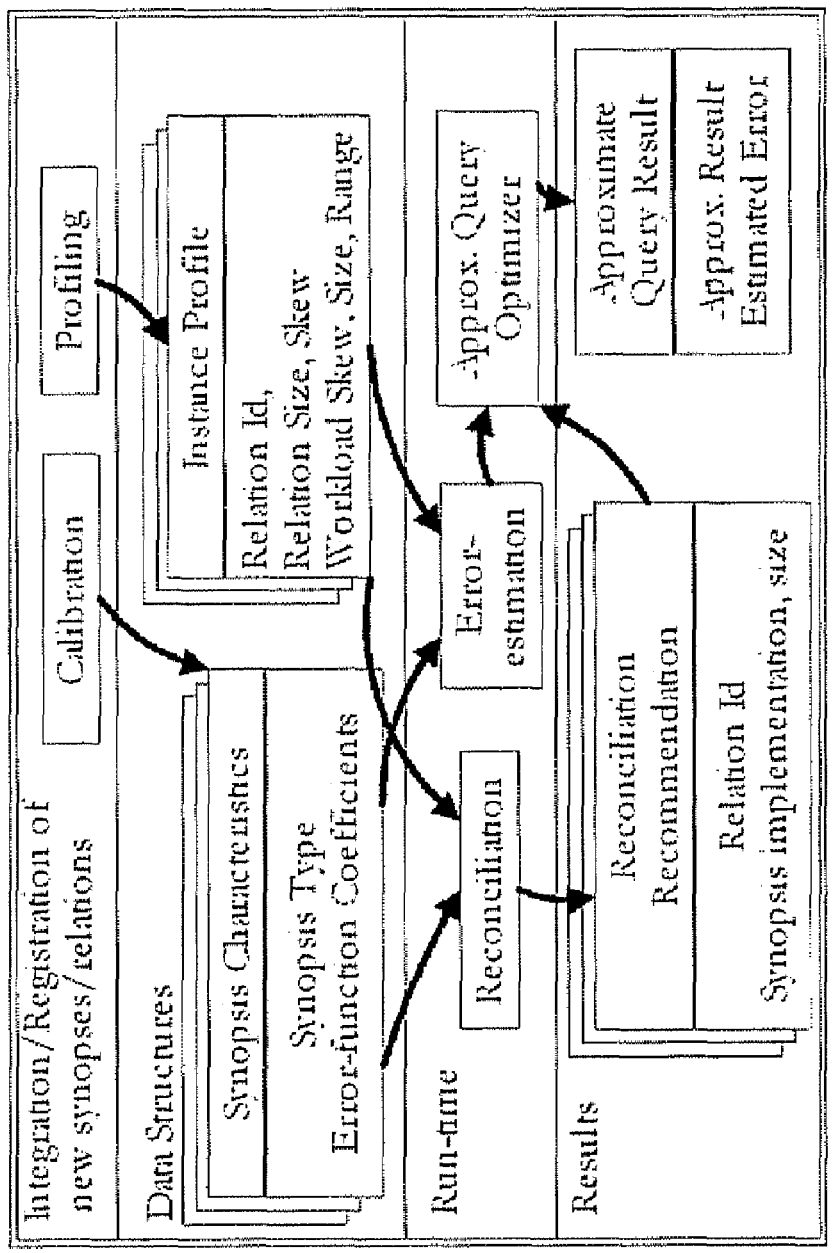
FIG. 22 describes data flow relationships between the different data structures and processes of the Synopses Reconciliation Server.
Figure 27:
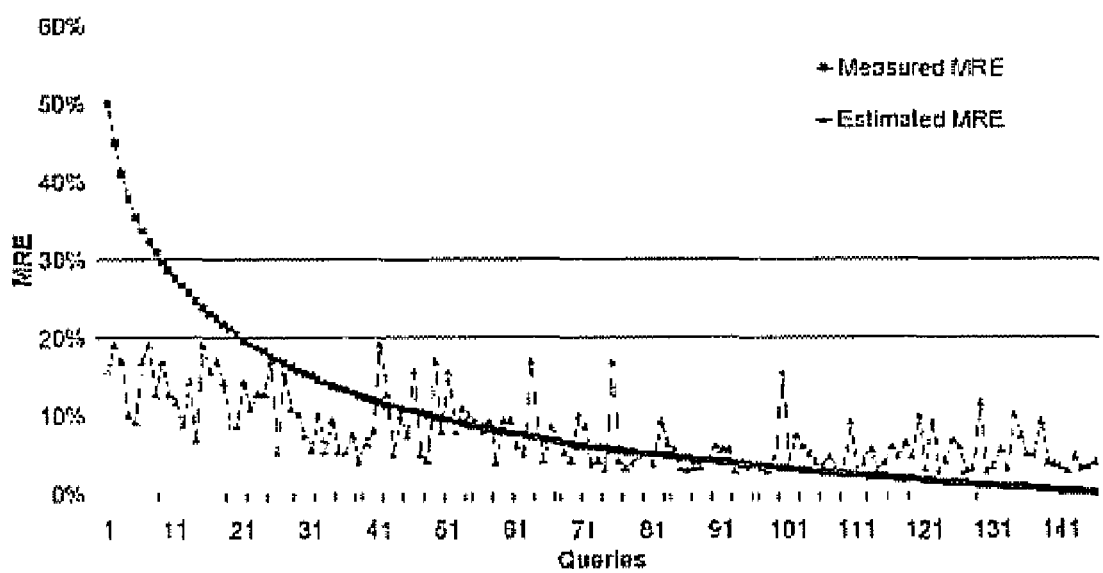
FIG. 27 describes measured and estimated error of running 150 queries of an instance consisting of a relation with 64 m tuples with data distribution skew Zipf parameter of 0.4, and a Workload-based Greedy Wavelet synopsis of 100 coefficients. The queries are sorted by the measured error. Note that the EEE is less than 20% for 96.7% of the queries.

The error estimation functions can be used to give an estimate of the result quality for ad hoc queries. In our experiments the error-estimation functions estimate the approximation error of 81%-83.7% of the queries with an error-estimation error which is less than 10%. FIG. 20 depicts how the approximation error may be displayed, with an error range around the approximate error result. The range consists of the estimated error computed by $EE_\tau$ and the additional error estimation error EEE, which is shown with different color intensities, to represent some known probability distribution of EEE. The probability distribution for EEE can be a global probability distribution computed for that synopsis type, or it could be a more refined probability distribution. For instance, it may be the probability distribution of $EE(EE_\tau)$, that is, for the particular value of $EE_\tau$ (as illustrated in FIG. 27).

Theoretical Section 3 Synopses Reconciliation

We show how to obtain efficient synopses reconciliation algorithms, using the synopses error-estimation functions. Recall that the problem of synopses reconciliation is defined as: Given a set of relations, a query workload, a set of synopses types and a space limit, find a combination of data synopses (synopses sizes and synopses types) that will achieve a low approximation error for the given workload.

The synopses reconciliation problem is a minimization problem, and should be solved as such. There are several challenges: there are many parameters that affect the error; the effect is not linear; the effect is different for different synopses types; and it is in some cases arbitrary because of the random sampling used in many synopses. The algorithms proposed in [12, 13, 14, 15, 16], overcome the above problems by physically testing many combinations, and selecting the one with the lowest error. The heuristic proposed in [12] relies on the basic assumption, that as the synopsis size grows the error shrinks, but it shrinks more and more slowly—at first the gain is large, and the gain decreases as the synopsis size grows. This assumption holds for most synopses types. In [16] the authors reduce the number of accesses to the database by eliminating many improbable combinations, and using incremental update of the synopsis instead of fully rebuilding it. But even with heuristics the number of accesses to the database, which are performed only for the purpose of estimating the synopses errors, is very large.

The main difference between our approach and previous approaches is that during the optimization algorithm no tests are performed against the original relations. The purpose of physically testing an instance is to calculate the error of that instance, and since the error-estimation function does exactly that, replacing the physical tests with a call to the error-estimation function, will lead to an efficient synopses reconciliation algorithm.

Furthermore, the heuristic suggested in [12], "the greedy algorithm with remedy", was built to work around the problem of the sometimes arbitrary results output by the synopsis. The solution was to always physically test two instances ahead instead of one in order to avoid unexpected non-monotonous peaks. Since the error-estimation function derived in the calibration process is already monotonous and connected, there won't be any peaks, and the "remedy" they had to perform can be ignored, achieving an even better performance gain during the synopses reconciliation process. Estimation error of multiple synopses. The quality of a solution to the synopses reconciliation problem is determined by the error of the output synopses combinations. We describe here our approach for measuring the quality of a solution. Recall that in Section 2 we defined the estimation error of an instance $<\rho,\omega,\sigma>$. We extend this definition to describe the error of multiple instances: Let $P=\rho_1, \ldots, \rho_n$ be a set of relations, let $\Omega$ be the set of queries submitted to those relations and let $\Sigma=\sigma_1, \ldots, \sigma_n$ be the set of synopses built over those relations. Given $r_i$ the actual result of query $q_i$, and $r'_i$ the estimated result of query $q_i$ when submitted to the synopsis, the estimation error of multiple synopses is defined as:

$$E^*(P, \Omega, \Sigma) = \frac{1}{|\Omega|} \sum_{q_i \in \Omega} \left| \frac{r_i - r'_i}{r_i} \right|$$

For convenience we divide the queries in $\Omega$ into query workloads according to the relation they are submitted to, so that $\Omega=\omega_1, \ldots, \omega_n$ where $\omega_i$ is the workload of queries submitted to relation $\rho_i$. The definition of $E^*$ can be then rewritten as:

$$E^*(P, \Omega, \Sigma) = \frac{1}{|\Omega|} \sum_{j=1}^{n} |\omega_j| \cdot E(\rho_j, \omega_j, \sigma_j)$$

We also define the measured and estimated error of multiple synopses $mE^*$ and $eE^*$ using the previously defined $mE$ and $eE$ respectively:

$$mE^*(P, \Omega, \Sigma) = \frac{1}{|\Omega|} \sum_{j=1}^{n} |\omega_j| \cdot mE(\rho_j, \omega_j, \sigma_j)$$

-continued $$eE^*(P, \Omega, \Sigma) = \frac{1}{|\Omega|} \sum_{j=1}^{n} |\omega_j| \cdot eE(\rho_j, \omega_j, \sigma_j)$$

Recall that EEE is defined to be the difference between eE and mE. Given a set of relations P, a set of query workloads $\Omega$ on those relations and a combination of synopses $\Sigma$, we define $EEE^*(P,\Omega,\Sigma)$ as:

$$EEE^*(P,\Omega,\Sigma) = |eE^*(P,\Omega,\Sigma) - mE^*(P,\Omega,\Sigma)|$$

For convenience, when P and $\Omega$ can be understood from the context, we denote $E^*(P,\Omega,\Sigma)$ and $EEE^*(P,\Omega,\Sigma)$ also as $E^*(\Sigma)$ and $EEE^*(\Sigma)$ respectfully.

The synopses reconciliation problem. The synopses reconciliation problem can be more formally defined as follows:

Input:
  $P=\rho_1, \ldots, \rho_n$—a set of relations
  $\Omega=\omega_1, \ldots, \omega_n$—a set of workloads over those relations.
  $T=\tau_1, \ldots \tau_k$—a set of synopses types.
  M—available memory.

Output: $\Sigma=\sigma_1, \ldots, \sigma_n$—a set of synopses, subject to $\Sigma|\sigma_i|=M$ Objective: Minimize $E^*(P, \Omega, \Sigma)$ A primitive used by all known synopses reconciliation algorithms is to compute the error of a particular instance $<\rho_i, \omega_i, \sigma'>$ where $\sigma'$ is a candidate synopsis for the solution. The error computation is usually done via straightforward measurement. Our profile-based synopses reconciliation approach is to replace the error measurement with an error estimation. In particular, $E(\rho_i, \omega_i, \sigma')$ can be obtained by invoking the error-estimation function $EE_\tau$ (with $\tau$ being the type of $\sigma'$) on the profile of the instance $<\rho_i, \omega_i, \sigma'>$, without actually building the synopsis $\sigma'$, and without accessing $\rho_i$.

Given a synopses reconciliation algorithm, the combination of synopses recommended by the algorithm may be different depending on whether it uses actual synopses-error measurement, or the synopsis-error estimation suggested in this theoretical discussion. We define the measured-based combination as the synopsis-combination recommended by the algorithm when using an actual measurement of synopses errors, and we define the estimated-based combination as the synopsis-combination recommended by the algorithm when using a synopsis-error estimation function.

Theoretical Section 3.1 Synopses Reconciliation Error vs. Synopsis Error Estimation Error Given a set of relations and a query workload, the synopses reconciliation process attempts to find an optimal combination that will yield a minimal error. Using an approximated error estimation in order to improve the performance of the synopses reconciliation process introduces errors to the optimization problem, moving the recommended solution away from the optimal solution. We are interested in this error and how it impacts the quality of the synopses reconciliation results.

We show that the error-estimation error of the results of the synopses reconciliation depends on the error-estimation error of the error-estimation function, and that it is bounded. The difference between the actual error of the measured-based combination and the estimated-based combination is bounded by the sum of the error-estimation errors at those combinations:

Lemma 1 [Reconciliation Error] Consider a synopses reconciliation algorithm in which P is the set of relations, $\Omega$ is the set of query workloads, C is the set of considered synopses-combinations, $\Sigma_m \in C$ is the measured-based combination and $\Sigma_e \in C$ is the estimated-based combination. Then, $$mE^*(P,\Omega,\Sigma_e)-mE^*(P,\Omega,E_m) \leq EEE^*(P,\Omega,\Sigma_m)+EEE^*(P,\Omega,\Sigma_e)$$

Proof: By definition of $\Sigma_m$ and $\Sigma_e$, for all $\Sigma \in C$:

$$mE^*(\Sigma_m) \leq mE^*(\Sigma) \quad (3)$$

$$eE^*(\Sigma_e) \leq eE^*(\Sigma) \quad (4)$$

If $eE^*(\Sigma_e) \leq mE^*(\Sigma_m)$ then by (2) we have $$eE^*(\Sigma_e) \leq mE^*(\Sigma_m) \leq mE^*(\Sigma_e)$$

and therefore $$|mE^*(\Sigma_m)-mE^*(\Sigma_e)| \leq |eE^*(\Sigma_e)-mE^*(\Sigma_e)|=EEE^*(\Sigma_e)$$

If $mE^*(\Sigma_m) \leq eE^*(\Sigma_e)$ then by (3) we have $$eE^*(\Sigma_e) \leq eE^*(\Sigma_m)$$

and therefore $$mE^*(\Sigma_e)-mE^*(\Sigma_m)=$$

$$mE^*(\Sigma_e)-eE^*(\Sigma_e)+eE^*(\Sigma_e)-mE^*(\Sigma_m) \leq$$

$$mE^*(\Sigma_e)-eE^*(\Sigma_e)+eE^*(\Sigma_m)-mE^*(\Sigma_m) \leq$$

$$|mE^*(\Sigma_e)-eE^*(\Sigma_e)|+|eE^*(\Sigma_m)-mE^*(\Sigma_m)|=$$

$$EEE^*(\Sigma_m)+EEE^*(\Sigma_e)$$

Theoretical Section 3.2 Run Time Analysis

The usage of the error-estimation functions requires several pre-processing phases:

1. Every relation and query workload undergoes a profiling process, measuring its specifications. Using a backing sample as recommended above, the process will take $O(m \cdot \log m)$ time for each relation, where m is the size of the sample.
2. Every synopsis type goes through a calibration process, which runs a constant number of tests on relatively small relations.

By depending on the results of the pre-processing phases, it is possible to complete the entire synopsis reconciliation process without accessing the original relations at all and without adding anything to the complexity of the algorithm. Adding support for multiple synopses types, requires the error estimation of every instance using all synopses types, which means multiplying the complexity of the synopses reconciliation process by the number of synopses types.

Theoretical Section 3.3 Dynamic Synopses Reconciliation

Operational databases are dynamic, and their relations and query workloads tend to chance over time. These changes affect the overall error of the system, and reallocation of synopses memory space is required in order to maintain a low error. For example, if one of the relations grows in size, while its synopsis does not, the approximation error of that synopsis will increase, increasing the approximation error of the entire system. In this case allocation of more space to this synopsis, decreasing the space allocation from the other synopses will probably achieve a lower error for the entire system.

Existing synopses reconciliation algorithms rely on building synopses and submitting queries to the original relations, tasks that consume considerable amounts of resources and are not usually tolerated with large operational systems. An algorithm for an efficient dynamic synopses reconciliation, should minimize or completely avoid accessing the operational database.

Dynamically updating the specific synopsis is a separate issue of building and maintaining the best synopsis under the given space. Both the error-estimation function and the synopses reconciliation process assume that the synopsis is up-to-date, and so if the relation changes, an incremental update of the synopsis is required (see, e.g., [8, 20]). Workload-based synopses should also be dynamically updated as the query workload changes (e.g. [22]).

The dynamic synopses reconciliation problem is as follows: Given updates to P (that is, updates to the various relations $\rho_i$, and additions of new relations to the set), to $\Omega$, to M and perhaps also to T, maintain a good approximation for the appropriate updated $\Sigma$.

The proposed architecture for the solution of the static and dynamic synopses reconciliation problems is depicted in FIG. 9. It is comprised of two separate servers: the Synopses Reconciliation Server (SRS) and the Database Server, which can reside on the same machine or on two separate machines. When a new synopsis type $\tau$ is integrated into the system, it goes through a calibration process (as described in Section 2.1) resulting with an error-estimation function $EE_\tau$. The calibration process is performed in the calibration module of the SRS (as depicted in FIG. 9), or it can be performed on a completely different server. The computation of the instance-profiles requited for the synopses reconciliation can be based on a backing sample of the relations and of the query workloads [8], using the updates logger module of the database. The synopses reconciliation process can be performed on the SRS without any interaction with the database server, using the pre-computed error-estimation functions and instance profiles. The reconciliation process outputs the recommended combination and the estimated gain of the new combination, which are then returned to the operational database for implementation.

FIG. 10 describes the data flow relationships between the different components of the Synopses Reconciliation Server and the different stages where the components are used. In the integration/registration phase the calibration and profiling processes collect information on the synopses, relations and query workloads and store them in the synopses characteristics and instance profile data structures. These data structures are then used as input for the reconciliation process and other error estimation applications. The reconciliation results are stored in the reconciliation recommendation data structure prior to implementation. The approximate query) optimizer executes approximate queries submitted by users, also calling the error estimation process to receive an estimate of the error.

The proposed solution to the problem does not require accessing the original relations at all before or during the synopses reconciliation process. We only need to access the original relations for the purpose of building or rebuilding the synopses after the synopses reconciliation process has finished. Since the results, and an estimate of the gain, are received before the synopses are built, one can choose whether to rebuild the synopses or not, saving a lot of resources on fruitless attempts. The process of rebuilding the synopses can also be optimized as in [8], by building the synopses based on the same backing-sample used before.

In Section 4.4 we give examples of instances where a synopses reconciliation process executed after the underlying relations and query workloads have changed, lowers the total approximation error of the system by as much as 4.9%, even when only small changes to the query workload or data distribution were made.

In Real commercial DBMS the cost of the overhead is very important and the applicability of the dynamic synopses reconciliation process depends on it. The query optimizer in most commercial databases requires several statistics, which ale usually gathered periodically. These statistics usually include the ones required by the error-estimation function, and even if not, the process gathering the statistics already performs a scan of the relation (or a sample of it), and can be easily modified to also calculate the Zipf parameter of the distribution with no additional I/O operations. The use of the backing sample is recommended only for a few very large relations, where these statistics might not be gathered regularly (because of the high cost). Most commercial DBMS also maintain a history (or cache) of the query workload, and even if not, a small backing sample with a few hundred queries per relation should be more than enough in order to profile the query workload.

Theoretical Section 4 Experiments

We ran five sets of tests, measuring the accuracy of the error-estimation function and effectiveness of its integration with the different synopses reconciliation processes:

1. Measure the EEE of the error estimation functions using several synopses types over various instances.
2. Test the effectiveness of the error-estimation function for estimating the approximation error of single queries.
3. Perform synopses reconciliation using only one synopsis type. The purpose of this experiment is to compare our modified synopses reconciliation algorithms with the original synopses reconciliation algorithms of [16] and [12] who also used only one synopsis type in their synopses reconciliation algorithms.
4. Perform synopses reconciliation using multiple types of synopses, allowing the algorithm to select which synopsis type is best suited for each relation in the system.
5. Demonstrate the effectiveness and significance of having dynamic synopses reconciliation by measuring the gain from running a dynamic estimated-based synopses reconciliation process after the underlying query workload has changed.

For the experiments we implemented the algorithm of calibration from Section 2 and both synopses reconciliation algorithms presented in [12] and [16]. For convenience, we will refer to the algorithm proposed in [16] as KW, and to "the greedy algorithm with remedy" proposed in [12] as JJOT. The following synopses types were used: Spline Synopsis [14], V-Optimal histograms [11], Standard Wavelet [19], Workload-based Greedy Wavelet [21], and Golden Estimator [25]. The experiments were performed using a wide variety of Zipfian distributed synthetic and real-world relations. The above components were implemented in the τ-Synopses system [18]. A demonstration of the calibration and reconciliation implemented modules was given in [17].

Theoretical Section 4.1 Summary of Experimental Results

The experimental results can be summarized as follows.

Theoretical Section 4.1.1 Error Estimation Function

Error-estimation using synthetic data sets. FIG. 23 compares the measured with the estimated error of instances with synthetic data sets. The tests show an average EEE of 1.8%, and a maximum EEE of 6.4%, when the range of the measured error was between 0% and 20%. The relative error [EEE/mE] is at most 1.7.

Figure 24:
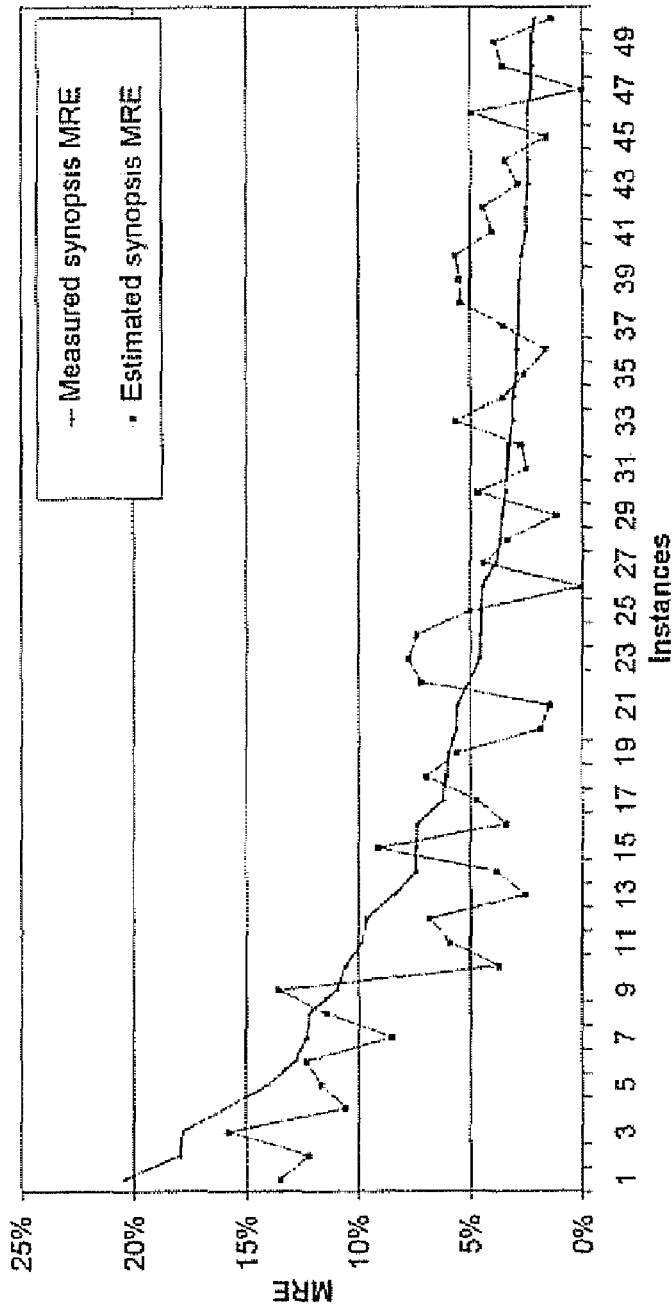
FIG. 24 describes measured error vs. estimated error using Spline synopsis on 50 instances with randomly selected instance-parameters with a real-world data set. The instance results are sorted by the measured error in decreasing order.

Error-estimation using real-world data sets. FIG. 24 shows the performance of the error-estimation functions when using the Spline synopsis with a real-world relation. The synthetic relations that we use, are pure Zipfian distributed relations, but even though the real-world relation that we use, CovType, is only partly Zipfian distributed, the results are still quite accurate, with an average FEE of 2%, a maximum BEE of 6.9%, when the range of the error was between 0% and 20%. The relative error [EEE/mE] is at most 2.41

Figure 25:
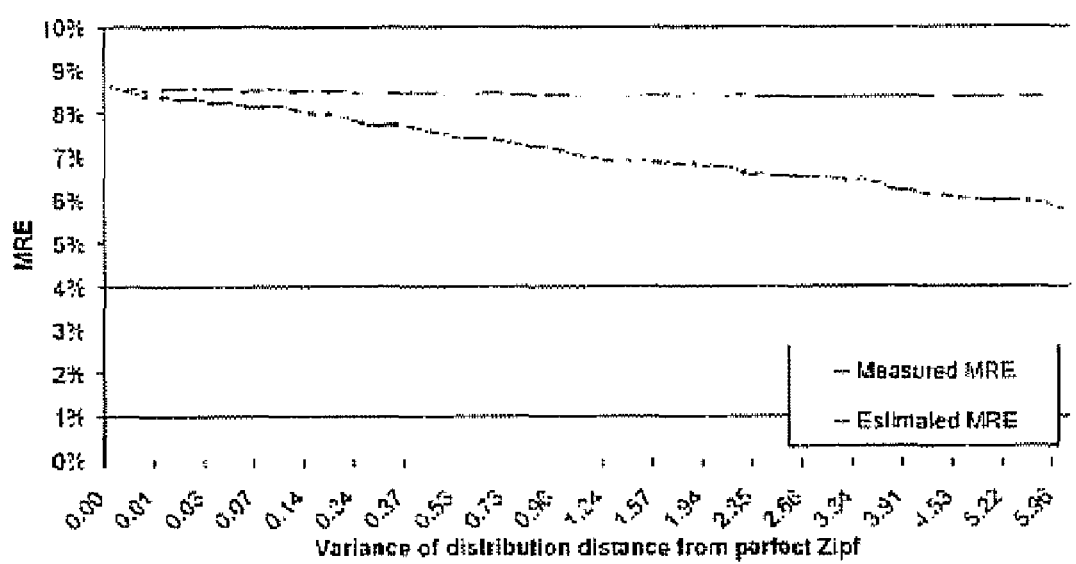
FIG. 25 describes robustness of the error-estimation to the assumption that the data has a Zipf-like distribution. In this experiment we took a relation with a perfect Zipfian distribution, and gradually modified the data moving the distribution away from Zipfian-like. The plot shows the measured and estimated error as a function of the variance of the distribution distance from Zipfian-like. Note how the estimated error remains the same while the measured error decreases, since the Zipf parameter of the Zipfian distribution that is computed to approximate the actual distribution is not affected by the changes that we made, but the actual data distribution was made easier to approximate.

Robustness of the error-estimation to the Zipf-similarity. In FIG. 25 we tested how robust the estimation is to the assumption that the data has a Zipf-like distribution. The results show that the EBB depends on how different the distribution is from a pure Zipfian like distribution. Note that in this experiment, the relative EEE reached as high as 45% but in our experience, for most real-world relations, the variance of the distribution distance from perfect Zipf distribution is less than 0.1, where the relative FEE is only 3.1%.

Figure 26:
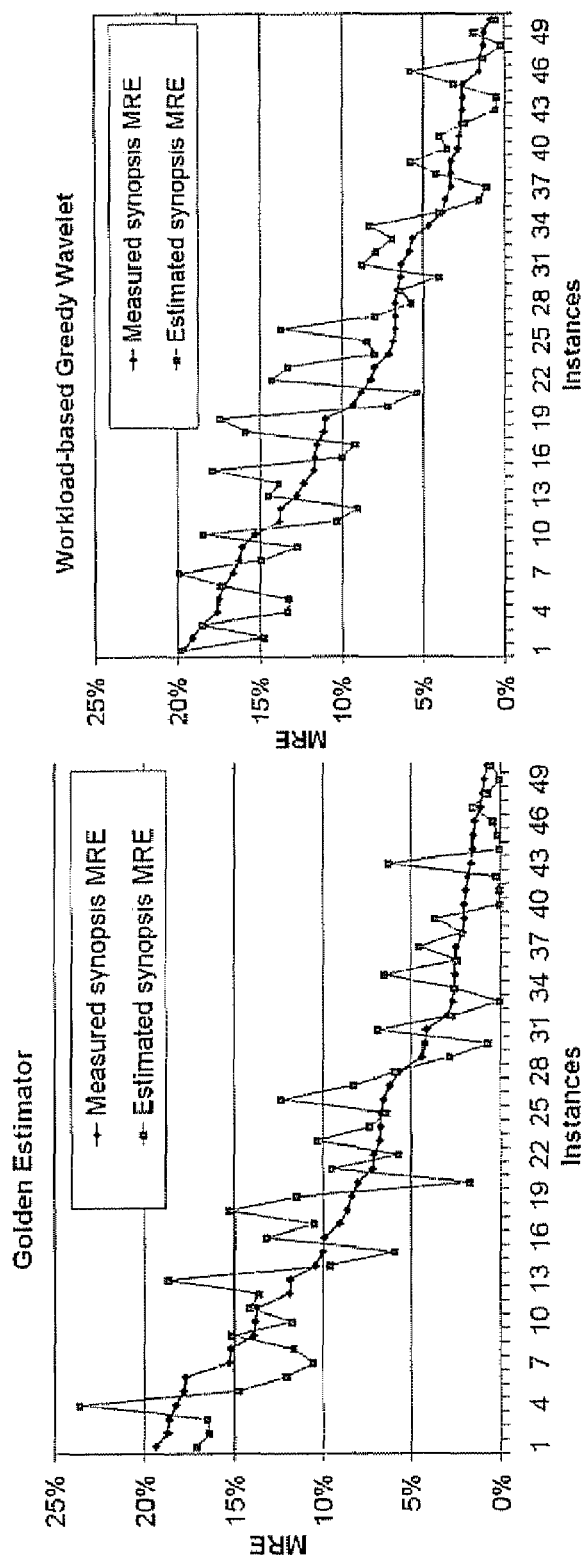
FIG. 26 describes measured and estimated error using Golden Estimator Synopsis (left) and Workload-based Greedy Wavelet (right) on 50 instances with randomly selected instance-parameters using large relations sizes 16 m to 128 m tuples. The instance results are sorted by the measured error in decreasing order.

Error-estimation using large relations. FIG. 26 shows error-estimation experiments performed with the Golden Estimator synopsis and the Workload-based Greedy Wavelet synopsis using large relations. The results are very similar to the results of the tests performed on the smaller relations: an average EEE of 2.3% and a maximum EEE of 6.9% when the range of the error is between 0% and 20%. The relative error [BEE/mE] is at most 2.83.

Error-estimation for a single query. FIG. 27 details an experiment measuring the error of single queries. Although the maximal EEE is 41%, it very rapidly descends, and is under 20% for 96.3% of the queries, and under 10% for 83.7% of the queries.

Theoretical Section 4.1.2 Synopses Reconciliation with One Synopsis Type

Figure 28:
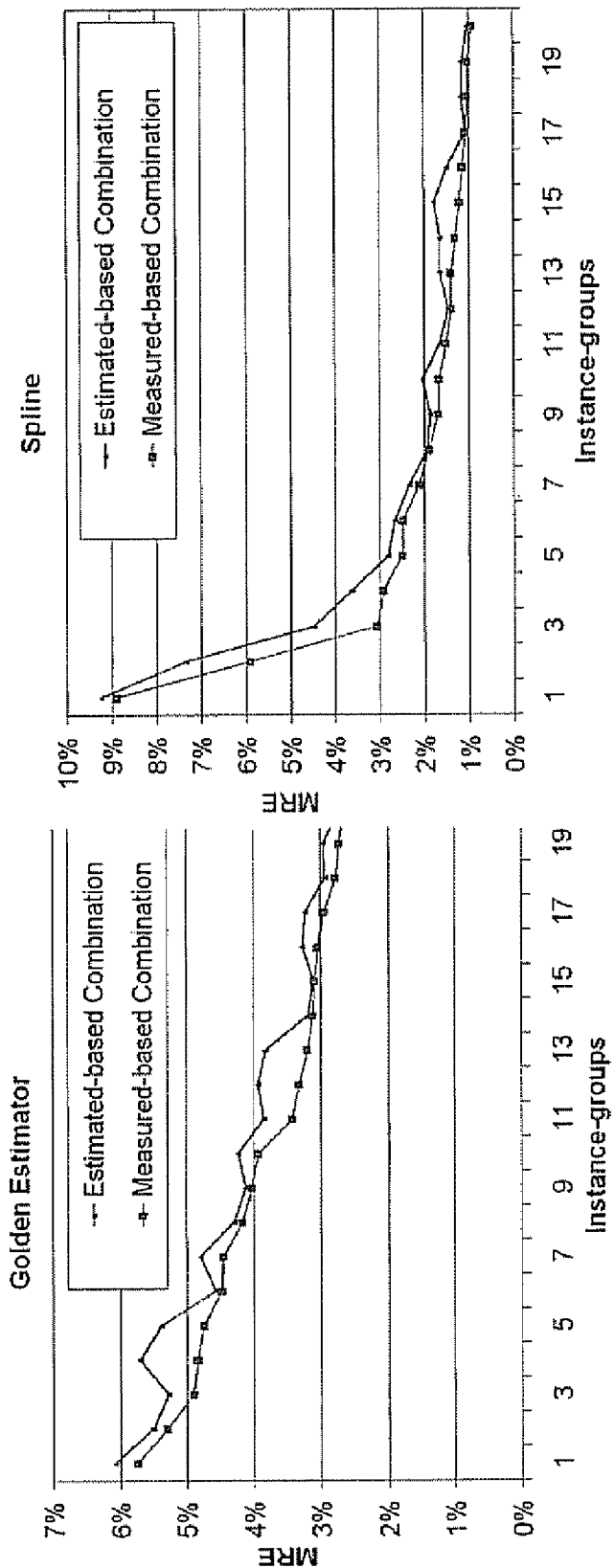
FIG. 28 describes error of measured-based and estimated-based synopses reconciliation, using the KW algorithm over 20 instance-groups consisting of instances with randomly selected instance-parameters and two synopses types—Golden Estimator synopsis (left) and Spline synopsis (right). The instance-groups are sorted by the error of the measured-based combination in decreasing order.

Synopses reconciliation with error-estimation functions. FIG. 28 shows the comparison of the total error of all queries between the estimated-based combination and the measured-based combination. A synopses reconciliation process as in [16] was performed using the Golden Estimator synopsis and the Spline synopsis. The experiment demonstrates how the estimated-based combination achieves results which are quite close to the measured-based combination—the maximum difference between them is 1%, and the average difference between them is 0.3%, when the range of error was between 0% and 10%.

Figure 29:
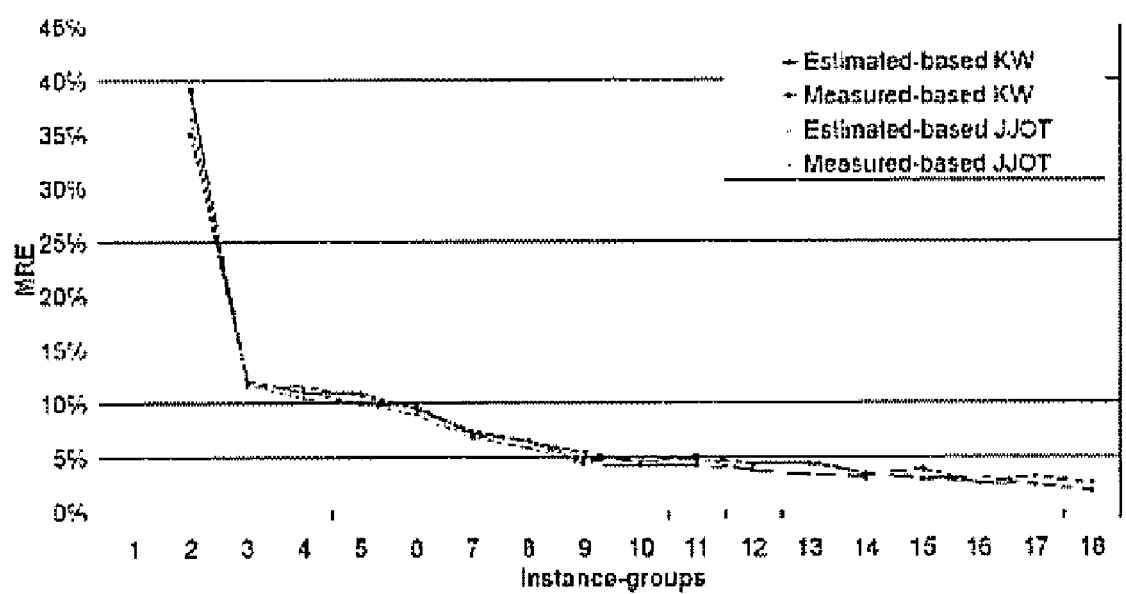
FIG. 29 describes error of measured-based and estimated-based combinations using both KW and JJOT algorithms over 20 instance-groups consisting of instances with randomly selected instance-parameters and the Spline synopsis type. The instance results are sorted by the measured error in decreasing order. The results of the algorithms awe so close together, that the four plots are almost indistinguishable.

Synopses reconciliation heuristics with error-estimation functions FIG. 29 shows the error of the estimated-based and measured-based combinations of both the KW and JJOT algorithms. The results show that the difference in the total error between the measured-based combination using KW and the estimated-based combination using JJOT (the technique described in this theoretical discussion) is at most 3.3% and on average 1%, when the range of the error was between 0% and 40%.

Theoretical Section 4.1.3 Synopses Reconciliation with Multiple Synopses Types

Figure 30:
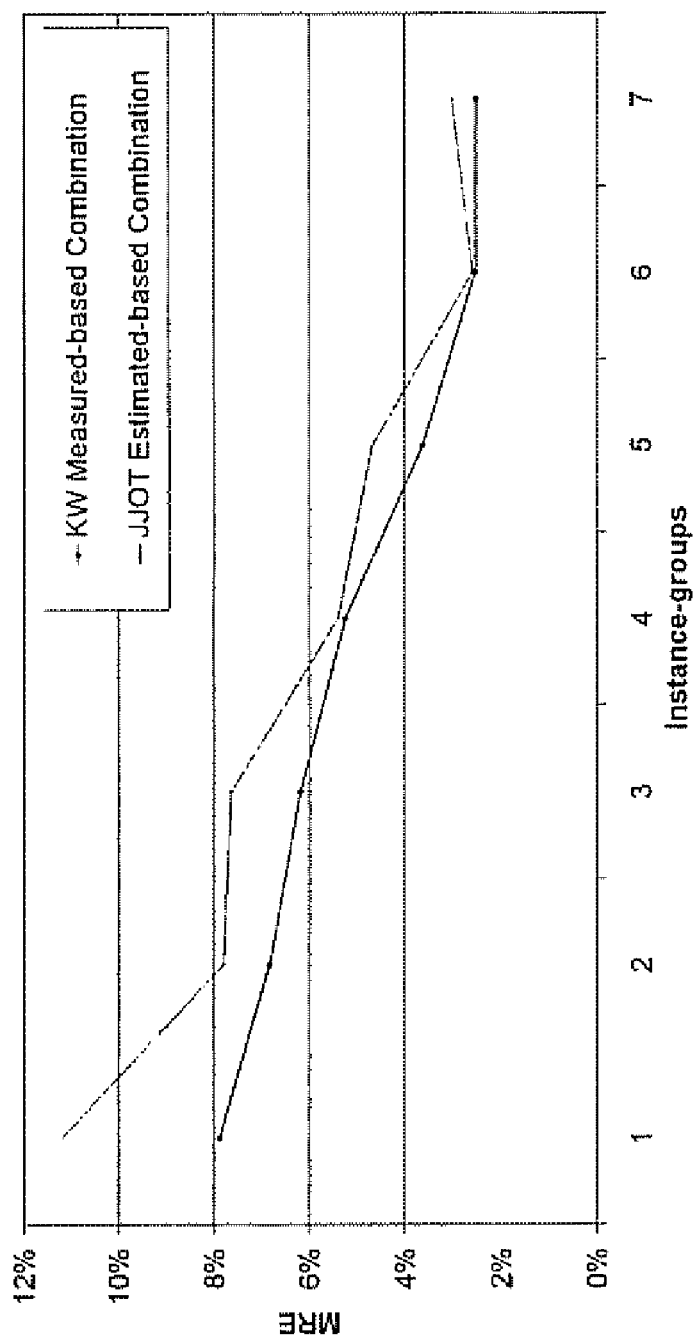
FIG. 30 describes error of measured-based KW and the estimated-based JJOT over 7 instance-groups consisting of instances with randomly selected instance-parameters. The synopses combinations are formed of a mixture of all the synopses types together. The instance results are sorted by the measured error in decreasing order.

FIG. 30 demonstrates the effectiveness of the proposed algorithm, when using multiple synopses types together. It compares the results of the more effective measured-based KW, with the results of the estimated-based JJOT. Using the error-estimation functions within the JJOT heuristic is a very fast way to perform synopses reconciliation, and yet the effectiveness remains quite close to that of the measured-based KW. The experiments show that the difference in the total error between are two techniques is on average 1% and at most 3.3%, when the range of the error was between 0% and 12%.

Figure 31:
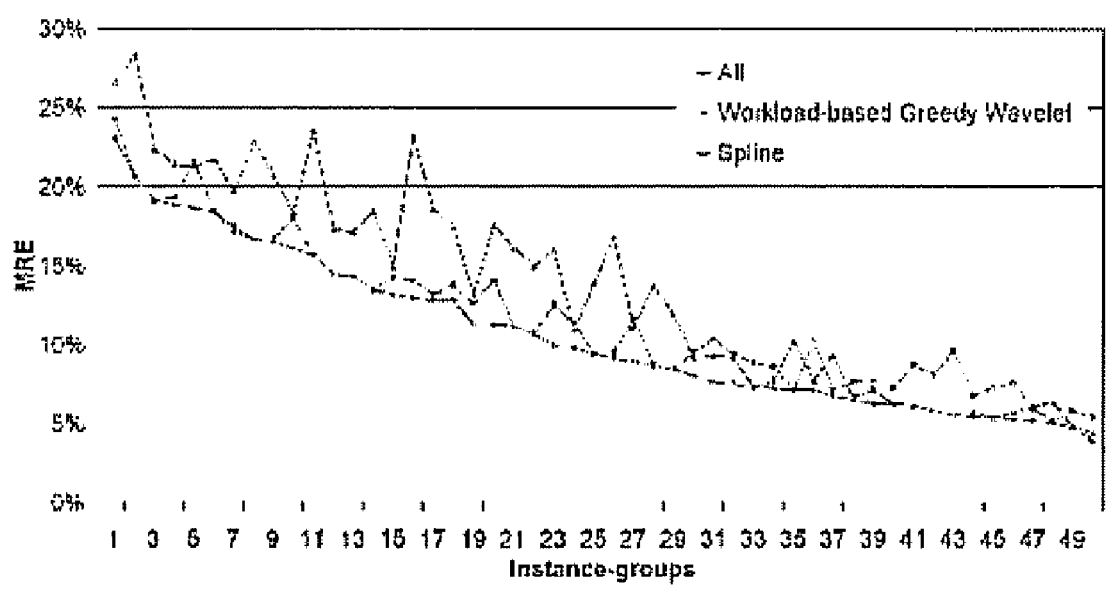
FIG. 31 describes synopses reconciliation using Spline synopsis alone, Workload-based greedy wavelet alone, and using a combination of the two (All). The instance results are sorted by the measured error of "All" in decreasing order. Note that the combination of both synopses is always better (or at least equal) to the total relative error achieved by using only one synopsis type.

FIG. 31 demonstrates the advantage of using multiple synopses types together compared to using just one type. The plots describe the total estimation error when using the Spline Synopsis alone, the Workload-based greedy wavelet alone, and when using a combination of the two. It can be seen that in some cases the Spline synopsis alone achieves better results, in some the Workload-based greedy wavelet alone is better than the spline alone, but in all cases a combination of the two achieves the best results—up to 4% better than using just one synopsis type.

Theoretical Section 4.1.4 Dynamic Synopses Reconciliation

Tables 3 and 4 detail instances where a synopses reconciliation process after the underlying relations and query workloads have changed, significantly lowered the total error of the system. We built the instances detailed in the tables, and then made a small change: resizing one of the query workloads or changing the distribution of one of the relations. A second synopses reconciliation on the above instances lowered the error of the entire system by as much as 4.9%.

Theoretical Section 4.2 Experiments Setup

As is customary, we will assume that the data of real-world relations is well approximated using synthetic data with a Zipfian distribution [26]. Most of the tests were performed on synthetic relations with a Zipfian data distribution with Zipf parameter ranging from 0.1 (very low skew, almost uniform) to 0.6 (very high skew). In addition some tests were performed using relations from the TPC-H data set and on the "Forest Cover" (CovType) real-world relation provided by KDD Data of the University of California (http://kdd.ics.uci.edu), which resembles a synthetic relation with Zipf parameter 0.4. The tests were performed using relations with a single numerical attribute and query workloads consisting of range-sum queries with a single numerical result. Since we are measuring the relative error, which is the error divided by the real value, the range of the data is not important, so we chose it randomly for each relation—usually at half of the maximum key. With a goal to cover as wide a range as possible in our tests, we performed tests on the entire range of each of the instance-parameters of the instance:

Relation distinct count L. varies from 256 to 2048 unique keys, with 256 k to 2048 k tuples respectively. Relations of similar sizes were also used in the experiments of [12, 16]. We also performed tests on larger relations a distinct count of 16 k to 128 k (with 16 m to 128 m tuples respectively), which gave similar error-estimation results, as can bee seen below.

The Relation data Z and Query workloads Q have a Zipfian distribution with Zipf parameter between 0.1 and 0.6 Zipf. Trying to best simulate real life relations, we used Zipfian data distributions as recommended in [26]. Starting from 0.1 to 0.6, almost covers the entire range—0.1 Zipf means relations with very low and almost uniform data distribution skew, and 0.6 Zipf means very high data distribution skew.

Workload query range R starts from 10 keys to 80% of the relation distinct count, covering almost the entire range. We assume no one would run queries which select more than 80% of the relation.

Synopsis size S starts from 2 buckets or coefficients to 80% of the relation distinct count, again covering almost the entire range. We assume in real life no one would build a synopsis so big, and for a size of 80% most synopses will give MRE=0 anyway.

The tests were performed using the following synopses types: Spline synopsis [14]—a combination of histogram with curve fitting resulting in a very high performance histogram, V-Optimal [11]—a high performance histogram, Standard Wavelet [19]—the basic wavelet synopsis, the Workload-based Greedy wavelet [21]—a high performance wavelet synopsis that uses workload information to achieve more accurate results, and Golden Estimator [25]—a sampling-based histogram. The Spline synopsis was chosen for it appeared in synopses reconciliation experiments in [14, 13, 15, 16], the V-Optimal was chosen for it was used in the synopses reconciliation heuristics in [12], and in addition we used several other synopses types. The above synopses perform some method of lossy compression, whether it is wavelet calculations, sampling or averaging in histograms, and they all follow the basic assumption that the more space we have the less we need to compress, and the less we need to compress the more accurate and close to the original the synopsis will be. Therefore the behavior of the error as a function of the synopsis size is that of a monotonous increasing function (it might have peaks, but the average is monotonous), and since it is also limited (after a certain size it reaches 100% accuracy, and it cannot get any better) we can say that there is a diminishing return on increasing its size. The greedy heuristic suggested in [12] requires only that the synopsis' error as a function of the allocated space, be monotonous with decreasing marginal gain as the allocated space increases. So other synopses using a method of lossy compression are also expected to qualify for being used by the greedy heuristic. Since most known synopses use some method of lossy compression, then this technique will also work for most other synopses types.

Theoretical Section 4.3 Calibration Process

FIG. 23 shows the measured and estimated error of several synopses types in 50 instances with randomly selected instance-parameters. We used the following synopses types: the Workload-based Greedy Wavelet synopsis (upper-left), the Golden Estimator synopsis (upper-right) and the Spline synopsis (lower). FIG. 24 shows synopses measured and estimated error in 50 instances using the Spline synopsis and the CovType real-world relation. The instance-parameters of the query workloads and synopses were randomly selected. In both figures, for each test, a new workload was generated and the synopsis was rebuilt according to their values in the instance-profile. For instance, in instance number 40, the measured error of the Golden Estimator was 3% and the estimated error was 5.3%. Similar tests were performed using the other synopses types generating similar results.

The results shown in FIGS. 23 and 24 show that the estimated error is quite close to the measured error; and the difference—the EEE—is at most 6.9%, and 2% on the average, where the error range was between 0% and 20%. The variance of the EEE is at most 0.00035 and the relative error-estimation error [EEE/mE] is at most 2.41. Similar results were also achieved for the other synopses and for other relations.

Recall that the calibration process uses synthetic Zipfian distributed relations, and therefore the error-estimation function is also built to estimate Zipfian distributed relations. Thus, the accuracy of the error-estimation function depends on how close the real-world relation distribution resembles a Zipfian distribution. Since the relation used is only partly similar to a Zipfian distributed relation, the results are slightly less accurate than the results of using pure Zipfian distributed relations. In order to measure how similar is a relation to a Zipfian distributed relation, we measure for each tuple the difference between the current data value and the data value it would have had if it were a tuple in a pure Zipfian distributed relation. For example, the real-world relation that we use, the KDD CovType has a distribution distance variance of 0.032.

FIG. 25 shows the measured and estimated error of an instance as a function of the variance of the distance of the relation's distribution from a pure Zipfian distributed relation. It demonstrates how the accuracy of the error-estimation function depends on how similar the relation distribution is to a Zipfian distribution. In this experiment we used a pure Zipfian data distributed relation with Zipf parameter of 0.4 and 64 m tuples with a distinct count of 64 k, and gradually changed the data distribution away from a Zipfian-like. For each measurement we rebuilt a Workload-based Greedy Wavelet synopsis of 100 coefficients, and a query workload of 300 range-sum queries with a random range of 90-110, and plotted the measured error and the estimated error. Note how the measured error gradually decreases since the changes make the distribution easier to approximate, but the estimated error remains the same since the Zipf parameter fitted to the relation remains the same. The relative EEE in this experiment, for a distribution distance variance of 6, reached 45%. For a relation with a distribution distance variance of 0.032, similar to the CovType relation, the relative EEE is 4%.

FIG. 26 shows the measured and estimated error of 50 instances with randomly selected instance parameters. The error-estimation experiments were performed with the Golden Estimator synopsis (left) and the Workload-based Greedy Wavelet synopsis (right) using larger relations. We used synthetic relations of sizes 16 m to 128 m tuples, with a distinct count of 16 k to 128 k respectively, and a random data distribution skew ranging from 0.1 Zipf to 0.6 Zipf. For each test we randomly generated a query workload with query range between 10 keys and 1% of the relation distinct count. For instance, in instance number 25, the estimated error for the Workload-based Greedy Wavelet (right) was 6.8% while the measured error was 8.3%. The results are very similar to the results of the tests performed on the smaller relations: an average EEE of 2.3% and a maximum FEE of 6.9% when the error range was between 0% and 20%. The relative error [EEE/mE] is at most 2.3 and variance of the EEE is at most 0.00035.

Single approximate query error-estimation. Recall that, one of the applications for the error-estimation functions, is the error estimation for a single approximate query.

FIG. 27 details an experiment performed for estimating the error for a single query, showing the measured and estimated error of 150 queries. For the experiment we used a relation with 64 m tuples, and a distinct count of 64 k, with a Zipfian distribution skew with Zipf parameter of 0.4. Over the relation we built a Workload-based Greedy wavelet synopsis, with 100 coefficients. The query workload consisted of 150 random queries, and the results are sorted according to measured-error. The monotonous decreasing plot is the measured-error, and the other plot is the estimated error. For instance, in query number 51, the measured error was 9.15% and the estimated error was 7.99%. The results of the experiment show that the EEE is lower than 20% for 96.3% of the queries, and lower than 10% for 83.7% of the queries. The variance of the EEE in this test was 0.0036.

Theoretical Section 4.4 Synopses Reconciliation

FIG. 28 compares the error of the combination recommended by the measured-based KW with the error of the combination recommended by the estimated-based KW over 20 instance-groups. We use KW and test every possible combination by querying the database, finding the combination wilt the minimal error, and displaying that error on the plot. Using the same instance and the same algorithm, we find the combination with the minimal estimated error by using the error-estimation function to estimate the error of each combination. We then test the suggested combination by querying the database, and display the measured error of that combination in the plot. For each synopsis type we ran 20 synopses reconciliation tests, each with an instance-group consisting of 3-4 instances with randomly selected instance-parameters, following the specifications above. The figure depicts the results of experiments performed using the Golden Estimator synopsis (left) and the Spline Synopsis (right). For instance, using the Spline synopsis (right), in instance-group number 3, the measured-based KW combination achieved an error of 3% while the estimated-based KW achieved an error of 44%. Tests performed using the other synopses types gave similar results.

FIG. 29 shows the accuracy of the measured-based combination and the estimated-based combination using both KW and JJOT. The figure shows the error of the Spline synopsis type in 20 instance-groups consisting of instances with randomly selected instance-parameters when using: KW measured-based combination, KW estimated-based combination, JJOT measured-based combination and JJOT estimated-based combination. As can be seen in the figure, and also commented by Jagadish et al in [12], the results of JJOT are quite close to those of KW. The figure also shows that the estimated-based combination achieves very good results when integrated with both the KW algorithm and the JJOT algorithm, selecting a synopsis combination which is on average only 1.5% worse than the others. Also, the difference between the KW estimated-based combination and the JJOT estimated-based combination is very small (on average 0.2%), which shows that the error-estimation function works just as well with the heuristic in [12], even without the "remedy".

Using multiple synopses types. In FIG. 30 we removed the limitation of only one synopsis type and enabled combinations of mixed synopses types together showing again the error of the estimated-based combination and the error of the measured-based combination over 7 instance-groups consisting of instances with randomly selected instance-parameters. Using multiple synopses types together enables us to lower the error even further, selecting the best suited synopsis for every relation and query workload. As before the estimated-based combination achieves an error which is quite close to the measured-based combination—the maximum difference between them is 3.3%, and the average difference between them is 1% Table 2 shows an example of the synopses selected by each of the algorithms. Although the Workload-based Greedy Wavelet (WB-Wavelet) dominates the recommendations, there are occasions where the Spline synopsis is recommended, showing that a mixture of several synopses will perform better than using just one.

| <L, Z, Q, R> Reconciliation algorithm | <256k, 0.1, 0.1, 15> Synopsis type and size (S) | <512k, 0.4, 0.2, 35> Synopsis type and size (S) | <512k, 0.1, 0.6, 25> Synopsis type and size (S) | Error | Run-time (seconds) |
|---|---|---|---|---|---|
| KW M-based | Spline 180 | WB-Wavelet 180 | WB-Wavelet 140 | 0.0247 | 64 |

-continued

| <L, Z, Q, R> Reconciliation algorithm | | <256k, 0.1, 0.1, 15> Synopsis type and size (S) | <512k, 0.4, 0.2, 35> Synopsis type and size (S) | <512k, 0.1, 0.6, 25> Synopsis type and size (S) | Error | Run-time (seconds) |
|---|---|---|---|---|---|---|
| KW | E-based | Spline 180 | WB-Wavelet 200 | Spline 120 | 0.0264 | 0.8 |
| JJOT | M-based | Spline 180 | WB-Wavelet 200 | WB-Wavelet 120 | 0.0255 | 18 |
| JJOT | E-based | Spline 180 | WB-Wavelet 200 | Spline 120 | 0.0264 | 0.2 |

Table 2 describes Synopses reconciliation with multiple synopses. Selected synopses for three instances with different sizes L, skew parameter Z and query workload (Q and R), using the KW and JJOT algorithms, with both the measured-based and estimated-based synopses error estimation. The total allocated memory is 500 bytes, and the participating synopses types were Spline, V-Optimal, Standard Wavelet, Workload-based Greedy Wavelet (WB-wavelet) and Golden Estimator. Every cell contains the type of synopsis selected and the size in bytes. The results based on the example methods are in bold face.

In FIG. 31 We ran 50 tests with randomly selected instance-parameters, measuring the error of a measured-based KW when using Spline synopsis alone, Workload-based Greedy Wavelet alone and when using both synopses types together, demonstrating the advantage of using a combination of multiple synopses types together compared to using just one type. The results are sorted by the measured error of "All" in decreasing order. For instance, in instance-group number 23, the Spline synopsis achieved an error of 16%, the workload-based greedy wavelet synopsis achieved an error of 12.5%, and using a combination of synopses from both types achieved an error of 10%. Out of these 50 tests, in 13 of the tests using only the Workload-based greedy wavelet gave the best solution, in 7 of the tests using only the Spline synopsis type gave the best solution, and for the rest, the best solution was achieved by a combination of both synopses types. The total relative error when using a combination of different synopses types was up to 4% better than using just one synopsis type alone.

Dynamic Synopses Reconciliation. We demonstrate the improvement gained by performing a second synopses reconciliation, as the underlying relations and query workload change. In this experiment, we run a synopses reconciliation process on an instance-group and build the recommended synopses. We then change the instance-group a little, rebuild all the synopses (to imitate the dynamic update of the synopsis) and measure the total approximation error of the instance-group. This measurement shows the expected approximation error assuming a second synopses reconciliation process is never performed, while the relations and query workloads continue to change. Next we perform a second synopses reconciliation process, build the recommended synopses, and measure the total approximation error. The differences between the first and second measurement show the benefit from a second (and even a periodic) synopses reconciliation process. Below are two examples of instance-groups demonstrating the gain from a second synopses reconciliation process:

Table 3 details a given instance-group with 4 relations, and the synopses built over them according to the recommendations from the synopses reconciliation process (syn size before). The total relative error of this instance-group with the above synopses was 7.4%. We then chanced the query workload size of the fourth instance from 50 to 2000, simulating an increase of the number of queries to this relation. At this point the total approximation error of the instance-group changed to 8%. Next we ran a second synopses reconciliation process, which gave a new recommendation (syn size after).

The total relative error of the system after this change was 3.1%, meaning that by running a second synopses reconciliation, when the underlying query workload has changed, we managed to lower the total relative error by 4.9%. We also ran a synopses reconciliation process assuming equal workload size for each relation, and tested this combination under the real query workloads. Using this combination on the first workload resulted in a total relative error of 9.2%, and using the combination on the second workload resulted in a total relative error of 10.6%. Note that assuming an equal size of query workload among the relations gives the worst results, even when the instance-group has changed, and a second synopses reconciliation has not been run.

| | Instance 1 | Instance 2 | Instance 3 | Instance 4 |
|---|---|---|---|---|
| Relation distinct count | 64k | 16k | 32k | 16k |
| Data skew | 0.4 | 0.6 | 0.5 | 0.3 |
| Query range | 10 | 20 | 20 | 20 |
| #queries - $\Omega_1$ | 200 | 100 | 150 | 50 |
| Syn sizes $\Sigma(\Omega_1)$ | 60 | 420 | 90 | 90 |
| $E(P, \Omega_1, \Sigma(\Omega_1))$ | | 7.4% | | |
| #queries - $\Omega_2$ | 200 | 100 | 150 | 2000 |
| $E(P, \Omega_2, \Sigma(\Omega_1))$ | | 8% | | |
| Syn sizes $\Sigma(\Omega_2)$ | 60 | 30 | 60 | 510 |
| $E(P, \Omega_2, \Sigma(\Omega_2))$ | | 3.1% | | |

Table 3 describes an instance-group detailing relations and query workloads used to demonstrate the effectiveness of dynamic synopses reconciliation. The first error line shows the error of the original instance-group. Next we changed the workload of the fourth instance, and the following line shows the resulting increase in the error. Finally we ran a second synopses reconciliation, which recommended a change of synopses, and the bottom line displays the resulting error after the synopses were rebuilt.

Table 4 details another example for the effectiveness of the dynamic synopses reconciliation. In this example we changed the data distribution Zipf parameter of the first relation, causing the total relative error of the instance-group to increase from 3.4% to 9.3%. A second synopses reconciliation process lowered the total relative error by 3.1%.

|  | Instance 1 | Instance 2 | Instance 3 | Instance 4 |
|---|---|---|---|---|
| Relation distinct count | 64k | 16k | 32k | 16k |
| Data skew ($P_1$) | 0.1 | 0.6 | 0.5 | 0.3 |
| Query range | 10 | 20 | 20 | 20 |
| #queries | 300 | 100 | 150 | 50 |
| Syn sizes $\Sigma(P_1)$ | 30 | 420 | 480 | 60 |
| $E(P_1, \Omega, \Sigma(P_1))$ | | | 3.4% | |
| Data skew ($P_2$) | 0.4 | 0.6 | 0.5 | 0.3 |
| $E(P_2, \Omega, \Sigma(P_1))$ | | | 9.3% | |
| Syn sizes $\Sigma(P_2)$ | 360 | 300 | 300 | 40 |
| $E(P_2, \Omega, \Sigma(P_2))$ | | | 6.2% | |

Table 4 describes another instance-group detailing relations and query workloads used to demonstrate the effectiveness of dynamic synopses reconciliation. The first error line shows the error of the original instance-group. Next we changed the data distribution Zipf parameter from 0.1 to 0.4, and the following line shows the resulting increase in the error. Finally we ran a second synopses reconciliation, which recommended a change of synopses, and the bottom line displays the resulting error after the synopses were rebuilt.

Figure 32:
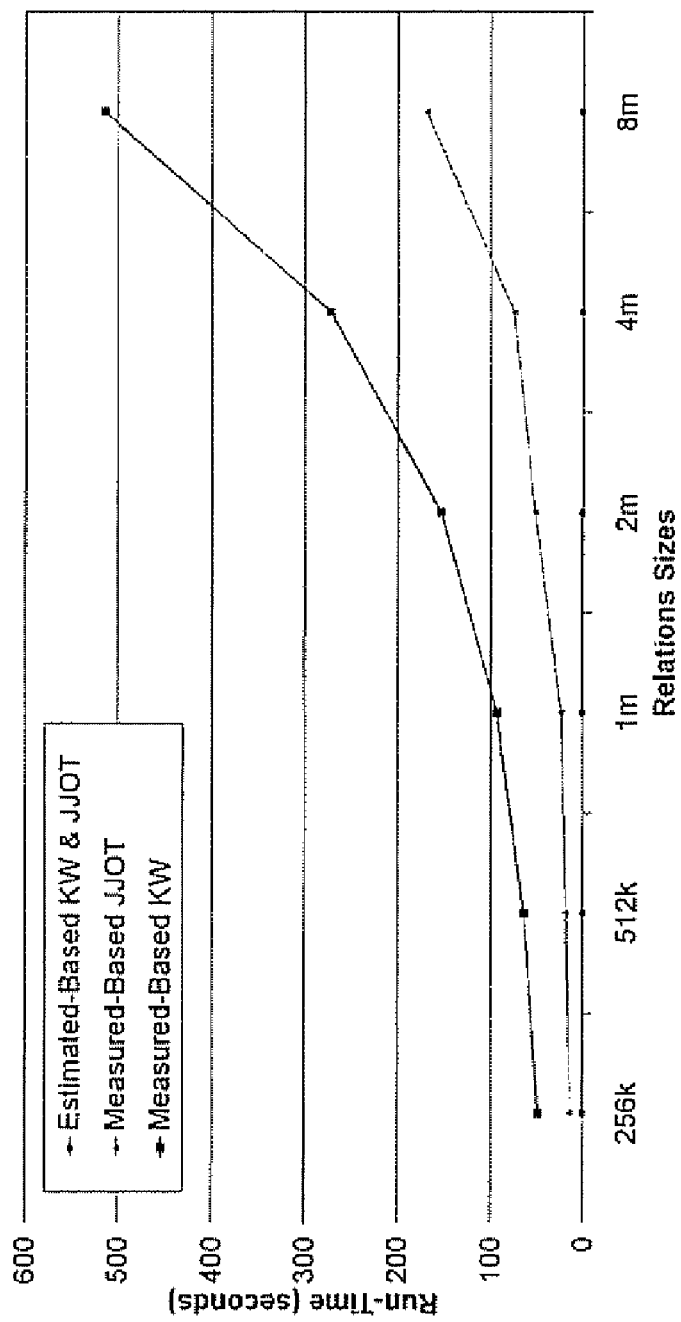
FIG. 32 describes comparison of the run time between the measured-based KW and JJOT and the estimated-based KW and JJOT, using 4 relations with increasing size (x-axis). Note that the running times of the estimated-based KW and JJOT are constant (less than 1 second), and are not affected by the size of the relations.

Run-time improvement FIG. 32 reports the run time of the synopses reconciliation processes in 6 instance-groups. Each instance-group contains 4 relations of the same size (α-axis), and each with a query workload of 200 queries. For each instance-group we measured the run-time of the estimated-based and measured-based KW and JJOT algorithms as a function of the relation size. The higher plot is the measured-based KW, the plot in the middle is the measured-based JJOT, and the lower plot (coinciding with the x-axis) describes both the estimated-based KW and JJOT. For instance, using 4 relations of size 8 m tuples each, the run-time of the measured-based KW was 514 seconds, the measured-based JJOT ran for 169 seconds, while the estimated-based KW and JJOT ran for less than 1 second. The results of the experiment show how the run-times of the measured-based algorithms grows as the size of the relations grow, while the run-times of the estimated-based algorithms remains a constant (less than 1 second). This can be easily explained since the measured-based algorithms require to build synopses in order to test them, and as the relations grow, the build time of the synopses also grows. These run-times assume that before the synopses reconciliation process began, all the relevant synopses implementations were calibrated and the relevant relations and query workloads were profiled.

Theoretical Section 5 Discussion

In this theoretical discussion, we have presented an efficient way for the online error estimation of data synopses—a basic requirement for any optimization of synopses space utilization, enabling query quality reporting, "What-If" questions without making chances to the actual data, and performing efficient synopses reconciliation. One feature of the presented example technique is defining an error estimation function that is synopsis-type dependent, and not dependent on the particular instance of relation and query workload. Thus, it can be computed per synopsis at the time the synopsis module is integrated with the system, rather than when a synopsis is actually built for a particular relation. The function accepts as arguments the statistical specifications of the instance relation and query workload, and can thus avoid altogether database access for the purpose of error estimation.

Using the error-estimation functions we described, in this theoretical section, a profile-based synopses reconciliation process that can run on a separate server, with little impact to the operational database server, and also enables, for the first time, a practical solution to the dynamic synopses reconciliation problem. Previous works on synopses reconciliation required performing a large number of accesses to the database and also did not explicitly support the use of multiple synopses. Using the example method, a synopses reconciliation process finishes in less than 1 second instead of several minutes, obtaining a result whose approximation relative error is on average only 0.3% larger than the original error.

The calibration method presented here in this theoretical section is performed using synthetic Zipfian distributed relations, and therefore the error-estimation function is also built to estimate Zipfian-like distributed relations. This is not intended as a limitation.

This theoretical discussion relates to the particular case of relations with a single numerical attribute and on query workloads consisting of range-sum queries with a single numerical result. It is appreciated that this is not intended as a limitation, and allows an in-depth treatment of one particular non-limiting case.

Under this setup, the five instance-parameters which define an instance-profile are sufficient to achieve a good estimation of the synopsis error. The specific construction of the error estimation function is based on the observation that the effect of the different parameters on the error of an instance can be approximated by power-law functions, and on the assumption that the instance-parameters are near-independent of each other. This enables to lower the number of tests required in order to find the error-estimation function, and enable the building of one simple function to estimate the error of a synopsis w.r.t. a given relation and query workload. In this theoretical section, we presented an off-line calibration process for calculating the characteristics of the data synopsis type, resulting in an on-line synopsis error-estimation for error prediction based on the synopsis and instance profiles.

Since the exemplary method deals with set items, it need not be in relational format and can therefore also support non-relational data sets. The error-estimation functions are also applicable to streaming data by identifying the relevant parameters and tracking them in the streaming model or by maintaining a backing sample on the streaming data.

The error-estimation function can be extended to support other types of setups by adding parameters to the error-estimation function capturing the specifications of these setups. Instead of assuming the parameters are independent of each other and using a linear combination of power-law function, the error-estimation function can be adjusted to capture the dependencies between the parameters, thus gaining better accuracy.

REFERENCES

[1] A. Aboulnaga and S. Chaudhuri. Self-tuning histograms: Building histograms without looking at data. In *Proceedings of the* 1999 *ACM SIGMOD International Conference on Management of Data*, pages 181-192, 1999.

[2] S. Acharya, P. B. Gibbons, V. Poosala, and S. Ramaswamy. The aqua approximate query answering system. In *Proceedings of the* 1999 *ACM SIGMOD international conference on Management of data*, pages 574-576, 1999

[3] N. Alon, Y. Matias, and M. Szegedy. The space complexity of approximating the frequency moments. In *Proceedings of the* 28*th ACM Symposium on Theory of Computing*, pages 20-29, 1996.

[4] V. Ganti, M.-L. Lee, and R. Ramakrishnan. Icicles: Self-tuning samples for approximate query answering. *The VLDB Journal*, pages 176-187, 2000.

[5] P. Gibbons, Y. Matias, and V. Poosala. Aqua project white paper. Technical report, Bell Laboratories, Murray Hill, N.J., December 1997.

[6] P. B. Gibbons and Y. Matias. Synopsis data structures for massive data sets. *DIMACS: Series in Discrete Mathematics and Theoretical Computer Science: Special Issue on External Memory Algorithms and Visualization*, A:50, 1999.

[7] P. B. Gibbons and Y. Matias. Synopsis data structures for massive data sets (summary). In *Proceedings of the tenth annual ACM-SIAM symposium on Discrete algorithms (SODA)*, pages 909-910, January 1999.

[8] P. B. Gibbons, Y. Matias, and V. Poosala. Fast incremental maintenance of approximate histograms. In *Proc. VLDB*, pages 466-475, 1997.

[9] J. M., Hellerstein, P. J. Haas, and H. J. Wang. Online aggregation. In *Proceedings of the 1997 ACM SIGMOD International Conference on Management of Data*, Tucson, Ariz., May 1997.

[10] iLOG Inc. 8.0-user's manual, 2002.

[11] Y. E. Ioannidis and V. Poosala. Balancing histogram optimality and practicality for query result size estimation. In *Proceedings of the 1995 ACM SIGMOD International Conference on Management of Data*, pages 233-244, 1995.

[12] H. V. Jagadish, H. Jin, B. C. Ooi, and K. L. Tan. Global optimization of histograms. In *SIGMOD '01*, pages 223-234, 2001.

[13] A. C. Koenig. Query estimation techniques in database systems. PhD thesis, Saarlandes University, 2001.

[14] A. C. Koenig and G. Weikum. Auto-tuned spline synopses for database statistics management. In *10th International Conference on Management of Data*, Pune, India (COMAD), 2000.

[15] A. C. Koenig and G. Weikum. A framework for the physical design problem for data synopses. In *Proceedings of the 8th International Conference on Extending Database Technology*, pages 627-2002.

[16] A. C. Koenig and G. Weikum. Automatic tuning of data synopses. *Information Systems*, 28(1-2):85-109, 2003.

[17] Y. Matia, Y. Matias, and L. Portman. Synopses reconciliation via calibration in τ-Synopses system. In *International conference on Extending Database Technology (EDBT), Software Demo*, pages 1139-1142, March 2006

[18] Y. Matias, L. Portman, and N. Drukh. The design and architecture of the τ-Synopses system, In *International conference on Extending Database Technology (EDBT), Industrial & Application*, pages 1088-1091, March 2006.

[19] Y. Matias, J. S. Vitter, and M. Wang. Wavelet-based histograms for selectivity estimation. In *Proceedings of the 1998 ACM SIGMOD International Conference on Management of Data*, pages 448-459, Seattle, Wash., June 1998.

[20] Y. Matias, J. S. Vitter, and M. Wang. Dynamic maintenance of wavelet-based histograms. In *Proceedings of the 2000 VLDB*, pages 101-110, September 2000.

[21] L. Portman. Workload-based wavelet synopses. Master's thesis, School of Computer Science, Tel Aviv University, 2003.

[22] L. Portman and Y. Matias. Workload-based wavelet synopses. Technical report, Tel Aviv University, 2003.

[23] L. Qiao, D. Agrawal, and A. E. Abbadi Rhist: adaptive summarization over continuous data streams. In *CIKM '02: Proceedings of the eleventh international conference on information and knowledge management*, pages 469-476, 2002.

[24] E. W. Weisstein. Least squares fitting, mathworld—wolfram web resource. http://mathworld.wolfram.com/least-squaresfitting.html

[25] Y. L. Wu, D. Agrawal, and A. E. Abbadi. Applying the golden rule of sampling for query estimation. In *Proceedings of the 2001 ACM SIGMOD international conference on Management of data*, pages 449-460, 2001.

[26] G. K. Zipf. *Human Behavior and the Principle of Least-Effort*. Addison-Wesley, Cambridge, Mass., 1949.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited" to.

The term "or" is used herein to mean, and is used interchangeably with, the term "and/or," unless context clearly indicates otherwise. The term "such as" is used herein to mean, and is used interchangeably, with the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A method of computing a first estimated synopsis error $E^1$ and a second estimated synopsis error $E^2$ for a plurality of N relations $R=\{R_1, R_2 \ldots R_N\}$, the first estimated synopsis error $E^1$ associated with a first set of synopses $S^1=\{S_1^1, S_2^1, \ldots S_N^1\}$, the second estimated synopsis error $E^2$ associated with a second set of synopses $S^2=\{S_1^2, S_2^2, \ldots S_N^2\}$, each synopsis $S^1_i$ of the first synopsis set and each synopsis $S^2_i$ of the second synopsis set associated with a respective ith relation $R_i$, the method comprising:

a) computing $E^1$ for a first allocation memory vector $\overline{M^1}=\{m_1^1, m_2^1, \ldots m_N^1\}$ where:

$$\sum_{i=1}^{N} m_i^1 = M^1 \qquad \text{i)}$$

ii) for an ith relation $R_1$, each $m_i^1$ represents a respective amount of memory allocated for a respective synopsis $S^1_1$ of the first synopsis set;

b) using at least one of:
   i) said computed first estimated synopsis error $E^1$; and
   ii) stored intermediate results associated with said computing of $E^1$,
c) computing $E^2$ for a second memory allocation vector $\overline{M^2} = \{m_1^2, m_2^2, \ldots m_N^2\}$, $$\sum_{i=1}^{N} m_i^2 = M^2 \quad \text{i)}$$

ii) for an ith relation $R_1$, each $m_i^2$ represents a respective amount of memory allocated for a respective synopsis $S_1^2$ of the second synopsis set;
   wherein $M^1 \neq M^2$.

2. The method of claim 1 wherein said used stored intermediate results associated with said computing of $E^1$ are indicative of a profile of at least one relation the plurality of relations.

3. The method of claim 1 wherein:
   i) respective estimated synopsis errors are computed for a plurality of synopsis sets including the first and second synopsis sets;
   ii) a preferred synopsis set selected from the plurality of synopsis sets is selected in accordance with the errors computed in steps (a) and (c) for the first and second synopsis sets, the preferred synopsis set being associated with a preferred memory allocation vector $M^{PREFERRED}$; and
   iii) the method further includes allocating memory according to the preferred memory allocation vector $M^{PREFERRED}$.

4. The method of claim 1 wherein the plurality of relations and the plurality of synopsis of the data relations represent at least one of audio digital media content and video digital media content.

5. The method of claim 1 wherein the plurality of data relations and the plurality of synopses of the data relations represent data packets handled by a router of a switching network.

6. The method of claim 1 wherein the query workload describes a historical workload of a database management system (DBMS).

7. The method of claim 1 wherein the descriptions of the plurality of data relations is obtained from a cache of frequently-used data of a database management system (DBMS).

8. A method of estimating a synopsis error associated with a plurality of data relations, a query workload, and a plurality of data synopses $S = \{S_1, S_2, \ldots S_N\}$ of the data relations, the plurality of data synopses associated with a memory allocation vector $\overline{M} = \{m_1, m_2, \ldots m_N\}$ such that for the $i^{th}$ synopsis $S_i$, $m_i$ represents a respective amount of memory allocated to the $i^{th}$ synopsis $S_i$, the method comprising:
   a) providing an at least partially random data set;
   b) providing a synopsis of said at least partially random data set;
   c) after said providing of said at least partially random data set and said synopsis of said at least partially random data set, receiving data of the plurality of data relations;
   d) computing a profile of queries of the query workload; and
   e) in accordance with:
      (i) said provided at least partially random data set;
      (ii) said provided synopsis of said at least partially random data set; and
      (iii) data of the plurality of data relations;
      (iv) said profile of queries of the query workload,
   computing a synopsis error estimation function associated with the plurality of data relations, the query workload, and the plurality of data synopses $S = \{S_1, S_2, \ldots S_N\}$ of the data relations, the plurality of data synopses associated with the memory allocation vector $\overline{M} = \{m_1, m_2, \ldots m_N\}$ such that for the $i^{th}$ synopsis $S_i$, $m_i$ represents the respective amount of memory allocated to the $i^{th}$ synopsis $S_i$.

9. The method of claim 8 wherein said computing of said profile of queries is carried out in accordance with at least one of:
   i) a query range function;
   ii) a query dispersion function;
   iii) a query central tendency function; and
   iv) a query distribution skew function.

10. The method of claim 8 wherein:
    i) step (e) is repeated for a plurality of iterations to compute for each iteration a respective synopsis error $Error^j$, said each iteration and its said respective synopsis error $Error^j$ being associated with a respective memory allocation vector $\overline{M^j} = \{m_1^j, m_2^j, \ldots m_N^j\}$ and a respective plurality of synopses $S^j = \{S_1^j, S_2^j, \ldots S_N^j\}$ such that for the $i^{th}$ synopsis $S_i^j$ the $j^{th}$ synopsis plurality $S^j$, $m_i^j$ represents a respective amount of memory allocated to the $i^{th}$ synopsis $S_i^j$ and
    ii) the method further comprises the steps of:
       c) in accordance with the computed synopses errors of the plurality of iterations, selecting a memory allocation vector $M^{SELECTED}$ from a plurality of said memory allocation vectors of said iterations, each said memory allocation vector $\overline{M^j}$ of the plurality of memory allocation vectors being associated with said respective iteration of the plurality of iterations; and
       d) allocating memory according to the selected memory allocation vector $M^{SELECTED}$.

11. The method of claim 10 further comprising:
    e) generating a synopsis plurality $S^{generated} = \{S_1^{generated}, S_2^{generated}, \ldots S_N^{generated}\}$ such that for the $i^{th}$ synopsis $S_i^{generated}$ of the generated synopsis plurality, said $i^{th}$ synopsis $S_i^{generated}$ of the generated synopsis plurality is constrained to an amount of memory that is $m_i^{SELECTED}$ of $M^{SELECTED}$.

12. The method of claim 8 wherein the plurality of relations and the plurality of synopsis of the data relations represent at least one of audio digital media content and video digital media content.

13. The method of claim 8 wherein the plurality of data relations and the plurality of synopses of the data relations represent data packets handled by a router of a switching network.

14. The method of claim 8 wherein the query workload describes a historical workload of a database management system (DBMS).

15. The method of claim 8 wherein the descriptions of the plurality of data relations is obtained from a cache of frequently-used data of a database management system (DBMS).

16. The method of claim 8 wherein said computing of said synopsis error is carried out without using query results on the data relations for all queries of at least some queries of the query workload.

17. A method of estimating a synopsis error associated with a plurality of data relations, a query workload, and a plurality of data synopses $S=\{S_1, S_2, \ldots S_N\}$ of the data relations, the plurality of data synopses associated with a memory allocation vector $\overline{M}=\{m_1, m_2, \ldots m_N\}$ such that for the $i^{th}$ synopsis $S_i$, $m_i$ represents a respective amount of memory allocated to the $i^{th}$ synopsis $S_i$, the method comprising:
  a) selecting a functional form for an error function, said functional form associated with a plurality of function coefficients;
  b) effecting an off-line calibration procedure, said calibration procedure including:
    i) generating synthetic relations using a random number generation procedure;
    ii) computing a synopsis of said generated synthetic relations; and
    iii) deriving said plurality of function coefficients from said computed synopsis of said generated synthetic relations;
  c) after said off-line calibration procedure, receiving the data of the plurality of data relations and a description of the query workload;
  d) computing a profile of said received data of the plurality of data relations;
  e) computing a profile of queries of said query workload; and
  f) estimating the synopsis error associated with the plurality of data relations, the query workload, and the plurality of data synopses $S=\{S_1, S_2, \ldots S_N\}$ of the data relations, the plurality of data synopses associated with the memory allocation vector $\overline{M}=\{m_1, m_2, \ldots m_N\}$ such that for the $i^{th}$ synopsis $S_i$, $m_i$ represents the respective amount of memory allocated to the $i^{th}$ synopsis $S_i$, said estimating being carried out by using:
    i) said derived plurality of function coefficients; and
    ii) results of said profiling.

18. The method of claim 17 wherein:
  i) step (e) is repeated for a plurality of iterations to compute for each iteration a respective synopsis error $Error^j$, said each iteration and its said respective synopsis error $Error^j$ being associated with a respective memory allocation vector $\overline{M^j}=\{m_1^j, m_2^j, \ldots m_N^j\}$ and a respective plurality of synopses $S^j=\{S_1^j, S_2^j, \ldots S_N^j\}$ such that for the $i^{th}$ synopsis $S_i^j$ the $j^{th}$ synopsis plurality $S^j$, $m_i^j$ represents a respective amount of memory allocated to the $i^{th}$ synopsis $S_i^j$ and
  ii) the method further comprises the steps of:
    c) in accordance with the computed synopses errors of the plurality of iterations, selecting a memory allocation vector $M^{SELECTED}$ from a plurality of said memory allocation vectors of said iterations, each said memory allocation vector $\overline{M^j}$ of the plurality of memory allocation vectors being associated with said respective iteration of the plurality of iterations; and
    d) allocating memory according to the selected memory allocation vector $M^{SELECTED}$.

19. The method of claim 18 further comprising:
  e) generating a synopsis plurality $S^{generated}=\{S_1^{generated}, S_2^{generated}, \ldots S_N^{generated}\}$ such that for the $i^{th}$ synopsis $S_i^{generated}$ of the generated synopsis plurality, said $i^{th}$ synopsis $S_i^{generated}$ of the generated synopsis plurality is constrained to an amount of memory that is $m_i^{SELECTED}$ of $M^{SELECTED}$.

20. The method of claim 17 wherein the plurality of relations and the plurality of synopsis of the data relations represent at least one of audio digital media content and video digital media content.

21. The method of claim 17 wherein the plurality of data relations and the plurality of synopses of the data relations represent data packets handled by a router of a switching network.

22. The method of claim 17 wherein the query workload describes a historical workload of a database management system (DBMS).

23. The method of claim 17 wherein the descriptions of the plurality of data relations is obtained from a cache of frequently-used data of a database management system (DBMS).

24. The method of claim 17 wherein said computing of said profile of queries is carried out in accordance with at least one of:
  i) a query range function;
  ii) a query dispersion function;
  iii) a query central tendency function; and
  iv) a query distribution skew function.

25. The method of claim 17 wherein said computing of said synopsis error is carried out without using query results on the data relations for all queries of at least some queries of the query workload.

26. Apparatus for computing a first estimated synopsis error $E^1$ and a second estimated synopsis error $E^2$ for a plurality of N relations $R=\{R^1, R^2 \ldots R^N\}$, the first estimated synopsis error $E^1$ associated with a first set of synopses $S^1=\{S_1^1, S_2^1, \ldots S_N^1\}$, the second estimated synopsis error $E^2$ associated with a second set of synopses $S^2=\{S_1^2, S_2^2, \ldots S_N^2\}$, each synopsis $S_1^i$ of the first synopsis set and each synopsis $S_2^i$ of the second synopsis set associated with a respective ith relation $R_i$, the apparatus comprising:
  a) a data storage including at least one of volatile and non-volatile memory operative to store representations of a first memory allocation vector $\overline{M^1}=\{m_1^1, m_2^1, \ldots m_N^1\}$ and a second memory allocation vector $\overline{M^2}=\{m_1^2, m_2^2, \ldots m_N^2\}$ wherein:
    i) each $m_i^1$ represents a respective amount of memory allocated for a respective synopsis $S_i^1$ of the first synopsis set;
    ii) each $m_i^2$ represents an amount of memory allocated for a respective second synopsis $S_i^1$ associated with said ith relation $R_i$;

$$\sum_{i=1}^{N} m_i^1 = M^1 \qquad \text{iii)}$$

$$\sum_{i=1}^{N} m_i^2 = M^2 \qquad \text{iv)}$$

$$M^1 \neq M^2 \qquad \text{v)}$$

b) one or more data processors operative to execute computer code to:
    i) compute the first synopsis error $E^1$ for the first allocation memory vector $\overline{M^1}$;

ii) compute the second synopsis error $E^2$ for the first allocation memory vector $\overline{M^2}$;

using one of:

A) said computed first estimated synopsis error $E^1$; and

B) stored intermediate results associated with said computing of $E^1$.

27. The apparatus of claim 26 wherein said one or more data processors executing the computer code are operative such that said used stored intermediate results associated with said computing of $E^1$ are indicative of a profile of at least one relation the plurality of relations.

28. Apparatus for computing an estimated synopsis error associated with a plurality of data relations, a query workload, and a plurality of data synopses $S=\{S_1, S_2, \ldots S_N\}$ of the data relations, the plurality of data synopses associated with a memory allocation vector $\overline{M}=\{m_1, m_2, \ldots m_N\}$ such that for the $i^{th}$ synopsis $S_i$, $m_i$ represents a respective amount of memory that may be allocated to the $i^{th}$ synopsis $S_i$, the apparatus comprising:

a) a data storage including at least one of volatile and non-volatile memory operative to store representations of:

i) the plurality of data relations; and ii) the query workload; and b) one or more data processors operative to execute computer code to:

i) select a functional form for an error function, said functional form associated with a plurality of function coefficients;

ii) effect an off-line calibration procedure, said calibration procedure including:

A) generating synthetic relations using a random number generation procedure;

B) computing a synopsis of said generated synthetic relations; and

C) deriving said plurality of function coefficients from said computed synopsis of said generated synthetic relations;

iii) after said off-line calibration procedure, receive the data of the plurality of data relations and a description of the query workload;

iv) compute a profile of said received data of the plurality of data relations;

v) compute a profile of queries of said query workload; and vi) estimating the synopsis error associated with the plurality of data relations, the query workload, and the plurality of data synopses $S=\{S_1, S_2, \ldots S_N\}$ of the data relations, the plurality of data synopses associated with the memory allocation vector $\overline{M}=\{m_1, m_2, \ldots m_N\}$ such that for the $i^{th}$ synopsis $S_i$, $m_i$ represents the respective amount of memory allocated to the $i^{th}$ synopsis $S_i$, said estimating being carried out by using:

I) said derived plurality of function coefficients; and

II) results of said profiling.

* * * * *